United States Patent
Border

(10) Patent No.: US 7,213,077 B2
(45) Date of Patent: May 1, 2007

(54) METHOD AND SYSTEM FOR PROVIDING BUFFER MANAGEMENT IN A PERFORMANCE ENHANCING PROXY ARCHITECTURE

(75) Inventor: John Border, Poolesville, MD (US)

(73) Assignee: Hughes Network Systems, Inc., Germantown, MD (US)

( * ) Notice: Subject to any disclaimer, the term of this patent is extended or adjusted under 35 U.S.C. 154(b) by 992 days.

(21) Appl. No.: 09/903,755

(22) Filed: Jul. 12, 2001

(65) Prior Publication Data

US 2002/0016851 A1     Feb. 7, 2002

Related U.S. Application Data

(60) Provisional application No. 60/220,026, filed on Jul. 21, 2000, provisional application No. 60/225,630, filed on Aug. 15, 2000.

(51) Int. Cl.
*G06F 15/16* (2006.01)
*H04L 12/26* (2006.01)

(52) U.S. Cl. ............. 709/234; 709/249; 709/236; 370/338; 370/349

(58) Field of Classification Search ........... 709/206, 709/234–238, 245, 249; 370/322, 328–329, 370/338, 341, 349, 389, 392
See application file for complete search history.

(56) References Cited

U.S. PATENT DOCUMENTS

| | | | |
|---|---|---|---|
| 5,634,015 A * | 5/1997 | Chang et al. | 710/310 |
| 5,805,818 A * | 9/1998 | Perlman et al. | 709/224 |
| 5,867,661 A * | 2/1999 | Bittinger et al. | 709/227 |
| 5,996,022 A * | 11/1999 | Krueger et al. | 709/247 |
| 6,003,084 A * | 12/1999 | Green et al. | 709/227 |
| 6,302,326 B1 * | 10/2001 | Symonds et al. | 235/379 |
| 6,324,582 B1 * | 11/2001 | Sridhar et al. | 709/230 |
| 6,434,609 B1 * | 8/2002 | Humphrey | 709/218 |

(Continued)

FOREIGN PATENT DOCUMENTS

EP     0 574 140 A1     4/1993

(Continued)

OTHER PUBLICATIONS

RFC 1795, Data Link Switching: Switch-to-Switch Protocol, L. Wells et al., Apr. 1995.*

(Continued)

*Primary Examiner*—Krisna Lim
*Assistant Examiner*—Yasin Barqadle
(74) *Attorney, Agent, or Firm*—Bell Boyd & Lloyd LLP

(57) ABSTRACT

A network apparatus for providing performance enhancements of a communication network is disclosed. The network apparatus includes a plurality of communication interfaces that are configured to receive and to forward messages according to a prescribed protocol. The network apparatus also includes a plurality of modules configured to process the messages to effect performance enhancing functions. Further, the network apparatus includes a plurality of buffers that are configured to store the received messages and messages that are generated by one of the plurality of modules. A portion of the plurality of buffers is shared by the plurality of modules based upon execution of a particular one of the performance enhancing functions. Each of the plurality of buffers has a data structure that includes an expandable header to accommodate different message types. The present invention has particular applicability to a bandwidth constrained system, such as satellite network.

26 Claims, 29 Drawing Sheets

U.S. PATENT DOCUMENTS

| | | | |
|---|---|---|---|
| 6,480,901 B1 * | 11/2002 | Weber et al. | 709/246 |
| 6,519,703 B1 * | 2/2003 | Joyce | 713/201 |
| 6,618,393 B1 * | 9/2003 | Chiles et al. | 370/466 |
| 6,742,043 B1 * | 5/2004 | Moussa et al. | 709/232 |
| 6,789,118 B1 * | 9/2004 | Rao | 709/225 |
| 6,839,355 B1 * | 1/2005 | Saby et al. | 370/401 |
| 2001/0048670 A1 * | 12/2001 | Kelly et al. | 370/316 |
| 2002/0099854 A1 * | 7/2002 | Jorgensen | 709/249 |

FOREIGN PATENT DOCUMENTS

| | | |
|---|---|---|
| EP | 0 903 905 A2 | 9/1998 |
| WO | WO 95/34153 | 8/1995 |

OTHER PUBLICATIONS

J. Scott Stadler and Jay Gelman, "Performance Enhancement for TCP/IP On A Satellite Channel", Military Communications Conference, 1998, Milcom 98. Proceedings, IEEE Boston, MA, USA Oct. 18-21, 1997, New York, NY, USA, IEEE, US, XP010307786, pp. 270-276.

John Border et al, "Performance Enchancing Proxies", Internet Engineering Task Force Internet Draft, Jun. 25, 1999, XP002198915, pp. 1-26.

* cited by examiner

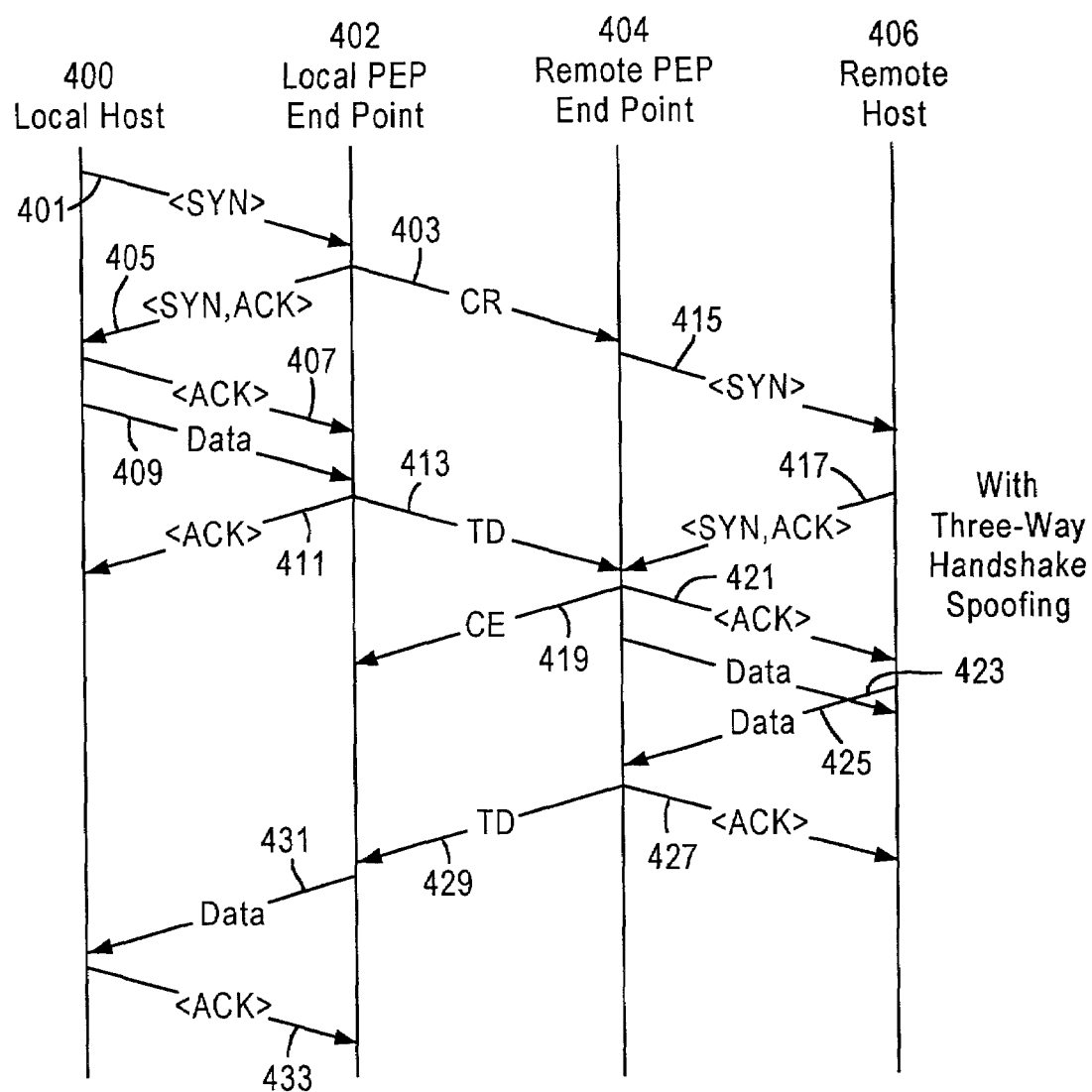

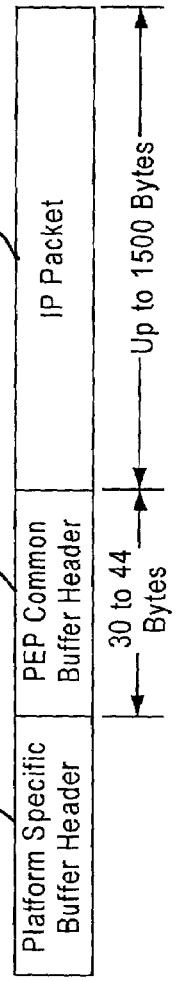

FIG. 19
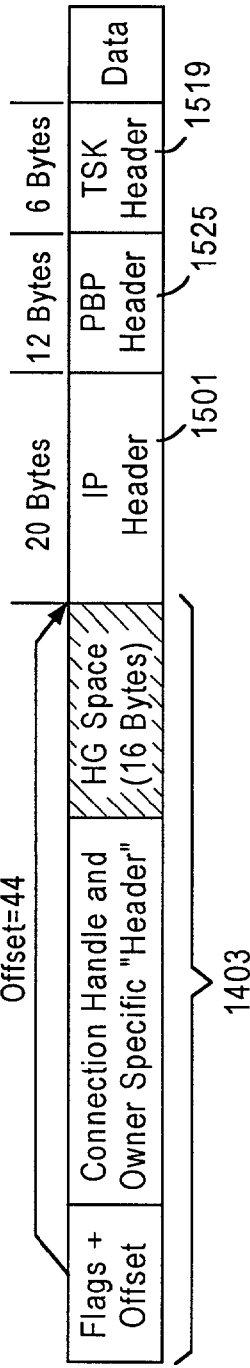
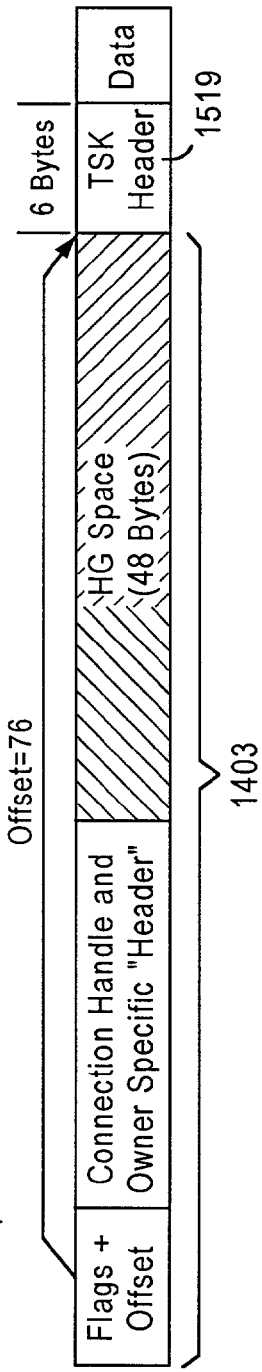
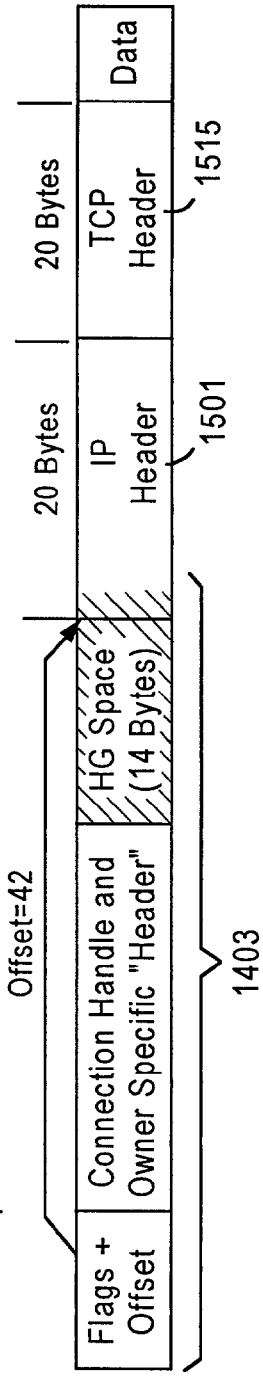

TCP CONNECTION

METHOD AND SYSTEM FOR PROVIDING BUFFER MANAGEMENT IN A PERFORMANCE ENHANCING PROXY ARCHITECTURE

CROSS-REFERENCES TO RELATED APPLICATION

This application is related to and claims the benefit of priority to: (i) U.S. Provisional Patent Application (Ser. No. 60/220,026), filed Jul. 21, 2000, entitled "Performance Enhancing Proxy," and (ii) U.S. Provisional Patent Application (Ser. No. 60/225,630), filed Aug. 15, 2000, entitled "Performance Enhancing Proxy"; all of which are incorporated herein by reference in their entirety.

BACKGROUND OF THE INVENTION

1. Field of the Invention

The present invention relates to a communication system, and is more particularly related to a proxy architecture for improving network performance.

2. Discussion of the Background

The entrenchment of data networking into the routines of modern society, as evidenced by the prevalence of the Internet, particularly the World Wide Web, has placed ever-growing demands on service providers to continually improve network performance. To meet this challenge, service providers have invested heavily in upgrading their networks to increase system capacity (i.e., bandwidth). In many circumstances, such upgrades may not be feasible economically or the physical constraints of the communication system does not permit simply "upgrading." Accordingly, service providers have also invested in developing techniques to optimize the performance of their networks. Because much of today's networks are either operating with or are required to interface with the Transmission Control Protocol/Internet Protocol (TCP/IP) suite, attention has been focused on optimizing TCP/IP based networking operations.

As the networking standard for the global Internet, TCP/IP has earned such acceptance among the industry because of its flexibility and rich heritage in the research community. The transmission control protocol (TCP) is the dominant protocol in use today on the Internet. TCP is carried by the Internet protocol (IP) and is used in a variety of applications including reliable file transfer and Internet web page access applications. The four layers of the TCP/IP protocol suite are illustrated in FIG. 31. As illustrated, the link layer (or the network interface layer) 10 includes device drivers in the operating system and any corresponding network interface cards. Together, the device driver and the interface cards handle hardware details of physically interfacing with any cable or whatever type of media that is being used. The network layer (also referred to as the Internet layer) 12 handles the movement of packets around the network. Routing of packets, for example, takes place at the network layer 12. IP, Internet control message protocol (ICMP), and Internet group management protocol (IGMP) may provide the network layer in the TCP/IP protocol suite. The transport layer 14 provides a flow of data between two hosts, for the application layer 16 above.

In the TCP/IP protocol suite, there are at least two different transport protocols, TCP and a user datagram protocol (UDP). TCP which provides a reliable flow of data between two hosts, is primarily concerned with dividing the data passed to it from the application layer 16 into appropriately sized segments for the network layer 12 below, acknowledging received packets, setting timeouts to make certain the other end acknowledges packets that are sent, and so on. Because this reliable flow of data is provided by the transport layer 14, the application layer 16 is isolated from these details. UDP, on the other hand, provides a much simpler service to the application layer 16. UDP just sends packets of data called datagrams from one host to another, with no guarantee that the datagrams will reach their destination. Any desired reliability must be added by a higher layer, such as the application layer 16.

The application layer 16 handles the details of the particular application. There are many common TCP/IP applications that almost every implementation provides, including telnet for remote log-in, the file transfer protocol (FTP), the simple mail transfer protocol (SMTP) or electronic mail, the simple network management protocol (SNMP), the hypertext transfer protocol (HTTP), and many others.

As mentioned, TCP provides reliable, in-sequence delivery of data between two IP hosts. The IP hosts set up a TCP connection, using a conventional TCP three-way handshake and then transfer data using a window-based protocol with the successfully received data acknowledged.

To understand where optimizations may be made, it is instructive to consider a typical TCP connection establishment. FIG. 32 illustrates an example of the conventional TCP three-way handshake between IP hosts 20 and 22. First, the IP host 20 that wishes to initiate a transfer with IP host 22, sends a synchronize (SYN) signal to IP host 22. The IP host 22 acknowledges the SYN signal from IP host 20 by sending a SYN acknowledgement (ACK). The third step of the conventional TCP three-way handshake is the issuance of an ACK signal from the IP host 20 to the other IP host 22. At this point, IP host 22 is ready to receive the data from IP host 20 (and vice versa). After all the data has been delivered, another handshake (similar to the handshake described to initiate the connection) is used to close the TCP connection.

TCP was designed to be very flexible and to work over a wide variety of communication links, including both slow and fast links, high latency links, and links with low and high error rates. However, while TCP (and other high layer protocols) works with many different kinds of links, TCP performance, in particular, the throughput possible across the TCP connection, is affected by the characteristics of the link in which it is used. There are many link layer design considerations that should be taken into account when designing a link layer service that is intended to support Internet protocols. However, not all characteristics can be compensated for by choices in the link layer design. TCP has been designed to be very flexible with respect to the links which it traverses. Such flexibility is achieved at the cost of sub-optimal operation in a number of environments vis-à-vis a tailored protocol. The tailored protocol which is usually proprietary in nature, may be more optimal, but greatly lacks flexibility in terms of networking environments and interoperability.

An alternative to a tailored protocol is the use of performance enhancing proxies (PEPs), to perform a general class of functions termed "TCP spoofing," in order to improve TCP performance over impaired (i.e., high latency or high error rate) links. TCP spoofing involves an intermediate network device (the performance enhancing proxy (PEP)) intercepting and altering, through the addition and/or deletion of TCP segments, the behavior of the TCP connection in an attempt to improve its performance.

Conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of TCP connections either by using larger windows over the link or by using compression to reduce the amount of data which needs to be sent, or both.

Many TCP PEP implementations are based on TCP ACK manipulation. These may include TCP ACK spacing where ACKs which are bunched together, are spaced apart, local TCP ACKs, local TCP retransmissions, and TCP ACK filtering and reconstruction. Other PEP mechanisms include tunneling, compression, and priority-based multiplexing.

Based on the foregoing, there is a clear need for improved approaches to optimizing network performance, while achieving network flexibility. There is also a need to enhance network performance, without a costly infrastructure investment. There is also a need to employ a network performance enhancing mechanism that complies with existing standards to facilitate rapid deployment. There is a further need to simplify the receiver design. Therefore, an approach for optimizing network performance using a proxy architecture is highly desirable.

SUMMARY OF THE INVENTION

The present invention addresses the above stated needs by providing a network apparatus for providing performance enhancing proxy (PEP) functionalities. The network apparatus includes multiple buffers that correspond to communication interfaces and that are utilized by performance enhancing proxy (PEP) kernels. The buffers have a data structure that provides an expandable field that adapts to different message types.

According to one aspect of the invention, a network apparatus for providing performance enhancements of a communication network is provided. The network apparatus includes a plurality of communication interfaces that are configured to receive and to forward messages according to a prescribed protocol. The network apparatus also includes a plurality of modules configured to process the messages to effect performance enhancing functions. Further, the network apparatus includes a plurality of buffers that are configured to store the received messages and messages that are generated by one of the plurality of modules. A portion of the plurality of buffers is shared by the plurality of modules based upon execution of a particular one of the performance enhancing functions. Each of the plurality of buffers has a data structure that includes an expandable header to accommodate different message types. This approach advantageously provides efficient management of buffers within a network component.

According to another aspect of the invention, a method for providing performance enhancements of a communication network is disclosed. The method includes receiving messages according to a prescribed protocol, processing the messages to effect performance enhancing functions via a plurality of modules, and storing the received messages and messages that are generated by one of the plurality of modules in a plurality of buffers. A portion of the plurality of buffers is shared by the plurality of modules based upon execution of a particular one of the performance enhancing functions, wherein each of the plurality of buffers has a data structure that includes an expandable header to accommodate different message types. The above arrangement advantageously improves system efficiency.

According to one aspect of the invention, a network apparatus for providing performance enhancements of a communication network includes means for receiving messages according to a prescribed protocol, and means for processing the messages to effect performance enhancing functions. The received messages and messages that are generated by processing means are stored in a plurality of buffers. A portion of the plurality of buffers is shared by the processing means based upon execution of a particular one of the performance enhancing functions. Each of the plurality of buffers has a data structure that includes an expandable header to accommodate different message types. The above arrangement advantageously provides efficient buffer management.

According to another aspect of the invention, a computer-readable medium carrying one or more sequences of one or more instructions for providing performance enhancements of a communication network is disclosed. The one or more sequences of one or more instructions include instructions which, when executed by one or more processors, cause the one or more processors to perform the step receiving messages according to a prescribed protocol. Other steps include processing the messages to effect performance enhancing functions via a plurality of modules, and storing the received messages and messages that are generated by one of the plurality of modules in a plurality of buffers. A portion of the plurality of buffers is shared by the plurality of modules based upon execution of a particular one of the performance enhancing functions. Each of the plurality of buffers has a data structure that includes an expandable header to accommodate different message types. This approach advantageously provides enhanced network performance.

In yet another aspect of the present invention, a memory for storing information for providing performance enhancements of a communication network is disclosed. The memory comprises a data structure that includes a specific header field that stores platform specific information. The data structure also includes a common header field that stores information known to the plurality of modules, and a payload field. Under this approach, efficient buffer management is achieved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A and 4B are flow diagrams of the connection establishment with three-way handshake spoofing and without three-way handshake spoofing, respectively;

FIG. 14 is a diagram of a basic format of the buffers used to implement the PEP functionality, according to an embodiment of the present invention;

FIG. 15 is a diagram of an IP packet that is used in the system of FIG. 1;

FIG. 19 is a diagram of a received TSK data message header adjustment, according to an embodiment of the present invention;

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to the Internet and the TCP/IP protocol suite, the present invention has applicability to other packet switched networks and equivalent protocols.

Figure 1:
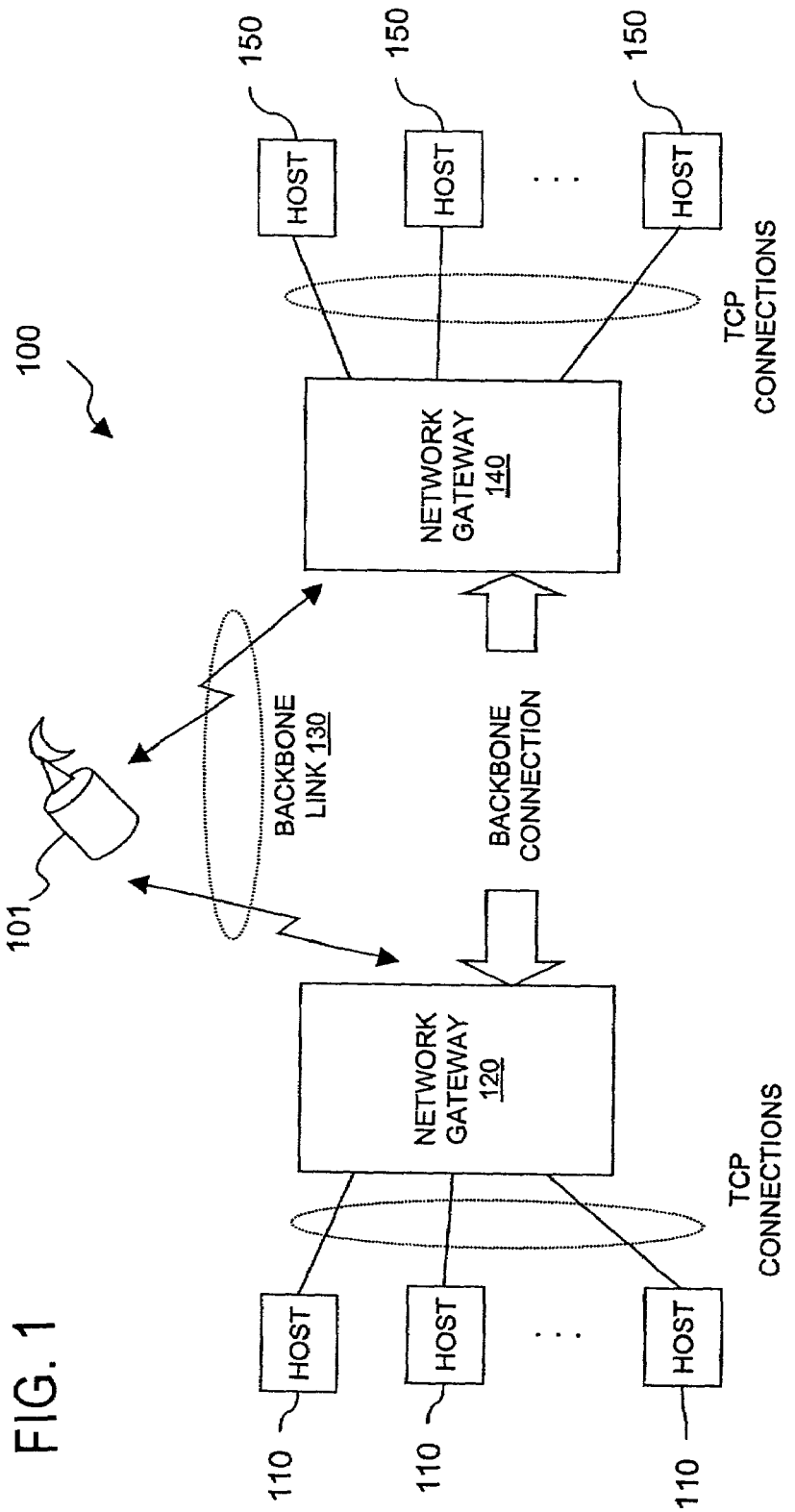
FIG. 1 is a diagram of a communication system in which the performance enhancing proxy (PEP) of the present invention is implemented.

FIG. 1 illustrates an exemplary network 100 in which the performance enhancing proxy (PEP) of the present invention may be utilized. The network 100 in FIG. 1 includes one or more hosts 110 connected to a network gateway 120 via TCP connections. The network gateway 120 is connected to another network gateway 140 via a backbone connection on a backbone link 130. As seen in FIG. 1, the backbone link 130, in an exemplary embodiment, is shown as a satellite link that is established over a satellite 101; however, it is recognized by one of ordinary skill in the art that other network connections may be implemented. For example, these network connections may be established over a wireless communications system, in general, (e.g., radio networks, cellular networks, etc.) or a terrestrial communications system. The network gateway 140 is further connected to a second group of hosts 150, also via TCP connections. In the arrangement illustrated in FIG. 1, the network gateways 120, 140 facilitate communication between the groups of hosts 110, 150.

The network gateways 120, 140 facilitate communication between the two groups of hosts 110, 150 by performing a number of performance enhancing functions. These network gateways 120, 140 may perform selective TCP spoofing which allows flexible configuration of the particular TCP connections that are to be spoofed. Additionally, gateways 120, 140 employ a TCP three-way handshake, in which the TCP connections are terminated at each end of the backbone link 130. Local data acknowledgements are utilized by the network gateways 120, 140, thereby permitting the TCP windows to increase at local speeds.

The network gateway 120, 140 further multiplexes multiple TCP connections across a single backbone connection; this capability reduces the amount of acknowledgement traffic associated with the data from multiple TCP connections, as a single backbone connection acknowledgement may be employed. The multiplexing function also provides support for high throughput TCP connections, wherein the backbone connection protocol is optimized for the particular backbone link that is used. The network gateways 120, 140 also support data compression over the backbone link 130 to reduce the amount of traffic to be sent, further leveraging the capabilities of the backbone connection. Further, the network gateways 120, 140 utilize data encryption in the data transmission across the backbone link 130 to protect data privacy, and provide prioritized access to backbone link 130 capacity on a per TCP connection basis. Each of the network gateways 120, 140 may select a particular path for the data associated with a connection to flow. The above capabilities of the network gateways 120, 140 are more fully described below.

Figure 2:
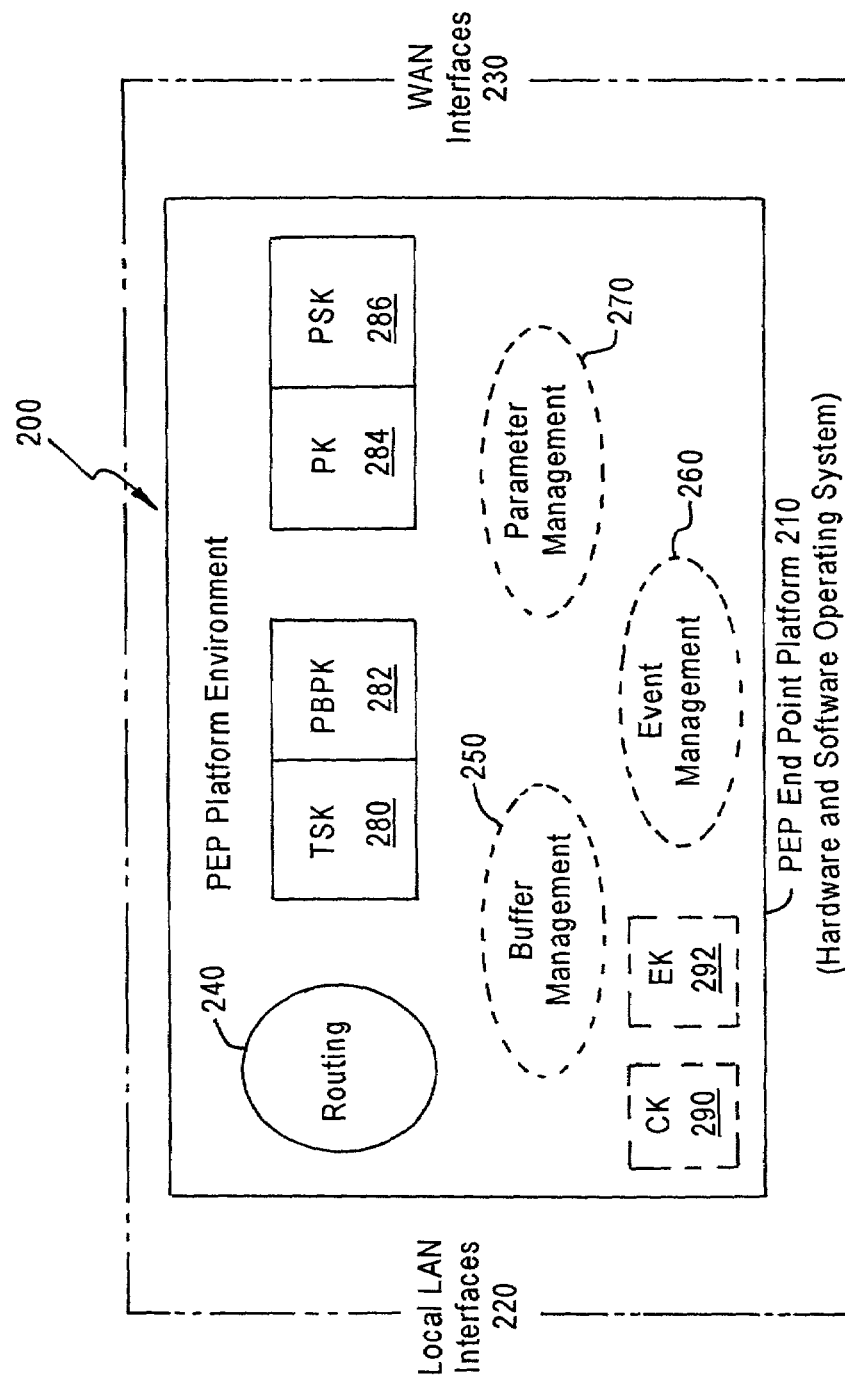
FIG. 2 is a diagram of a PEP end point platform environment, according to an embodiment of the present invention.

FIG. 2 illustrates a performance enhancing proxy (PEP) 200 as implemented in a network gateway 120, 140, according to one embodiment of the present invention. In this embodiment, the PEP 200 has a platform environment 210 which includes the hardware and software operating system. The PEP 200 also includes local area network (LAN) interfaces 220 and wide area network (WAN) interfaces 230. In the example in FIG. 1, the network gateway 120 may establish the TCP connections with the IP hosts 110, via a local LAN interface 220 and may establish the backbone connection with the network gateway 140 via a WAN interface 230. The PEP platform environment 210 may also include general functional modules: routing module 240, buffer management module 250, event management module 260, and parameter management module 270. As illustrated in FIG. 2, the network gateway also includes a TCP spoofing kernel (TSK) 280, a backbone protocol kernel (BPK) 282, a prioritization kernel (PK) 284, and a path selection kernel (PSK) 286. These four kernels essentially make up the functionality of the performance enhancing proxy 200.

The platform environment 210 performs a number of functions. One such function is to shield the various PEP kernels 280, 282, 284, 286 from implementation specific constraints. That is, the platform environment 210 performs functions that the various PEP kernels 280, 282, 284, 286 cannot perform directly because the implementation of the function is platform specific. This arrangement has the advantageous effect of hiding platform specific details from the PEP kernels 280, 282, 284, 286, making the PEP kernels more portable. An example of a platform specific function is the allocation of a buffer. In some platforms, buffers are created as they are needed, while in other platforms, buffers are created at start-up and organized into linked lists for later use. It is noted that platform specific functions are not limited to functions generic to all of the kernels 280, 282, 284, 286. A function specific to a particular kernel, for example, the allocation of a control block for TCP spoofing, may also be implemented in the platform environment to hide platform specific details from the kernel.

Additionally, the platform environment 210 may provide the task context in which the PEP kernels 280, 282, 284, 286 run. In one exemplary embodiment, all PEP kernels 280, 282, 284, 286 can run in the same task context for efficiency. However, this is not required.

Furthermore, the platform environment 210 provides an interface between the PEP functionality (embodied in kernels 280, 282, 284, 286) and the other functionality of the network gateway 120, 140. For example, the platform environment 210 may provide the interface between the PEP functionality and the routing function 240, as seen in FIG. 2. It is noted that the platform specific functions illustrated in FIG. 2 are examples and are not considered an exhaustive list. It is further noted that the PEP kernels shown touching each other (280, 282 and 284, 286) in FIG. 2 may have a direct procedural interface to each other. Further, the kernels 280, 282, 284, 286 may include direct interfaces to improve performance, as opposed to routing everything through the platform environment 210 (as shown in FIG. 2).

In addition to the PEP kernels 280, 282, 284, and 286, the PEP end point platform 210 may utilize a data compression kernel (CK) 290 and an encryption kernel (EK) 292. These kernels 280, 282, 284, 286, 290, and 292, as described above, facilitate communication between the two groups of hosts 110, 150, by performing a variety of performance enhancing functions, either singly or in combination. These performance enhancing functions include selective TCP spoofing, three-way handshake spoofing, local data acknowledgement, TCP connection to backbone connection multiplexing, data compression/encryption, prioritization, and path selection.

Selective TCP Spoofing is performed by the TSK 280 and includes a set of user configurable rules that are used to determine which TCP connections should be spoofed. Selective TCP spoofing improves performance by not tying up TCP spoofing-related resources, such as buffer space, control blocks, etc., for TCP connections for which the user has determined that spoofing is not beneficial or required and by supporting the use of tailored parameters for TCP connections that are spoofed.

In particular, the TSK 280 discriminates among the various TCP connections based on the applications using them. That is, TSK 280 discriminates among these TCP connections to determine which connection should be spoofed as well as the manner in which the connection is spoofed; e.g., whether to spoof the three-way handshake, the particular timeout parameters for the spoofed connections, etc. TCP spoofing is then performed only for those TCP connections that are associated with applications for which high throughput or reduced connection startup latency (or both) is required. As a result, the TSK 280 conserves TCP spoofing resources for only those TCP connections for which high throughput or reduced connection startup latency (or both) is required. Further, the TSK 280 increases the total number of TCP connections which can be active before running out of TCP spoofing resources, since any active TCP connections which do not require high throughput, are not allocated resources.

One criterion for identifying TCP connections of applications for which TCP spoofing should and should not be performed is the TCP port number field contained in the TCP packets being sent. In general, unique port numbers are assigned to each type of application. Which TCP port numbers should and should not be spoofed can be stored in the TSK 280. The TSK 280 is also re-configurable to allow a user or operator to reconfigure the TCP port numbers which should and should not be spoofed. The TSK 280 also permits a user or operator to control which TCP connections are to be spoofed, based on other criteria. In general, a decision on whether to spoof a TCP connection may be based on any field within a TCP packet. The TSK 280 permits a user to specify which fields to examine and which values in these fields identify TCP connections that should or should not be spoofed. Another example of a potential use for this capability is for the user or operator to select the IP address of the TCP packet in order to control for which users TCP spoofing is performed. The TSK 280 also permits a user to look at multiple fields at the same time. As a result, the TSK 280 permits a user or operator to use multiple criteria for selecting TCP connections to spoof. For example, by selecting both the IP address and the TCP port number fields, the system operator can enable TCP spoofing for only specific applications from specific users.

The user configurable rules may include five exemplary criteria which can be specified by the user or operator in producing a selective TCP spoofing rule: Destination IP address; Source IP address; TCP port numbers (which may apply to both the TCP destination and source port numbers);

TCP options; and IP differentiated services (DS) field. However, as indicated above, other fields within the TCP packet may be used.

As discussed above, in addition to supporting selective TCP spoofing rules for each of these criterion, AND and OR combination operators can be used to link criteria together. For example, using the AND combination operator, a rule can be defined to disable TCP spoofing for FTP data received from a specific host. Also, the order in which the rules are specified may be significant. It is possible for a connection to match the criteria of multiple rules. Therefore, the TSK 280 can apply rules in the order specified by the operator, taking the action of the first rule that matches. A default rule may also be set which defines the action to be taken for TCP connections which do not match any of the defined rules. The set of rules selected by the operator may be defined in a selective TCP spoofing selection profile.

As an example, assuming sufficient buffer space has been allocated to spoof five TCP connections, if four low speed applications (i.e., applications which, by their nature, do not require high-speed) bring up connections along with one high-speed application, the high-speed connection has access to only ⅕ of the available spoofing buffer space. Further, if five low speed connections are brought up before the high-speed connection, the high-speed connection cannot be spoofed at all. Using the TSK 280 selective spoofing mechanism, the low speed connections are not allocated any spoofing buffer space. Therefore, the high-speed connection always has access to all of the buffer space, improving its performance with respect to an implementation without the selective TCP spoofing feature of the TSK 280.

The TSK 280 also facilitates spoofing of the conventional three-way handshake. Three-Way Handshake Spoofing involves locally responding to a connection request to bring up a TCP connection in parallel with forwarding the connection requests across the backbone link 130 (FIG. 1). This allows the originating IP host (for example, 110) to reach the point of being able to send the data it must send at local speeds, i.e. speeds that are independent of the latency of the backbone link 130. Three-way Handshake Spoofing allows the data that the IP host 110 needs to send to be sent to the destination IP host 150 without waiting for the end-to-end establishment of the TCP connection. For backbone links 130 with high latency, this significantly reduces the time it takes to bring up the TCP connection and, more importantly, the overall time it takes to get a response (from an IP host 150) to the data the IP host 110 sends.

A specific example in which this technique is useful relates to an Internet web page access application. With three-way handshake spoofing, an IP host's request to retrieve a web page can be on its way to a web server without waiting for the end-to-end establishment of the TCP connection, thereby reducing the time it takes to download the web page.

With Local Data Acknowledgement, the TSK 280 in the network gateway 120 (for example) locally acknowledges data segments received from the IP host 110. This allows the sending IP host 110 to send additional data immediately. More importantly, TCP uses received acknowledgements as signals for increasing the current TCP window size. As a result, local sending of the acknowledgements allows the sending IP host 110 to increase it TCP window at a much faster rate than supported by end-to-end TCP acknowledgements. The TSK 280 (the spoofer) takes on the responsibility for reliable delivery of the data which it has acknowledged.

In the BPK 282, multiple TCP connections are multiplexed onto and carried by a single backbone connection. This improves system performance by allowing the data for multiple TCP connections to be acknowledged by a single backbone connection acknowledgement (ACK), significantly reducing the amount of acknowledgement traffic required to maintain high throughput across the backbone link 130. In addition, the BPK 282 selects a backbone connection protocol that is optimized to provide high throughput for the particular link. Different backbone connection protocols can be used by the BPK 282 with different backbone links without changing the fundamental TCP spoofing implementation. The backbone connection protocol selected by the BPK 282 provides appropriate support for reliable, high-speed delivery of data over the backbone link 130, hiding the details of the impairments (for example high latency) of the link from the TCP spoofing implementation.

The multiplexing by the BPK 282 allows for the use of a backbone link protocol which is individually tailored for use with the particular link and provides a technique to leverage the performance of the backbone link protocol with much less dependency upon the individual performance of the TCP connections being spoofed than conventional methods. Further, the ability to tailor the backbone protocol for different backbone links makes the present invention applicable to many different systems.

The PEP 200 may optionally include a data compression kernel 290 for compressing TCP data and an encryption kernel 292 for encrypting TCP data. Data compression increases the amount of data that can be carried across the backbone connection. Different compression algorithms can be supported by the data compression kernel 290 and more than one type of compression can be supported at the same time. The data compression kernel 290 may optionally apply compression on a per TCP connection basis, before the TCP data of multiple TCP connections is multiplexed onto the backbone connection or on a per backbone connection basis, after the TCP data of multiple TCP connections has been multiplexed onto the backbone connection. Which option is used is dynamically determined based on user configured rules and the specific compression algorithms being utilized. Exemplary data compression algorithms are disclosed in U.S. Pat. Nos. 5,973,630, 5,955,976, the entire contents of which are hereby incorporated by reference. The encryption kernel 292 encrypts the TCP data for secure transmission across the backbone link 130. Encryption may be performed by any conventional technique. It is also understood that the corresponding spoofer (in the example outlined above, the network gateway 140) includes appropriate kernels for decompression and decryption, both of which may be performed by any conventional technique.

The PK 284 provides prioritized access to the backbone link capacity. For example, the backbone connection can actually be divided into N (N>1) different sub-connections, each having a different priority level. In one exemplary embodiment, four priority levels can be supported. The PK 284 uses user-defined rules to assign different priorities, and therefore different sub-connections of the backbone connection, to different TCP connections. It should be noted that PK 284 may also prioritize non-TCP traffic (e.g., UDP (User Datagram Protocol) traffic) before sending the traffic across the backbone link 130.

The PK 284 also uses user-defined rules to control how much of the backbone link 130 capacity is available to each priority level. Exemplary criteria which can be used to determine priority include the following: Destination IP address; Source IP address; IP next protocol; TCP port numbers (which may apply to both the TCP destination and source port numbers); UDP port numbers (which may apply to both the UDP destination and source port numbers); and IP differentiated services (DS) field. The type of data in the TCP data packets may also be used as a criterion. For example, video data could be given highest priority. Mission critical data could also be given high priority. As with selective TCP spoofing, any field in the IP packet can be used by PK 284 to determine priority. However, it should be noted that under some scenarios the consequence of using such a field may cause different IP packets of the same flow (e.g., TCP connection) to be assigned different priorities; these scenarios should be avoided.

As mentioned above, in addition to supporting selective prioritization rules for each of these criteria, AND and OR combination operators can be used to link criteria together. For example, using the AND combination operator, a rule can be defined to assign a priority for SNMP data received from a specific host. Also, the order in which the rules are specified may be significant. It is possible for a connection to match the criteria of multiple rules. Therefore, the PK 284 can apply rules in the order specified by the operator, taking the action of the first rule that matches. A default rule may also be set which defines the action to be taken for IP packets which do not match any of the defined rules. The set of rules selected by the operator may be defined in a prioritization profile.

As regards the path selection functionality, the PSK 286 is responsible for determining which path an IP packet should take to reach its destination. The path selected by the PSK 286 can be determined by applying path selection rules. The PSK 286 also determines which IP packets should be forwarded using an alternate path and which IP packets should be dropped when one or more primary paths fail. Path selection parameters can also be configured using profiles. The path selection rules may be designed to provide flexibility with respect to assigning paths while making sure that all of the packets related to the same traffic flow (e.g., the same TCP connection) take the same path (although it is also possible to send segments of the same TCP connection via different paths, this segment "splitting" may have negative side effects). Exemplary criteria that can be used to select a path include the following: priority of the IP packet as set by the PK 284 (should be the most common criterion), Destination IP address; Source IP address; IP next protocol; TCP port numbers (which may apply to both the TCP destination and source port numbers); UDP port numbers (which may apply to both the UDP destination and source port numbers); and IP differentiated services (DS) field. Similar to selective TCP spoofing and prioritization, the PSK 284 may determine a path by using any field in the IP packet.

As with the prioritization criteria (rules) the AND and OR combination operators can be used to link criteria together. For example, using the AND combination operator, a rule can be defined to select a path for SNMP data received from a specific host. Also, the order in which the rules are specified may be significant. It is possible for a connection to match the criteria of multiple rules. Therefore, the PSK 286 can apply rules in the order specified by the operator, taking the action of the first rule that matches. A default rule may also be set which defines the action to be taken for IP packets which do not match any of the defined rules. The set of rules selected by the operator may be defined in a path selection profile.

By way of example, a path selection rule may select the path based on any of the following path information in which IP packets match the rule: a primary path, a secondary path, and a tertiary path. The primary path may be specified in any path selection rule. The secondary path is used only when the primary path has failed. If no secondary path is specified, any IP packets that match the rule can be discarded when the primary path fails. The tertiary path is specified only if a secondary path is specified. The tertiary path is selected if both the primary and secondary paths have failed. If no tertiary path is specified, any IP packets that match the rule can be discarded when both the primary and secondary paths fail. Path selection may be generalized such that the path selection rule can select up to N paths where the Nth path is used only if the (N−1)th path fails. The example above where N=3 is merely illustrative, although N is typically a fairly small number.

By way of example, the operation of the system 100 is described as follows. First, a backbone connection is established between the PEPs 200 of two network gateways 120, 140 (i.e., the two spoofers), located at each end of the backbone link 130 for which TCP spoofing is desired. Whenever an IP host 110 initiates a TCP connection, the TSK 280 of the PEP 200 local to the IP host 110 checks its configured selective TCP spoofing rules. If the rules indicate that the connection should not be spoofed, the PEP 200 allows the TCP connection to flow end-to-end unspoofed. If the rules indicate that the connection should be spoofed, the spoofing PEP 200 locally responds to the IP host's TCP three-way handshake. In parallel, the spoofing PEP 200 sends a message across the backbone link 130 to its partner network gateway 140 asking it to initiate a TCP three-way handshake with the IP host 150 on its side of the backbone link 130. Data is then exchanged between the IP host 110, 150 with the PEP 200 of the network gateway 120 locally acknowledging the received data and forwarding it across the backbone link 130 via the high-speed backbone connection, compressing the data as appropriate based on the configured compression rules. The priority of the TCP connection is determined when the connection is established. The BPK 282 can multiplex the connection with other received connections over a single backbone connection, the PK 284 determines the priority of the connection and the PSK 286 determines the path the connection is to take.

The PEP 200, as described above, advantageously improves network performance by allocating TCP spoofing-related resources, such as buffer space, control blocks, etc., only to TCP connections for which spoofing is beneficial; by spoofing the three-way handshake to decrease data response time; by reducing the number of ACKs which are transmitted by performing local acknowledgement and by acknowledging multiple TCP connections with a single ACK; by performing data compression to increase the amount of data that can be transmitted; by assigning priorities to different connections; and by defining multiple paths for connections to be made.

Figure 3:
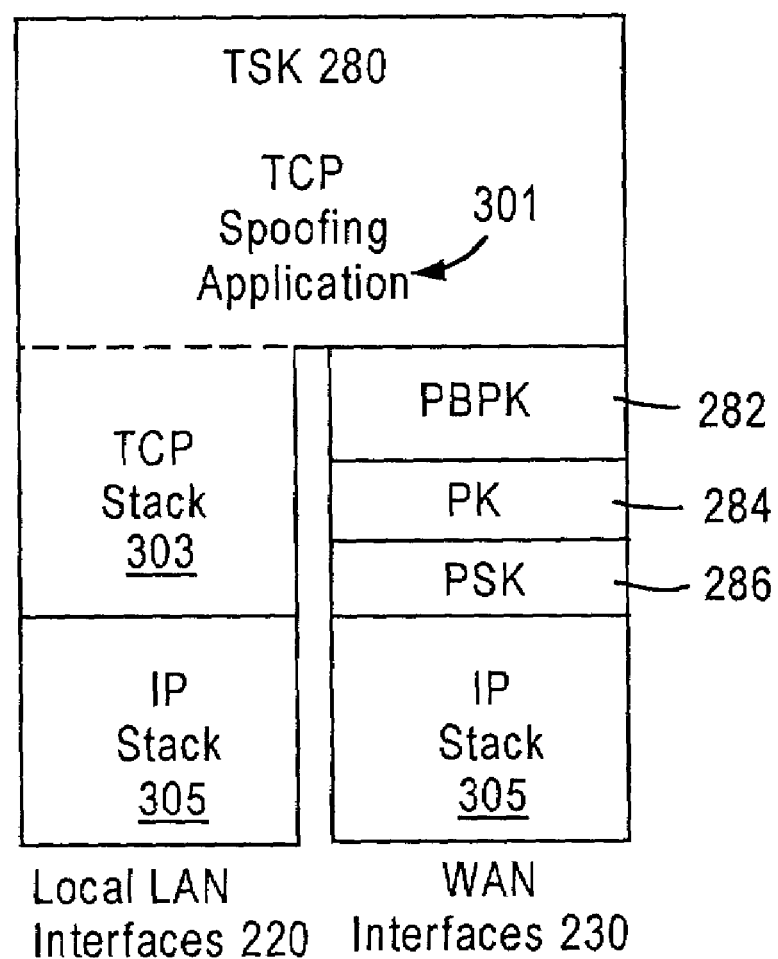
FIG. 3 is a diagram of a TCP Spoofing Kernel (TSK) utilized in the environment of FIG. 2.

FIG. 3 shows an exemplary stack which illustrates the relationship between the TCP stack and the PEP kernels 280, 282, 284, 286 of the present invention. The TSK 280 is primarily responsible for functions related to TCP spoofing. The TSK 280, in an exemplary embodiment, includes two basic elements: a transport layer that encompasses a TCP stack 303 and an IP stack 305; and a TCP spoofing application 301. The transport layer is responsible for interacting with the TCP stacks (e.g., 303) of IP hosts 110 connected to a local LAN interface 220 of a PEP 210.

The TSK 280 implements the TCP protocol which includes the appropriate TCP state machines and terminates spoofed TCP connections. The TCP spoofing application 301 rests on top of the transport layer and act as the application that receives data from and sends data to the IP hosts 110 applications. Because of the layered architecture of the protocol, the TCP spoofing application 301 isolates the details of TCP spoofing from the transport layer, thereby allowing the transport layer to operate in a standard fashion.

As shown in FIG. 3, the TCP spoofing application 301 can also interface to the BPK 282 associated with the WAN interfaces 230. The BPK 282 performs backbone protocol maintenance, implementing the protocol by which the network gateways 120, 140 (in FIG. 1) communicate. The BPK 282 provides reliable delivery of data, uses a relatively small amount of acknowledgement traffic, and supports generic backbone use (i.e., use not specific to the TSK 280); one such example is the reliable data protocol (RDP).

The BPK 282 lies above the PK 284 and the PSK 286, according to an exemplary embodiment. The PK 284 is responsible for determining the priority of IP packets and then allocating transmission opportunities based on priority. The PK 284 can also control access to buffer space by controlling the queue sizes associated with sending and receiving IP packets. The PSK 286 determines which path an IP packet should take to reach its destination. The path selected by the PSK 286 can be determined applying path selection rules. PSK 286 may also determine which IP packet should be forwarded using an alternate path and which packets should be dropped when one or more primary paths fail.

Figure 4B:
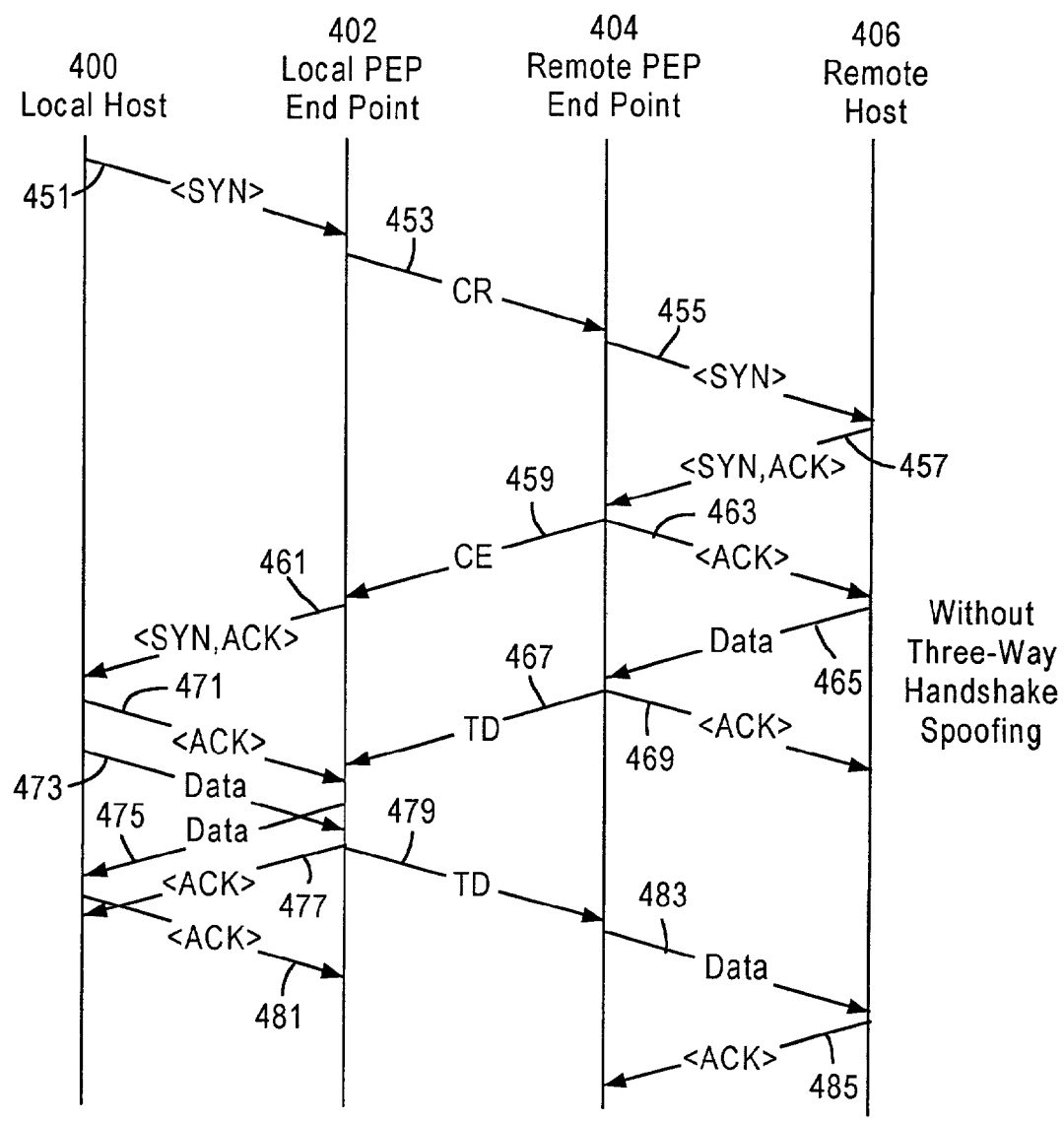

FIGS. 4A and 4B show flow diagrams of the establishment of a spoofed TCP connection utilizing three-way handshake spoofing and without three-way handshake spoofing, respectively. The TCP Spoofing Kernel 280 establishes a spoofed TCP connection when a TCP <SYN> segment is received from its local LAN or a Connection Request message from its TSK peer. It is noted that the three-way handshake spoofing may be disabled to support an end to end maximum segment size (MSS) exchange which is more fully described below. For the purpose of explanation, the spoofed TCP connection establishment process is described with respect to a local host 400, a local PEP end point 402, a remote PEP end point 404, and a remote host 406. As mentioned previously, the TSK 280 within each of the PEP end points 402 and 404 provides the spoofing functionality.

In step 401, the local host 400 transmits a TCP <SYN> segment to the local PEP end point 402 at a local LAN interface 220. When a TCP segment is received from the local LAN interface 220, the platform environment 402 determines whether there is already a TCP connection control block (CCB) assigned to the TCP connection associated with the TCP segment. If there is no CCB, the environment 402 checks whether the TCP segment is a <SYN> segment that is being sent to a non-local destination. If so, the <SYN> segment represents an attempt to bring up a new (non-local) TCP connection, and the environment 402 passes the segment to the TCP Spoofing Kernel 280 to determine the TCP connection's disposition. When a TCP <SYN> segment is received from the local LAN interface 220 for a new TCP connection, the TCP Spoofing Kernel 280 first determines if the connection should be spoofed. If the connection should be spoofed, TSK 280 uses (in an exemplary embodiment) the priority indicated in the selected TCP spoofing parameter profile and the peer index (provided by the environment 210 with the TCP <SYN> segment) to construct the handle of the backbone connection which should be used to carry this spoofed TCP connection. In the exemplary embodiment, the peer index is used as the 14 high order bits of the handle and the priority is used as the two low order bits of the handle. The backbone connection handle is then used (via the TSK control block (TCB) mapping table) to find the TCB associated with the backbone connection. TSK 280 of PEP end point 402 then checks whether the backbone connection is up. If the backbone connection is up, TSK 280 determines whether the number of spoofed TCP connections that are already using the selected backbone connection is still currently below the CCB resource limit. The CCB resource limit is the smaller of the local number of CCBs (provided as a parameter by the platform environment 210) and the peer number of CCBs (received in the latest TSK peer parameters (TPP) message from the TSK peer) available for this backbone connection. If the number of connections is still below the limit, TSK 280 of PEP end point 402 assigns a unique TCP connection identifier (e.g., a free CCB mapping table entry index) to the connection and calls the environment 210 to allocate a TCP connection control block for the connection.

TSK 280 of PEP end point 402 returns the TCP <SYN> segment back to the environment 210 to be forwarded unspoofed if any of the above checks fail. In other words, the following conditions result in the TCP connection being unspoofed. First, if the selective TCP spoofing rules indicate that the connection should not be spoofed. Also, there is no backbone connection for the priority at which the TCP connection should be spoofed (indicated by the absence of a TCB for the backbone connection). No spoofing is performed if the backbone connection is down. Additionally, if the number of spoofed TCP connections that are already using the backbone connection reaches or exceeds a predetermined threshold, then no spoofing is performed. Further, if there is no CCB mapping table entry available or there is no CCB available from the CCB free pool, then the TCP connection is forwarded unspoofed. For the case in which there is no backbone connection, TSK 280 of PEP end point 402 may also post an event to alert the operator that there is a mismatch between the configured TCP spoofing parameter profiles and the configured set of backbone connections.

Continuing with the example, if all of the above checks pass, TSK 280 of PEP end point 402 writes the backbone connection handle into the buffer holding the TCP <SYN> segment. It is noted that this is not done until a CCB is successfully allocated by the platform environment 402, because the environment does not count the buffer unless a CCB is successfully allocated. TSK 280 then copies the parameters from the selected TCP spoofing parameter profile into the CCB. Consequently, relevant information (e.g., the maximum segment size that is advertised by the host (if smaller than the configured MSS), the initial sequence number, and etc.) is copied out of the TCP <SYN> segment and stored in the CCB. It is noted that the source and destination IP addresses and source and destination TCP port numbers will already have been placed into the CCB by the platform environment 402 when the CCB was allocated; the environment 402 uses this information to manage CCB hash function collisions.

After allocating and setting up the CCB, the TCP Spoofing Kernel 280 of PEP end point 402 constructs a Connection Request (CR) message, per step 403, and sends it to its TSK peer associated with the remote PEP end point 404. The CR message basically contains all of the information extracted from the TCP spoofing parameter profile and the TCP <SYN> segment and stored in the local CCB, e.g., the source and destination IP addresses, the source and destination TCP port numbers, the MSS value, etc., with the exception of fields that have only local significance, such as the initial sequence number. (The IP addresses and TCP port numbers are placed into a TCP connection header.) In other words, the CR message contains all of the information that the peer TSK of PEP end point 404 requires to set up its own CCB. To complete the local connection establishment, the TCP Spoofing Kernel 280 of the local PEP end point 402 sends a TCP <SYN,ACK> segment to the local host 400 in response to the <SYN> segment received, per step 405. TSK 280 of PEP end point 402 performs step 405 simultaneously with the step of sending the Connection Request message (i.e., step 403), if three-way handshake spoofing is enabled. Otherwise, TSK 280 of 402 waits for a Connection Established (CE) message from its TSK peer of the remote PEP end point 404 before sending the <SYN,ACK> segment. In an exemplary embodiment, TSK 280 of PEP end point 402 selects a random initial sequence number (as provided in IETF (Internet Engineering Task Force) RFC 793 which is incorporated herein by reference in its entirety) to use for sending data.

If three-way handshake spoofing is disabled, the MSS value sent in the <SYN,ACK> segment is set equal to the MSS value received in the CE message. If three-way handshake spoofing is enabled, the MSS value is determined from the TCP spoofing parameter profile selected for the connection (and the configured path maximum transmission unit (MTU)). For this case, TSK 280 of PEP end point 402 then compares the MSS value received in the Connection Established message, when it arrives, to the value it sent to the local host in the TCP <SYN,ACK> segment. If the MSS value received in the CE message is smaller than the MSS value sent to the local host, a maximum segment size mismatch exists. (If an MSS mismatch exists, TSK may need to adjust the size of TCP data segments before sending them.) After sending the TCP <SYN,ACK> segment (step 405), TSK 280 of the local PEP end point 402 is ready to start accepting data from the local host 400. In step 407, the local host 400 transmits an <ACK> segment to the TSK 280 of PEP end point 402; thereafter, the local host forwards, as in step 409 data to the TSK 280 of PEP end point 402 as well. When threeway handshake spoofing is being used, TSK 280 does not need to wait for the Connection Established message to arrive from its TSK peer before accepting and forwarding data. As seen in FIG. 4A, in step 411, TSK 280 of the local PEP end point 402 sends an <ACK> segment to the local host and simultaneously sends the TCP data (TD) from the local host 400 to the peer TSK of PEP end point 404 (per step 413) prior to receiving a CE message from the peer TSK of PEP end point 404.

However, TSK 280 of PEP end point 402 does not accept data from its TSK peer of PEP end point 404 until after the CE message has been received. TSK 280 of PEP end point 402 does not forward any data received from its TSK peer of PEP end point 404 to the local host 400 until it has received the TCP <ACK> segment indicating that the local host has received the <SYN,ACK> segment (as in step 407).

When a Connection Request message is received from a peer TSK (step 403), the TCP Spoofing Kernel 280 allocates a CCB for the connection and then stores all of the relevant information from the CR message in the CCB. TSK 280 of PEP end point 404 then uses this information to generate a TCP <SYN> segment, as in step 415, to send to the remote host 406. The MSS in the <SYN> segment is set to the value received from the TSK peer of PEP end point 404. When the remote host responds with a TCP <SYN,ACK> segment (step 417), TSK 280 of PEP end point 404 sends a Connection Established message to its TSK peer of the PEP end point 402 (step 419), including in the CE message the MSS that is sent by the local host in the <SYN,ACK> segment. TSK 280 of PEP end point 404 also responds, as in step 421, with a TCP <ACK> segment to complete the local threeway handshake. The peer TSK of PEP end point 404 then forwards the data that is received from TSK 280 to the host, per step 423. Concurrently, in step 425, the remote host 406 sends data to the peer TSK of PEP end point 404, which acknowledges receipt of the data by issuing an <ACK> segment to the host 406, per step 427. Simultaneously with the acknowledgement, the data is sent to TSK 280 of PEP end point 402 (step 429).

At this point, TSK 280 is ready to receive and forward data from either direction. TSK 280 forwards the data, as in step 431 to the local host which, in turn, sends an <ACK> segment (step 433). If the data arrives from its TSK peer before a <SYN,ACK> segment response is received from the local host, the data is queued and then sent after the <ACK> segment is sent in response to the <SYN,ACK> segment (when it arrives).

Turning now to FIG. 4B, a spoofed TCP connection is established with the three-way handshake spoofing disabled. Under this scenario, the local host 400 transmits a TCP <SYN> segment, as in step 451, to the TSK 280 within the local PEP end point 402. Unlike the TCP connection establishment of FIG. 4A, the local PEP end point 402 does not respond to the a TCP <SYN> segment with a <SYN,ACK> segment, but merely forwards a CR message to the remote PEP end point 404 (step 453). Next, in step 455, sends a TCP <SYN> segment to the remote host 406. In response, the remote host 406 transmit a TCP <SYN,ACK> segment back to the remote PEP end point 404 (per step 457). Thereafter, the remote PEP end point 404, as in step 459, forwards a CE message to the local PEP end point 402 which subsequently issues a <SYN,ACK> segment to the local host 400, per step 461. Simultaneous with step 459, the remote PEP end point 404 issues an <ACK> segment to the remote host 406 (step 463).

Upon receiving the <ACK> segment, the remote host 406 may begin transmission of data, as in step 465. Once the PEP end point 404 receives the data from the remote host 406, the remote PEP end point 404 simultaneously transmits, as in step 467, the TD message to the local PEP end point 402 and transmits an <ACK> segment to the remote host 406 to acknowledge receipt of the data (step 469).

Because the local host 400 has received a <SYN,ACK> segment from the local PEP end point 402, the local host 400 acknowledges the message, per step 471. Thereafter, the local host 400 transmits data to the local PEP end point 402. In this example, before the local PEP end point 402 receives the data from the local host 400, the local PEP end point 402 forwards the data that originated from the remote host 406 via the TD message (step 467) to the local host 400, per step 475.

In response to the data received (in step 473), the local PEP end point 402 issues an <ACK> segment, as in step 477, and forwards the data in a TD message to the remote PEP end point 404, per step 479. The local host 400 responds to the received data of step 475 with an <ACK> segment to the local PEP end point 402 (step 481). The remote PEP end point 404 sends the data from the local host 400, as in step 483, upon receipt of the TD message. After receiving the data, the remote host 406 acknowledges receipt by sending an <ACK> segment back to the remote PEP end point 404, per step 485.

Figure 5:
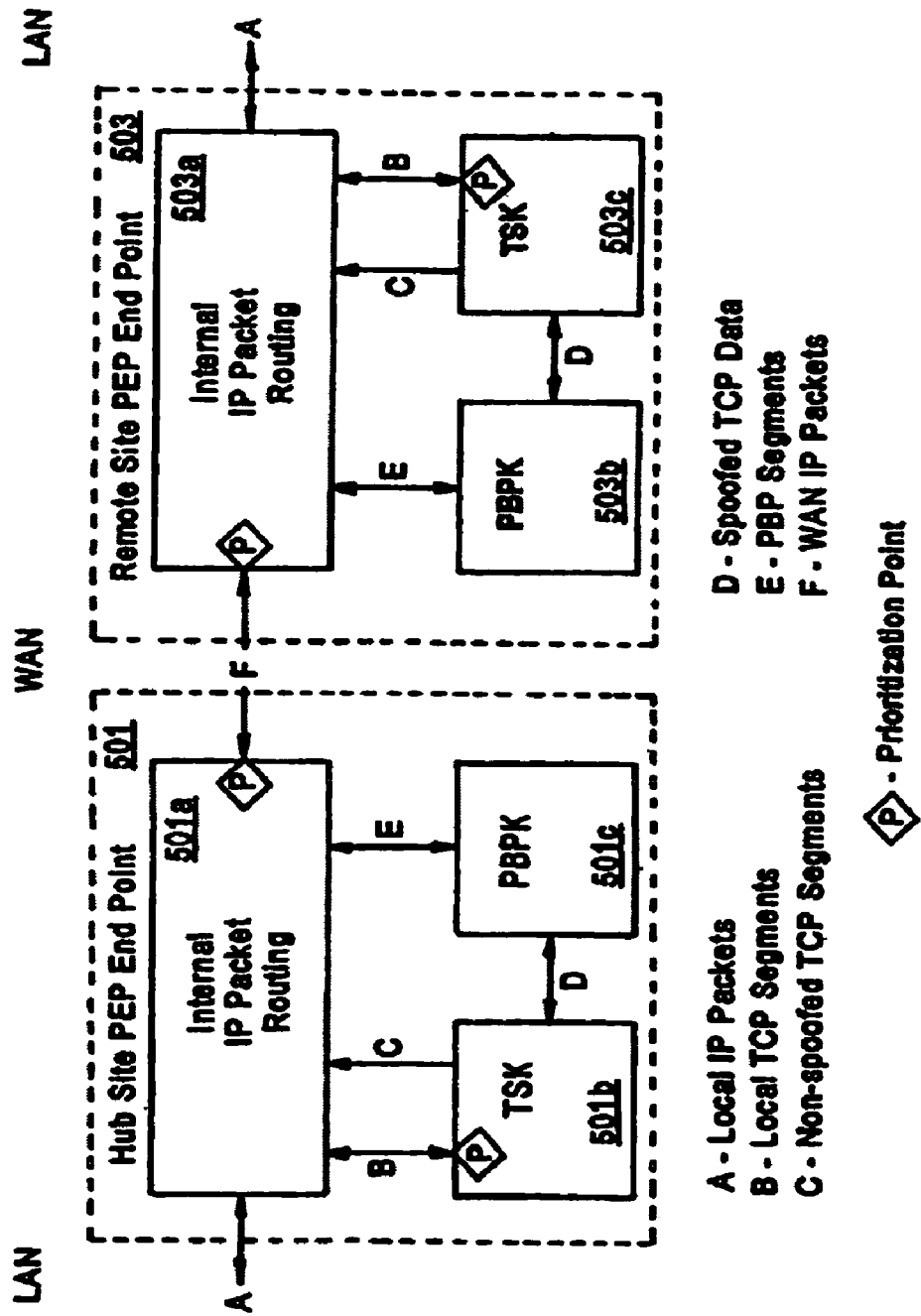
FIG. 5 is a diagram of a PEP packet flow between two PEP end points, according to an embodiment of the present invention.

FIG. 5 shows the flow of packets with the PEP architecture, according to one embodiment of the present invention. As shown, a communication system 500 includes a hub site (or local) PEP end point 501 that has connectivity to a remote site PEP end point 503 via a backbone connection. By way of example, at the hub site (or local site) and at each remote site, PEP end points 501 and 503 handle IP packets. PEP end point 501 includes an Internal IP packet routing module 501*a* that receives local IP packets and exchanges these packets with a TSK 501*b* and a BPK 501*c*. Similarly, the remote PEP end point 503 includes an internal IP packet routing module 503*a* that is in communication with a TSK 503*b* and a BPK 503*c*. Except for the fact that the hub site PEP end point 501 may support many more backbone protocol connections than a remote site PEP end point 503, hub and remote site PEP processing is symmetrical.

For local-to-WAN traffic (i.e., upstream direction), the PEP end point 501 receives IP packets from its local interface 220 (FIG. 2). Non-TCP IP packets are forwarded (as appropriate) to the WAN interface 230 (FIG. 2). TCP IP packets are internally forwarded to TSK 501*b*. TCP segments which belong to connections that are not be spoofed are passed back by the spoofing kernel 501*b* to the routing module 501*a* to be forwarded unmodified to the WAN interface 230. For spoofed TCP connections, the TCP spoofing kernel 501*a* locally terminates the TCP connection. TCP data that is received from a spoofed connection is passed from the spoofing kernel 501*a* to the backbone protocol kernel 501*c*, and then multiplexed onto the appropriate backbone protocol connection. The backbone protocol kernel 501*c* ensures that the data is delivered across the WAN.

For WAN-to-local traffic (i.e., downstream direction), the remote PEP end point 503 receives IP packets from its WAN interface 230 (FIG. 2). IP packets that are not addressed to the end point 503 are simply forwarded (as appropriate) to the local interface 220 (FIG. 2). IP packets addressed to the end point 503, which have a next protocol header type of "PEP Backbone Protocol (PBP)" are forwarded to the backbone protocol kernel 503*c*. The backbone protocol kernel 503*c* extracts the TCP data and forwards it to the TCP spoofing kernel 503*b* for transmission on the appropriate spoofed TCP connection. In addition to carrying TCP data, the backbone protocol connection is used by the TCP spoofing kernel 501*b* to send control information to its peer TCP spoofing kernel 503*b* in the remote PEP end point 503 to coordinate connection establishment and connection termination.

Prioritization maybe applied at four points in the system 500 within routing 501*a* and TSK 501*b* of PEP end point 501, and within routing 503*a*, and TSK 503*b* of PEP end point 503. In the upstream direction, priority rules are applied to the packets of individual TCP connections at the entry point to the TCP spoofing kernel 501*b*. These rules allow a customer to control which spoofed applications have, higher and lower priority access to spoofing resources. Upstream prioritization is also applied before forwarding packets to the WAN. This allows a customer to control the relative priority of spoofed TCP connections with respect to unspoofed TCP connections and non-TCP traffic (as well as to control the relative priority of these other types of traffic with respect to each other). On the downstream side, prioritization is used to control access to buffer space and other resources in the PEP end point 503, generally and with respect to TCP spoofing.

At the hub (or local) site, the PEP end point 501 may be implemented in a network gateway (e.g. an IP Gateway), according to one embodiment of the present invention. At the remote site, the PEP end point 503 may be implemented in the remote site component, e.g. a satellite terminal such as a Multimedia Relay, a Multimedia VSAT or a Personal Earth Station (PES) Remote.

The architecture of system 500 provides a number of advantages. First, TCP spoofing may be accomplished in both upstream and downstream directions. Additionally, the system supports spoofing of TCP connection startup, and selective TCP spoofing with only connections that can benefit from spoofing actually spoofed. Further, system 500 enables prioritization among spoofed TCP connections for access to TCP spoofing resources (e.g., available bandwidth and buffer space). This prioritization is utilized for all types of traffic that compete for system resources.

With respect to the backbone connection, the system 500 is suitable for application to a satellite network as the WAN. That is, the backbone protocol is optimized for satellite use in that control block resource requirements are minimized, and efficient error recovery for dropped packets are provided. The system 500 also provides a feedback mechanism to support maximum buffer space resource efficiency. Further, system 500 provides reduced acknowledgement traffic by using a single backbone protocol ACK to acknowledge the data of multiple TCP connections.

Figure 6:
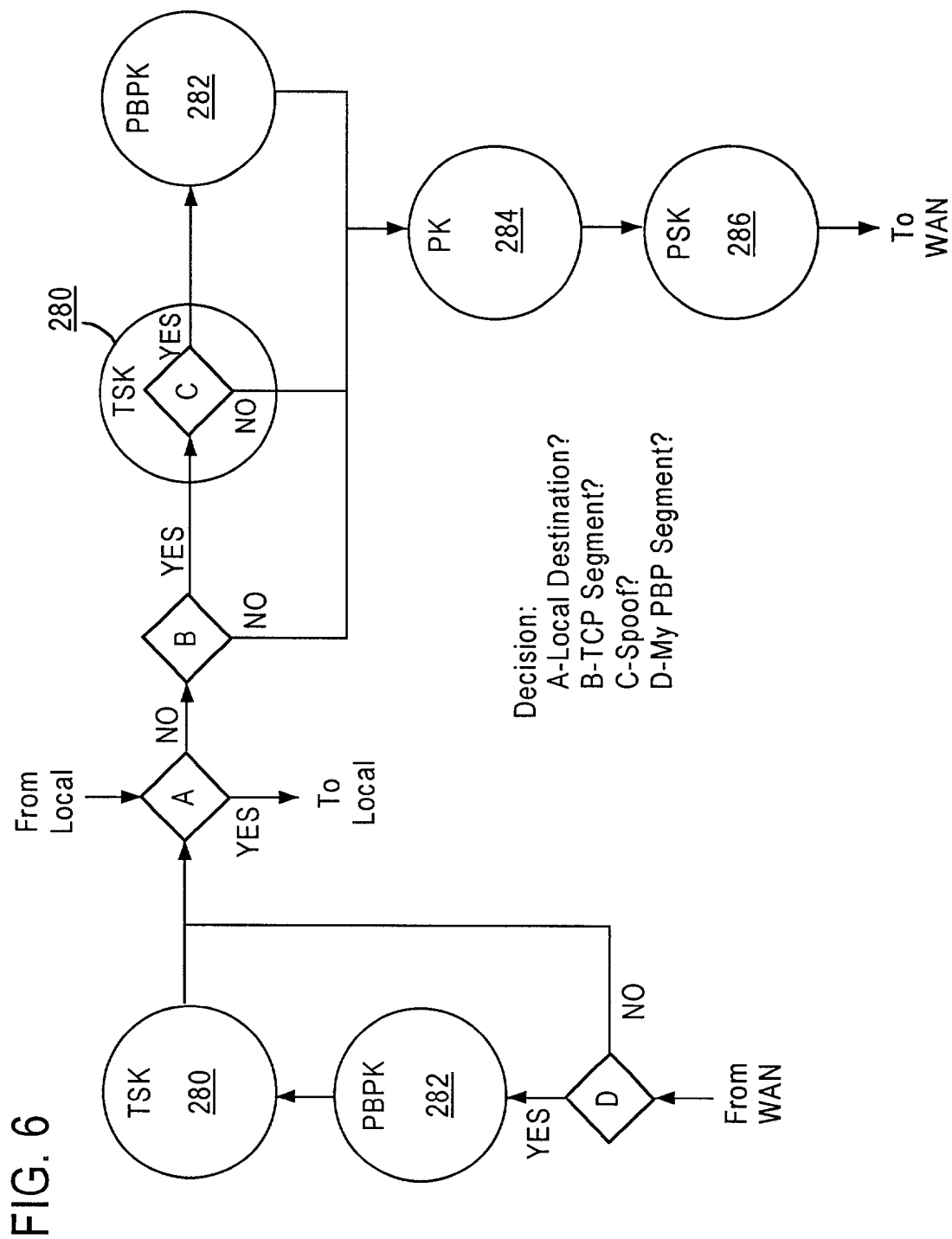
FIG. 6 is a diagram of an IP (Internet Protocol) packet flow through a PEP end point, in accordance with an embodiment of the present invention.

FIG. 6 illustrates the flow of IP packets through a PEP end point, according to an embodiment of the present invention. When IP packets are received at the local LAN interface 220, the PEP end point 210 determines (as shown by decision point A), whether the packets are destined for a host that is locally situated; if so, the IP packets are forwarded to the proper local LAN interface 220. If the IP packets are destined for a remote host, then the PEP end point 210 decides, per decision point B, whether the traffic is a TCP segment. If the PEP end point 210 determines that in fact the packets are TCP segments, then the TSK 280 determines whether the TCP connection should be spoofed (decision point C). However, if the PEP end point 210 determines that the packets are not TCP segments, then the BPK 282 processes the traffic, along with the PK 284 and the PSK 286 for eventual transmission out to the WAN. It should be noted that the BPK 282 does not process unspoofed IP packets; i.e., the packets flow directly to PK 284. As seen in FIG. 6, traffic that is received from the WAN interface 230 is examined to determine whether the traffic is a proper PBP segment (decision point D) for the particular PEP end point 210; if the determination is in the affirmative, then the packets are sent to the BPK 282 and then the TSK 280.

Routing support includes routing between the ports of the PEP End Point 210 (FIG. 2), e.g., from one Multimedia VSAT LAN port to another. Architecturally, the functionalities of TCP spoofing, prioritization and path selection, fit between the IP routing functionality and the WAN. PEP functionality need not be applied to IP packets which are routed from local port to local port within the same PEP End Point 210. TCP spoofing, prioritization and path selection are applied to IP packets received from a local PEP End Point interface that have been determined to be destined for another site by the routing function.

Figure 7:
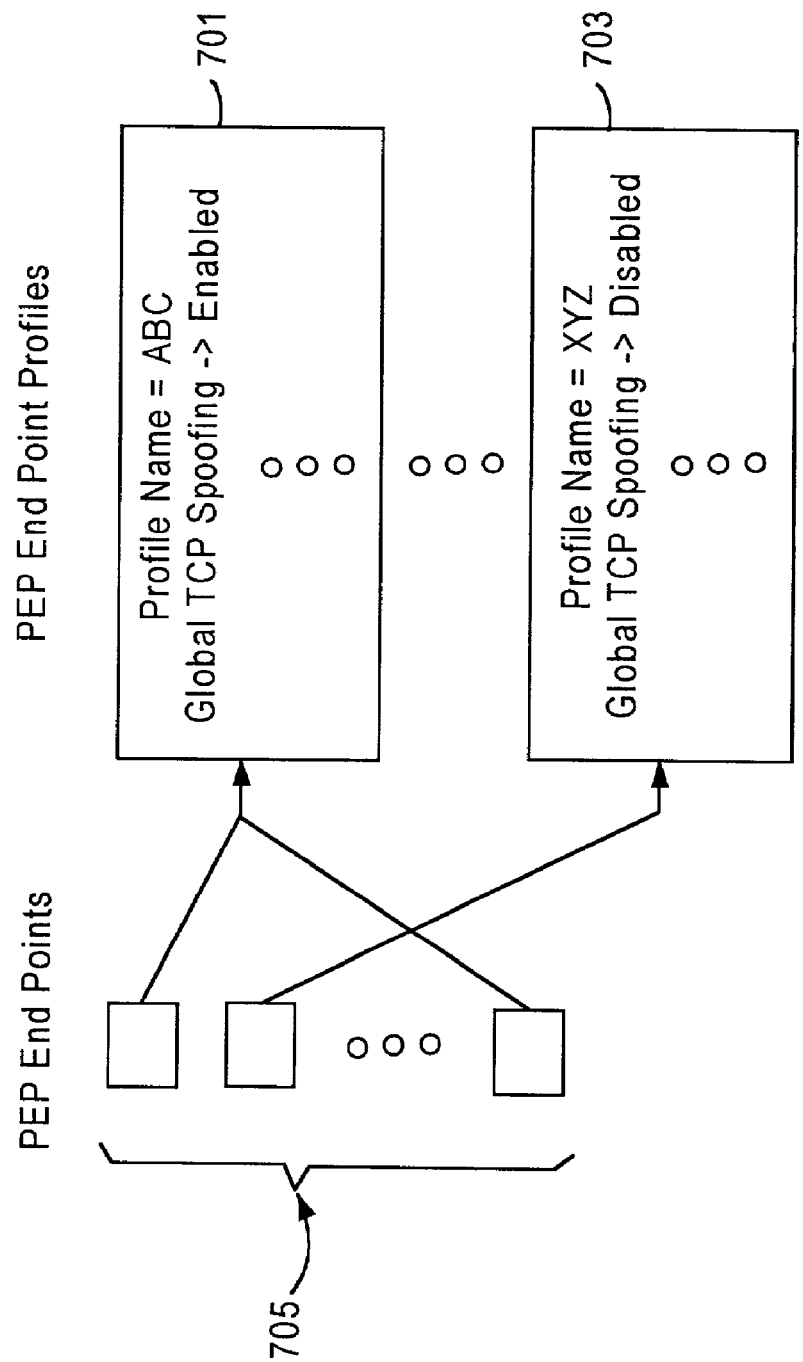
FIG. 7 is a diagram of PEP end point profiles utilized in the platform of FIG. 2.

FIG. 7 shows the relationship between PEP End Points and PEP End Point profiles, in accordance with an embodiment of the present invention. PEP parameters are primarily configured via a set of profiles 701 and 703 which are associated with one or more PEP end points 705. In an exemplary embodiment, PEP parameters are configured on a per PEP End Point basis, such as whether TCP spoofing is globally enabled. These parameters are configured in the PEP End Point profiles 701 and 703. It is noted that parameters that apply to specific PEP kernels may be configured via other types of profiles. Profiles 701 and 703 are a network management construct; internally, a PEP End Point 705 processes a set of parameters that are received via one or more files.

Whenever the PEP End Point 705 receives new parameters, the platform environment compares the new parameters to the existing parameters, figures out which of the PEP kernels are affected by the parameter changes, and then passes the new parameters to the affected kernels. In an exemplary embodiment, all parameters are installed dynamically. With the exception of parameters that are component specific (such as the IP addresses of a component), all parameters may be defined with default values.

As mentioned previously, the PEP end point 210 may be implemented in a number of different platforms, in accordance with the various embodiments of the present invention. These platforms may include an IP gateway, a Multimedia Relay, a Multimedia VSAT (Very Small Aperture Terminal), and a Personal Earth Station (PES) Remote, as shown in FIGS. 8–11, respectively. In general, as discussed in FIG. 2, the PEP end point 210 defines a local LAN interface 220 an interface through which the PEP End Point 210 connects to IP hosts located at the site. A WAN interface 230 is an interface through which the PEP End Point 210 connects to other sites. It is noted that a WAN interface 230 can physically be a LAN port. FIGS. 8–11, below, describe the specific LAN and WAN interfaces of the various specific PEP End Point platforms. The particular LAN and WAN interfaces that are employed depend on which remote site PEP End Points are being used, on the configuration of the hub and remote site PEP End Points and on any path selection rules which may be configured.

Figure 8:
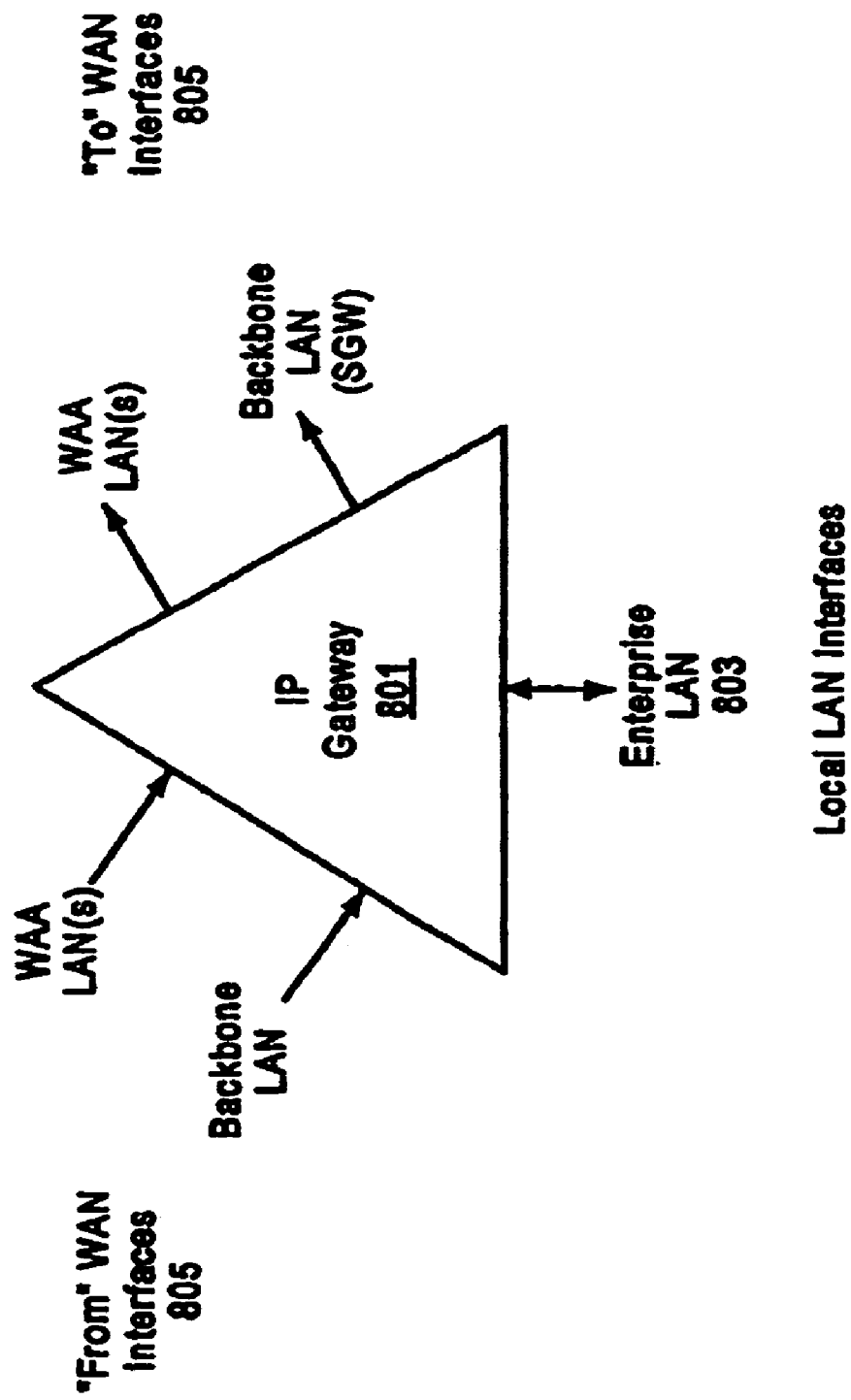
FIG. 8 is a diagram of the interfaces of a PEP end point implemented as an IP gateway, according to an embodiment of the present invention.

FIG. 8 shows the interfaces of the PEP end point implemented as an IP gateway, according to one embodiment of the present invention. By way of example, an IP Gateway 801 has a single local LAN interface, which is an enterprise interface 801. The IP Gateway 803 employs two WAN interfaces 805 for sending and receiving IP packets to and from remote site PEP End Points: a backbone LAN interface and a wide area access (WAA) LAN interface.

The backbone LAN interface 805 is used to send IP packets to remote site PEP End Points via, for example, a Satellite Gateway (SGW) and a VSAT outroute. A VSAT outroute can be received directly by Multimedia Relays (FIG. 9) and Multimedia VSATs (FIG. 10) (and is the primary path used with these End Points); however, IP packets can be sent to a PES Remote (FIG. 11) via a VSAT outroute.

Figure 9:
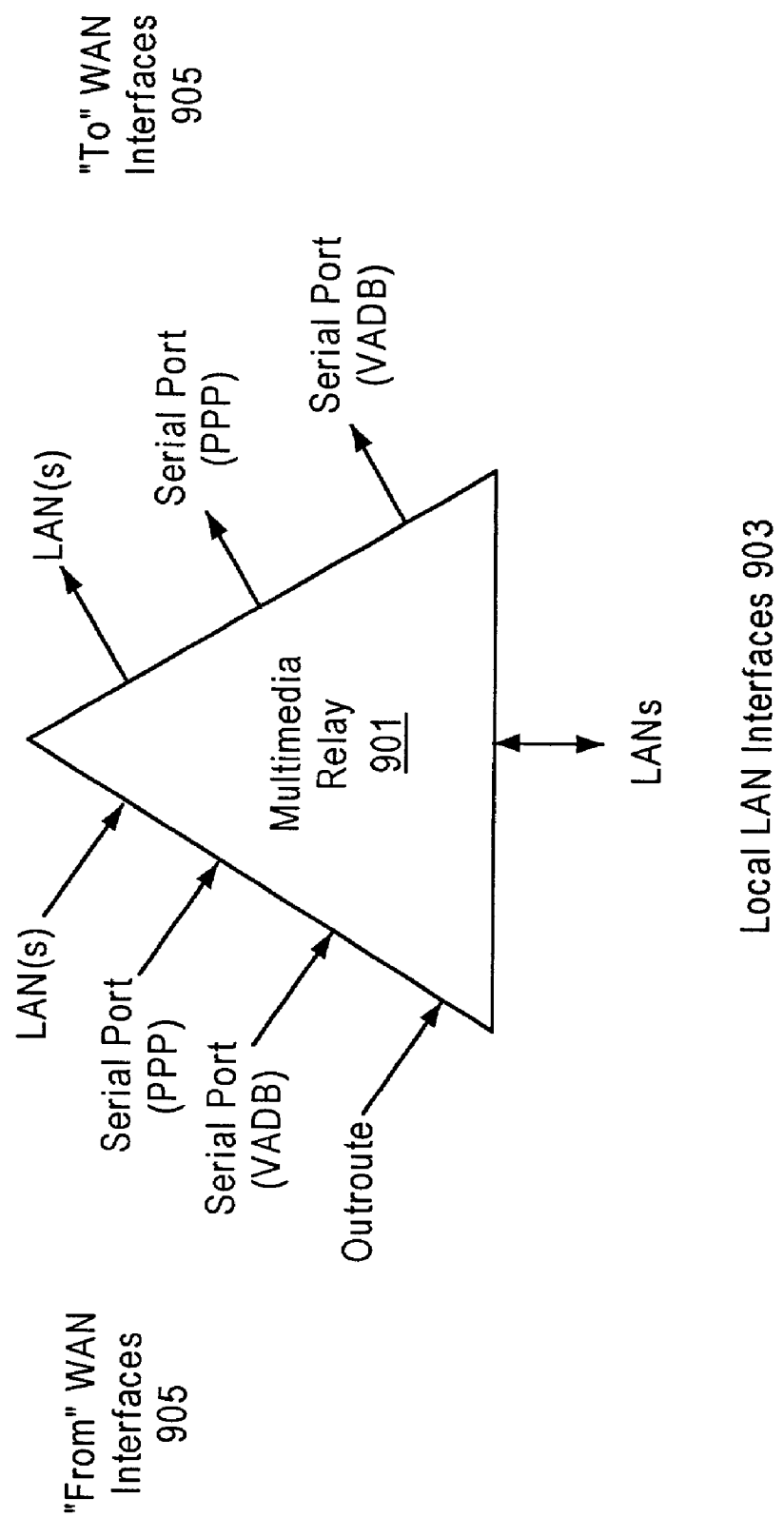
FIG. 9 is a diagram of the interfaces of a PEP end point implemented as a Multimedia Relay, according to an embodiment of the present invention.

FIG. 9 shows a Multimedia Relay implementation of a PEP end point, in accordance with an embodiment of the present invention. A Multimedia Relay has two or three local LAN interfaces 903. Additionally, the Multimedia Relay 901 has up to two WAN interfaces 905 for sending IP packets to hub site PEP End Points: one of its LAN interfaces and a PPP serial port interface, and four or five interfaces for receiving IP packets from hub site PEP End Points, a VSAT outroute, all of its LAN interfaces, and a PPP serial port interface. It is noted that a PPP (Point-to-Point Protocol) serial port interface and a LAN interface are generally not be used at the same time.

A Multimedia Relay 901 supports the use of all of its LAN interfaces 903 at the same time for sending and receiving IP packets to and from hub site PEP End Points. Further, a Multimedia Relay 905 supports the use of a VADB (VPN Automatic Dial Backup) serial port interface for sending and receiving IP packets to and from the hub site PEP End Points.

Figure 10:
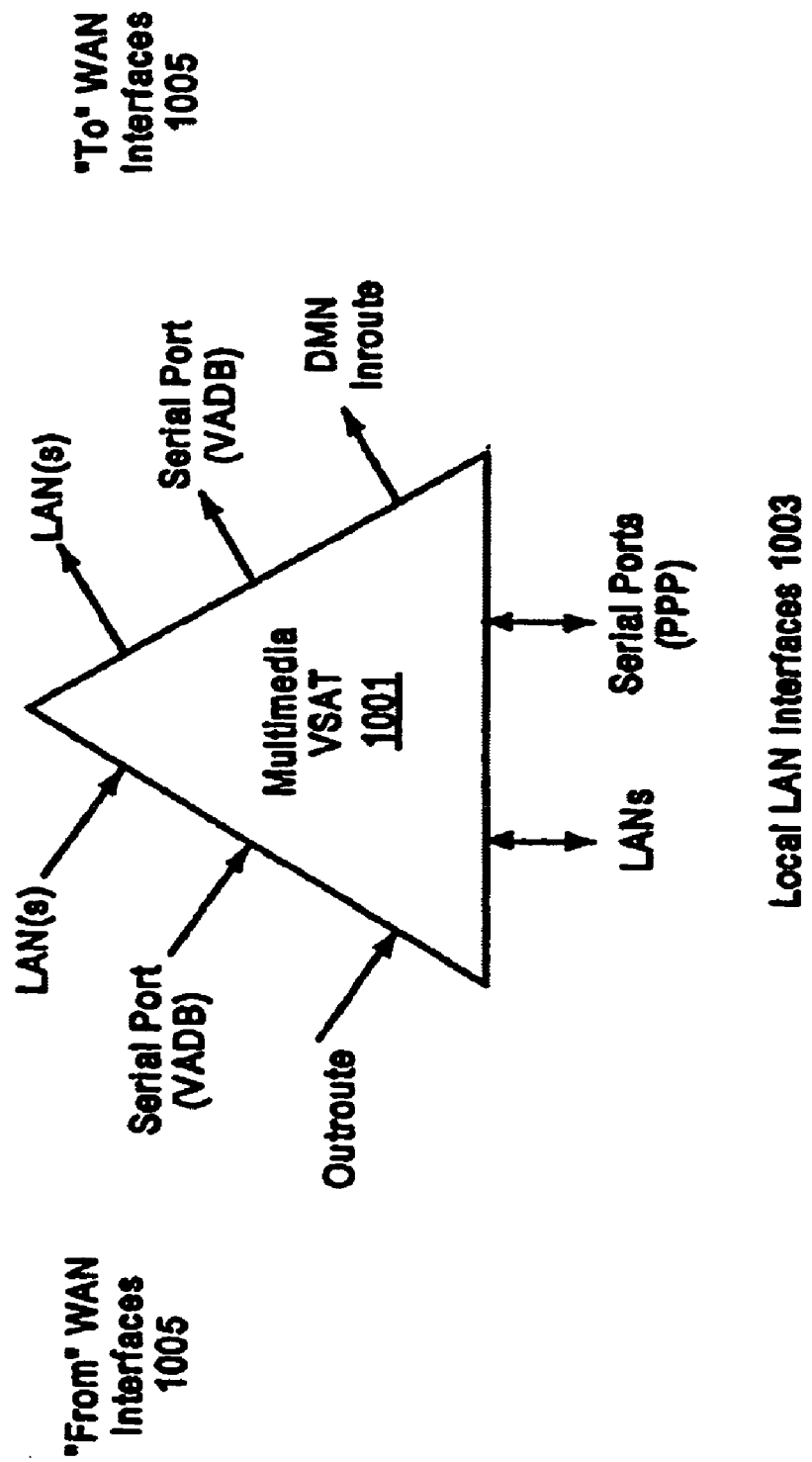
FIG. 10 is a diagram of the interfaces of a PEP end point implemented as a Multimedia VSAT (Very Small Aperture Terminal), according to an embodiment of the present invention.

FIG. 10 shows a Multimedia VSAT implementation of the PEP end point, according to one embodiment of the present invention. A Multimedia VSAT 1001, in an exemplary embodiment, has two local LAN interfaces 1003. Support for one or more local PPP serial port interfaces may be utilized. The Multimedia VSAT 1001 has two WAN interfaces 1005 for sending IP packets to hub site PEP End Points: a VSAT inroute and one of its LAN interfaces. The Multimedia VSAT 1001 thus has three interfaces for receiving IP packets from hub site PEP End Points, the VSAT outroute and both of its LAN interfaces 1003. A Multimedia VSAT 1001 may support uses of both of its LAN interfaces 1001 at the same time for sending and receiving IP packets to and from hub site PEP End Points. The Multimedia VSAT 1003 further supports the use of a VADB serial port interface for sending and receiving IP packets to and from the hub site PEP End Points.

Figure 11:
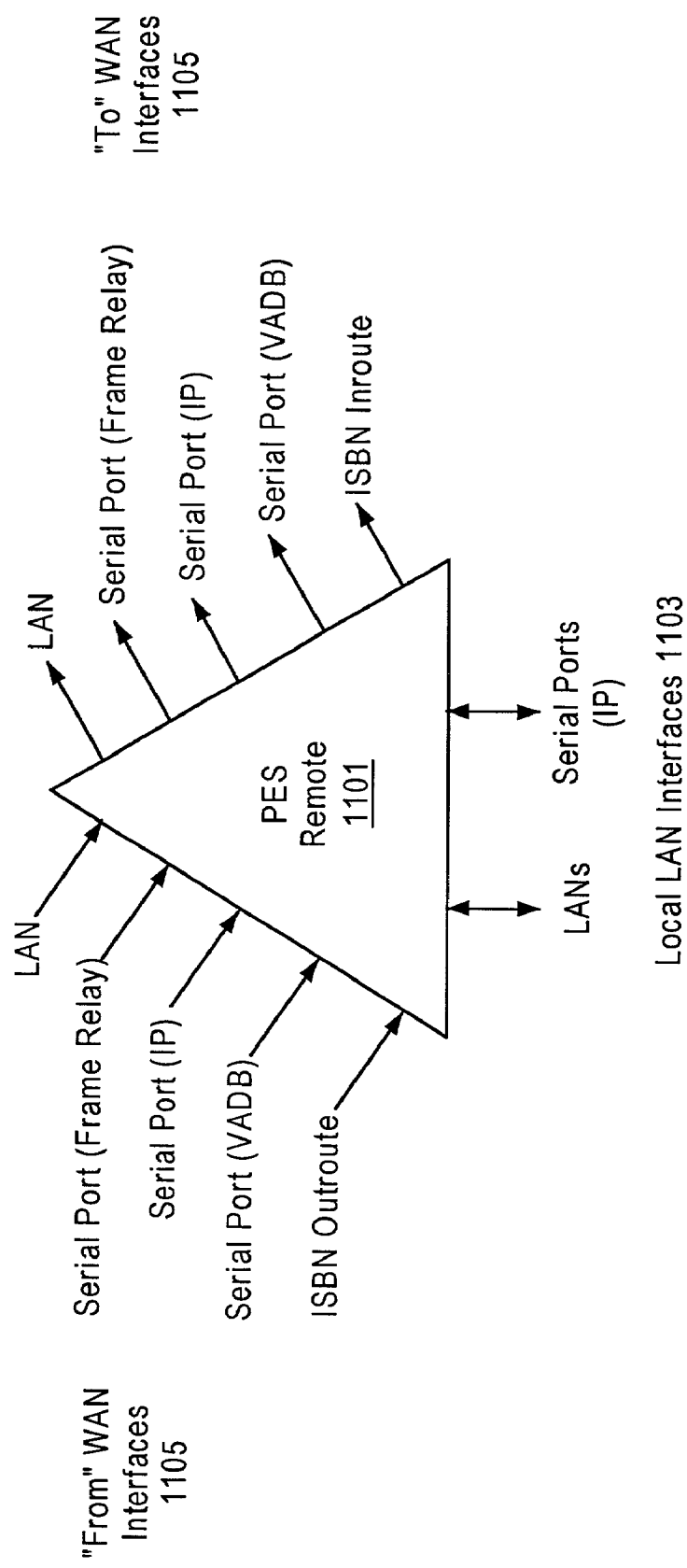
FIG. 11 is a diagram of the interfaces of a PEP end point implemented in an earth station, according to an embodiment of the present invention.

FIG. 11 shows a PES Remote implementation of a PEP end point, according to one embodiment of the present invention. A PES Remote 1101 may have a local LAN interface and/or several local IP (e.g. PPP, SLIP, etc.) serial port interfaces, collectively denoted as LAN interfaces 1103. The particular LAN interfaces 1103 depend on the specific PES Remote platform. PES Remote 1101, in an exemplary embodiment, has up to five WAN interfaces 1105 for sending IP packets to hub site PEP End Points, an ISBN inroute, a LAN interface, a VADB serial port interface, a Frame Relay serial port interface and an IP serial port interface, and up to five existing interfaces for receiving IP packets from hub site PEP End Points: an ISBN outroute, a LAN interface, a VADB serial port interface, a Frame Relay serial port interface, and an IP serial port interface. The physical Frame Relay serial port interface may be supporting multiple Permanent Virtual Circuits (PVCs); some of which are equivalent to local interfaces 1103 and some of which are WAN interfaces 1105.

Figure 12:
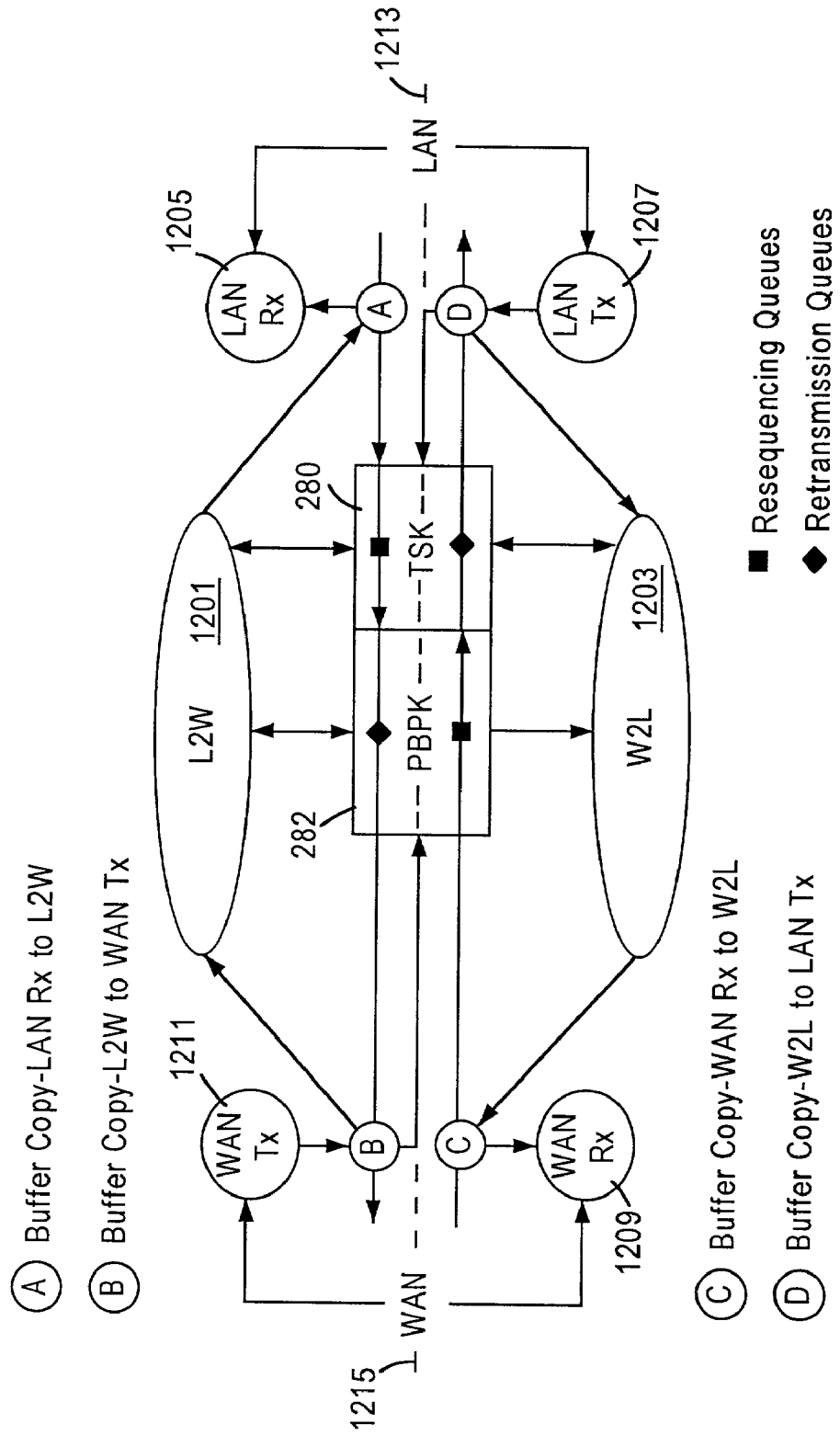
FIG. 12 is a diagram of the flow of TCP spoofing buffers through a PEP End Point, according to an embodiment of the present invention, in accordance with an embodiment of the present invention.

FIG. 12 shows the flow of TCP spoofing buffers through a PEP End Point, according to an embodiment of the present invention. In this example, there are six logical buffer pools involved with receiving, processing and forwarding TCP segments for spoofed TCP connections: a LAN to WAN (L2W) buffer pool 1201; a WAN to LAN (W2L) buffer pool 1203; a LAN Receive (LAN Rx) buffer pool 1205; a LAN Transmit (LAN Tx) buffer pool 1207; a WAN Receive (WAN Rx) buffer pool 1209; and a WAN Transmit (WAN Tx) buffer pool 1211.

The interfaces and the buffer pools shown in FIG. 12 are logical entities. It is noted that the buffer flow shown in FIG. 12 is simplified in some cases for the purpose of explanation; for example, "a buffer" may constitute multiple physical buffers. Physically, there may be more than one LAN or WAN interface and, in some cases for some platforms, the same physical interface may be used as both a LAN interface 1213 and a WAN interface 1215. The buffer pools 1201, 1203, 1205, 1207, 1209, and 1211 are logical in that the same physical set of buffers maybe used to implement more than one of the buffer pools either for implementation convenience or because the LAN and WAN interfaces 1213, 1215 are the same physical interface. Details on the platform specific physical implementation of the logical buffer pools 1201, 1203, 1205, 1207, 1209, and 1211 are described below.

When an IP packet arrives from the local LAN, the LAN interface 1213 receives the packet into a buffer from the LAN Rx buffer pool 1205 and passes the packet to the platform environment 210. The platform environment 210 copies the IP packet from the LAN Rx buffer 1205 into a LAN to WAN buffer 1201, and then returns the LAN Rx buffer 1205 to the LAN interface 1213. In a platform where the LAN Rx buffer 1205 and LAN to WAN buffer 1201 are physically the same, the environment 210 may avoid the copy and simply exchange a LAN to WAN buffer 1201 for the LAN Rx buffer 1205. Whether or not an actual copy occurs, if no LAN to WAN buffer 1201 is available, the IP packet is discarded (by returning the original LAN Rx buffer 1205 to the LAN interface 1213) and must be recovered from in the same manner as if the IP packet was lost crossing the LAN.

The environment 210 passes IP packets that contain spoofed TCP segments to the TCP Spoofing Kernel 280 (when TCP spoofing is enabled). The LAN to WAN buffer 1201 handling of IP packets that do not contain TCP segments is described below. The environment 210 recognizes a TCP spoofed TCP segment by the presence of a CCB for the segment. The environment 210 also passes TCP <SYN> segments to TSK 280 to determine whether a new connection should be spoofed. If the TCP <SYN> segment does not belong to a TCP connection which should be spoofed, TSK 280 returns the IP packet to the environment 210 with an indication to forward the TCP segment unspoofed. There are also circumstances in which TSK 280 may return a TCP segment to be forwarded unspoofed even when there is a CCB for the TCP connection. If the TCP segment does belong to a TCP connection which is being (or is about to be) spoofed, TSK 280 processes the TCP segment and then either forwards the contents of the TCP segment to its TSK 280 peer or discards it and returns the buffer of the segment to the platform environment 210. The platform environment 210, in turn, returns the buffer to the LAN to WAN buffer pool 1201. In some cases, TSK 280 does not need to forward the received TCP segment but does need to send a TSK message (as a consequence of receiving the TCP segment) to its TSK peer. (For example, when a TCP <SYN> segment is received, the <SYN> segment is not forwarded to the TSK peer but a Connection Request message may need to be sent to the TSK peer.) When this is the case, rather than discard the TCP segment's buffer and then ask for a new buffer to generate the TSK message which needs to be sent, TSK 280 simply reuses the buffer in which the TCP segment was received.

For cases where TSK 280 needs to send a TSK message to its peer asynchronous to the reception of a TCP segment, TSK 280 requests a LAN to WAN buffer 1201 from the platform environment 210 and uses this buffer 1201 to construct the message. To forward a data or control TSK message to its TSK peer, the TCP Spoofing Kernel 280 passes the buffer of the message (along with an indication of which backbone connection should be used to send the message) to the Backbone Protocol Kernel 282. Once a message has been passed to BPK 282, BPK 282 assumes ownership of the message's LAN to WAN buffer 1201. TSK messages are sent by BPK 282 to its BPK peer as PBP segments. To send a PBP segment, BPK 282 passes the segment as an IP packet to the platform environment 210 for transmission on the appropriate WAN interface 1215. The environment 210 passes the IP packet to the appropriate WAN interface 1215, copying the LAN to WAN buffer 1201 into a WAN Tx buffer 1211.

Because BPK 282 needs to provide guaranteed delivery of TSK messages, BPK 282 must get back and hold for potential retransmission any TSK messages it transmits. Therefore, (when requested via a flag used with the interface,) the platform environment 210 must return an IP packet passed to it back to BPK 282 after it has been transmitted. It is noted that when the environment 210 returns IP packets to BPK 282, for a given backbone connection, the environment must return the IP packets to BPK 282 in the order that they were given to it by BPK 282. According to an exemplary embodiment, this may be accomplished automatically by performing an immediate copy into a WAN Tx buffer 1211. Alternatively, this may be performed through the use of a queuing mechanism to ensure that the packets are returned in order. In a platform 210 which uses a LAN to WAN buffer 1201 and a WAN Tx buffer 1211 are compatible, the environment 210 may opt to not do an actual copy when BPK 282 does not want the IP packet back. If the buffers 1201 and 1211 are compatible, the allocated WAN Tx buffer 1211 can be returned to the LAN to WAN buffer pool 1201 with the LAN to WAN buffer 1201 forwarded as a WAN Tx buffer 1211.

The Backbone Protocol Kernel 282 can also generate segments to be sent to its BPK peer without receiving a message from TSK 280, e.g., to send an acknowledgement for PBP segments which have been received. To send such a segment, BPK 282 allocates a buffer from the LAN to WAN buffer pool 1201 (via the platform environment 210), constructs the PBP segment it needs to send and then forwards the segment as an IP packet to the platform environment 210 in the same way that it forwards PBP segments which contain TSK messages. It is noted that the allocation of buffers to send PBP acknowledgements occurs independently from the reception of PBP segments. BPK 282 will still process any received PBP segment even if no LAN to WAN buffer 1201 is available to send a response to the segment. The lack of a buffer to send a response is simply recovered from in the same manner as if the segment was successfully transmitted but lost crossing the WAN. After the Backbone Protocol Kernel is done with a segment it has transmitted, e.g. it has received an acknowledgement for the segment from its BPK peer, it returns the buffer of the segment to the LAN to WAN buffer pool 1201.

Losing a received or transmitted TCP segment or PBP segment because a buffer is unavailable is not critical. The lost IP packet can be recovered from in the same manner as if the IP packet had been lost crossing the LAN or WAN. However, not being able to send a TSK message because a buffer is unavailable presents a more serious situation. TSK 280 assumes that messages cannot be lost in the pipe provided between itself and its peer by the PEP Backbone Protocol. Therefore, special handling is required if TSK 280 attempts to generate a TSK message from scratch and is unable to do so. In some cases, for example, the generation a TSK Peer Parameters message, the appropriate reaction is to start a timer and reattempt to send the message when the timer goes off. In other cases, for example, the inability to send a Connection Terminated message, the appropriate reaction might be to disregard the event which required the CT message to be sent. For example, if the message is being sent due to a timeout, the timer can be restarted with some short value and reprocessed when it expires again.

When an IP packet arrives from the WAN, the WAN interface 1215 receives the packet into a buffer from the WAN Rx buffer pool 1209 and passes it to the platform environment 210. The platform environment 210 copies the IP packet from the WAN Rx buffer 1209 into a WAN to LAN buffer 1203 and then returns the WAN Rx buffer 1209 to the WAN interface 1215. In a platform 210 in which the WAN Rx buffer 1209 and WAN to LAN buffer 1203 are physically the same, the environment 210 may avoid the copy and simply exchange a WAN to LAN buffer 1203 for the WAN Rx buffer 1209. Whether or not an actual copy occurs, if no WAN to LAN buffer 1203 is available, the IP packet is discarded (by returning the original WAN Rx buffer 1209 to the WAN interface) and must be recovered from in the same manner as if the IP packet was lost crossing the WAN. The environment 210 passes all IP packets which contain PBP segments (addressed to this PEP end point 210) to the Backbone Protocol Kernel 282. The WAN to LAN buffer handling of other types of IP packets is described below.

BPK handling of PBP segments depends on the type of PBP segment. In terms of buffer handling, there are two types of PBP segments: (1) PBP segments which can be immediately processed and discarded, i.e. PBP control segments; and (2) PBP segments which must be forwarded to the TCP Spoofing Kernel 280, i.e. TSK messages. For a PBP control segment, e.g., a PBP segment used to bring up backbone connections, the Backbone Protocol Kernel 282 can take whatever actions are required by the segment and then return the buffer of the segment to the WAN to LAN buffer pool 1203. BPK 282 forwards received TSK messages to the TCP Spoofing Kernel 280. Once BPK 282 has passed a message to TSK 280, TSK 280 assumes ownership of the message's WAN to LAN buffer 1203. TSK WAN to LAN buffer handling is described below. It is noted that a segment containing a TSK message does not necessarily need to be forwarded to TSK 280 immediately. Out of sequence segments are held by BPK 282 on a backbone connection's resequencing queue while BPK 282 waits for the missing segments. (BPK 282 must forward TSK messages in order to the TCP Spoofing Kernel.) Also, the Backbone Protocol Kernel does not generate messages to communicate information (e.g. backbone connection resets) to the TCP Spoofing Kernel. Any information that BPK 282 needs to pass to TSK 280 is passed using a procedural interface. Therefore, BPK 282 never needs to allocate a WAN to LAN buffer 1203 for its own use.

The TCP Spoofing Kernel 280 receives two types of messages from its TSK peer: control messages (e.g., Connection Request messages), and data messages (e.g., TCP Data messages). Both types of messages can, in some cases, be immediately discarded by TSK 280 (for example, upon reception of a TCP Data message for a connection which no longer exists.) This is accomplished simply by returning the buffer of the message to the WAN to LAN buffer pool 1203. Generally, however, processing is required for a message received from a TSK peer. Control messages may require the generation of a corresponding TCP segment to be sent to a local host. For example, the reception of a Connection Request message will usually result in a TCP <SYN> segment being sent to a local host. However, reception of a Connection Established message does not result in a TCP <SYN,ACK> segment being sent to a local host if TSK 280 has already sent the <SYN,ACK> segment. When a control message requires that a TCP segment be sent to a local host, TSK 280 stores any information it requires from the control message and then uses the WAN to LAN buffer 1203 of the control message to construct the TCP segment which needs to be sent. Besides being more efficient, reusing the WAN to LAN buffer 1203 avoids error scenarios where no additional WAN to LAN buffer 1203 is available for the TCP segment which needs to be generated. For a data message, the TCP Spoofing Kernel must first convert the TSK message into a TCP data segment. This is basically done by replacing the PBP and TSK buffer headers with an appropriate TCP header 1515, using the mechanism as described later.

After the TCP Spoofing Kernel 280 converts a TSK message into a TCP segment, TSK 280 sends the TCP segment to a local host by passing the segment as an IP packet to the platform environment 210 for transmission on the appropriate LAN interface 1213. The environment 210 passes the IP packet to the LAN interface 1213 for transmission; this is executed by allocating a LAN Tx buffer 1207 and then copying the IP packet from the WAN to LAN buffer 1203 to the LAN Tx buffer 1207. A copy is done because TSK 280 needs to provide guaranteed delivery of TCP data segments and, therefore, must get back and hold for potential retransmission many of the TCP data segments the TSK 280 transmits. Therefore, (when requested via a flag used with the interface,) the environment 210 returns the IP packets passed to it back to TSK 280 after these packets have been transmitted. Copying the IP packet into a LAN Tx buffer 1207 allows the environment 210 to perform this immediately. If the environment 210 cannot allocate a LAN Tx buffer 1207 to copy the IP packet into, the environment 210 must return the IP packet to TSK 280 as if the IP packet had been transmitted. TSK 280 then recovers from the error in the same manner as if the IP packet had been lost crossing the local LAN. It is noted that when the environment 210 returns IP packets to TSK 280, for a given TCP connection, the environment 210 must return the IP packets to TSK 280 in the order that these packets were given to it by TSK 280. The immediate copy makes meeting this requirement simple.

The TCP Spoofing Kernel 280 can also generate TCP segments to be sent to a local host without receiving a message from its TSK peer, e.g., to send an acknowledgement for TCP data segments that have been received. To send such a segment, TSK 280 allocates a buffer from the WAN to LAN buffer pool 1203, constructs the TCP segment that the TSK 280 needs to send and then forwards the segment as an IP packet to the platform environment 210 in the same way that it forwards TCP segments generated by a TSK message received from its TSK peer. It is noted that the allocation of buffers to send TCP data acknowledgements occurs independently from the reception of TCP segments. TSK 280 will still process any received TCP segment, including data segments, even if no WAN to LAN buffer 1203 is available to send a response to the segment. The lack of a buffer to send a response is simply recovered from in the same manner as if the segment was successfully transmitted but lost crossing the local LAN. After the TCP Spoofing Kernel is done with a segment it has transmitted, e.g. it has received an acknowledgement for the segment from the local host, it returns the buffer of the segment to the WAN to LAN buffer pool 1203.

Figure 13:
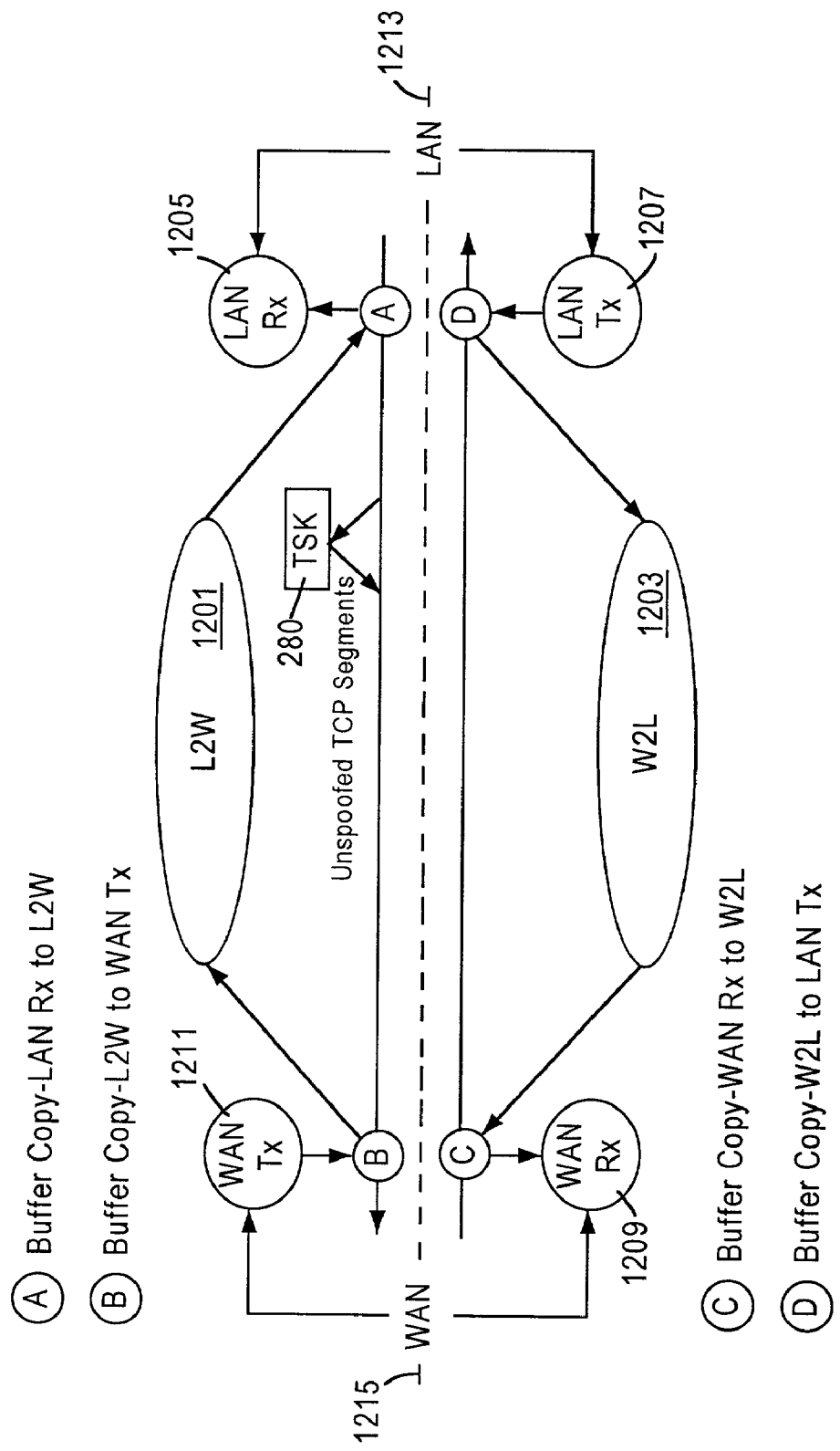
FIG. 13 is a diagram of the buffer management for unspoofed TCP connections and for non-TCP traffic, according to an embodiment of the present invention.

FIG. 13 shows a diagram of the buffer management for unspoofed TCP connections and for non-TCP (e.g. UDP) traffic, according to an embodiment of the present invention. Buffer management in the unspoofed case is similar to, but much simpler than, buffer management for spoofed TCP connections. As seen in FIG. 13, in the LAN to WAN direction, the platform environment 210 copies received IP packets out of LAN Rx buffers 1205 into LAN to WAN buffers 1201. Non-TCP IP packets are forwarded directly to the WAN interface 1215 without being passed through the TCP Spoofing Kernel or the Backbone Protocol Kernel. Unspoofed TCP IP packets are forwarded like non-TCP IP packets after TSK 280 "rejects" them. (If TCP spoofing is globally disabled, the environment 210 does not bother to send the TCP IP packets through TSK 280.). In the WAN to LAN direction, the process is similar. The platform environment 210 copies received IP packets out of WAN Rx buffers 1209 into WAN to LAN buffers 1203 and then, for all IP packets which are not PBP IP packets containing one of the platform's IP addresses as the destination address, forwards the packets to the (appropriate) LAN interface 1213, copying the IP packets into LAN Tx buffers 1207. In some platforms, it may be possible for the platform environment 210 to copy the IP packets directly from WAN Rx to LAN Tx buffers 1207. There is no need for these packets to be processed by any PEP kernel.

The backbone connection associated with a buffer is stored in the buffer. When no backbone connection is associated with the buffer, a value of 0xFFFF is used. For debugging purposes (and to keep the buffer handling code symmetrical), the platform environment 210 may keep track of the number of currently allocated buffers associated with "backbone connection" 0xFFFF.

FIG. 14 is a diagram of a basic format of the buffers used to implement the PEP functionality, in accordance with an embodiment of the present invention. A buffer 1400 includes a buffer header 1401which contains platform specific buffer fields, if any such fields exist. The format of (and even the existence of) these fields is only known to the platform environment 210. Following the platform specific buffer header 1401 is a PEP common buffer header 1403 which in an exemplary embodiment is about 30 to 44 bytes in length. The fields in this header 1403 are known to and used by the PEP kernels. Buffer 1400 also includes a portion that is designated for the IP packet 1405 which in addition to the PEP common buffer header 1403 constitutes the "payload" of the buffer 1400.

Buffers 1400 are passed from the environment 210 to a kernel, from a kernel to another kernel, and from a kernel to the environment 210 via a pointer to the beginning of the PEP common buffer header 1401. Any pointer adjustments that are required to account for a platform specific buffer header 1401 are made by the platform environment 210.

The platform environment 210, according to an exemplary embodiment, provides the task context in which the PEP kernels operate. Therefore, from the point of view of platform specific buffer management, the PEP platform environment 210 is the explicit owner of all of the buffers that are allocated for use for PEP functionality. Buffer handling formalities with respect to (explicit) buffer ownership (if any exist for a particular platform) occur at the point when the platform environment 210 receives or returns a buffer from or to outside of the PEP context. Within the context of the platform environment 210 task, a buffer is considered to be owned by whichever kernel currently possesses it. However, no formal buffer ownership transfer has to occur. The transfer of ownership can be implicit. For example, when the TCP Spoofing Kernel 280 passes a TSK message to the Backbone Protocol Kernel 282 for transmission across a backbone connection, TSK 280 passes implicit ownership of the buffer to BPK 282. In an exemplary embodiment, only the implicit owner of a buffer is allowed to access the buffer. Except for the case in which the specific context of an interface is defined to allow it, a kernel should not assume that fields in a buffer have not been changed if the kernel passes a buffer outside of its own context and then gets it back.

FIG. 15 shows a diagram of an IP packet that is used in the system of FIG. 1. An IP packet 1500 has an IP header 1501 (as defined in IETF RFC 791 which is incorporated herein by reference in its entirety) followed by a payload 1503. IP header 1501 is generally 20 bytes in length. The IP header 1501 can be greater than 20 bytes in length if IP header options are used.

The size of the IP packet payload 1503 is determined by the maximum transmission unit (MTU) size of the network that is being used to carried the IP packet. For instance, the MTU of an Ethernet link is 1500 bytes, supporting an IP packet payload 1503 of up to 1480 bytes. As shown in FIG. 15, the IP packet payload generally carries the "message unit" of some higher layer protocol. These higher layer protocols may include User Datagram Protocol (UDP) 1505, TCP 1507, and the PEP feature, PBP 1509. UDP 1505 includes a UPD header 1511 and a payload 1513 (which contains the data). Similarly, TCP 1507 provides a TCP header 1515 and a data portion 1517. The PBP 1509 format, for example, houses a TSK message 1518 with a TSK header 1519 and a data 1521. The TSK message 1518, in turn, constitutes the payload, or data, 1523 of a PBP segment. PBP 1509 also includes a PBP header 1525.

Buffers are passed between the environment 210 and the PEP kernels as IP packets. At the TSK/BPK interface, buffers are passed between TSK 280 and BPK 282 as TSK messages. The PEP common buffer header 1403, as more fully described below, is used to pass the appropriate buffer payload at each interface.

Figure 16:
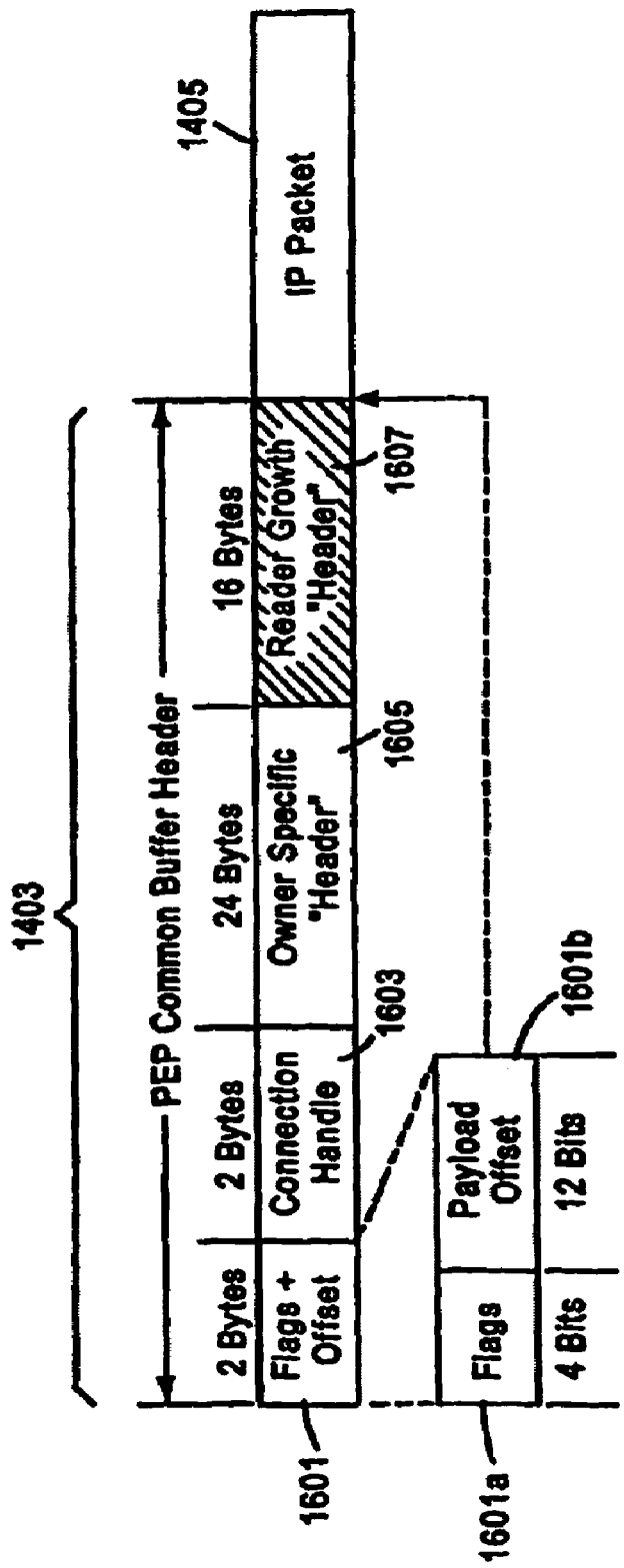
FIG. 16 is a diagram of a format of the PEP common buffer header, according to an embodiment of the present invention.

FIG. 16 shows a diagram of a format of the PEP common buffer header, according to an embodiment of the present invention. The common buffer header 1403 has three purposes: (1) to provide a mechanism for passing buffers between the environment 210 and the PEP kernels and between the various PEP kernels themselves; (2) to provide a mechanism which supports the ability for IP, TCP, PBP and TSK headers to grow (and shrink) without requiring a shift of the data in an IP packet, thereby significantly improving performance by avoiding data copies; and (3) provide space for owner specific per buffer fields (eliminating the need to allocate separate per buffer data structures). It is noted that the boundary between the owner specific "header" and the header growth "header" is somewhat arbitrary in that a kernel, if it needs to, can put owner specific fields into the header growth space (and vice versa), if they will fit. However, this can only be done within a kernel. The boundary between the two "headers" must be respected by a kernel when passing a buffer to the environment or another kernel.

The PEP common buffer header 1403 includes a Flags+ Offset field 1601 which (by way of example) is 2 bytes in length, whereby 4 bits are designated for a Flags field 1601a and the remaining 12 bits are provided for the Payload Offset field 1601b. With respect to the Flags field 1601a, the first (most significant bit) flag bit holds the direction (DIR)flag. The direction flag indicates whether this particular buffer has been allocated in the LAN to WAN direction (DIR=0) or WAN to LAN direction (DIR=1). The last (least significant bit) flag bit is reserved for use by the platform environment 210. The two middle flag bits are reserved. As regards the Payload Offset field 1601b, the field 1601b specifies in bytes the current start of the buffer payload (e.g., IP packet). The header growth space in the buffer allows this value to be adjusted both up and down. However, care must be taken to not adjust the payload offset beyond the boundary between the owner specific field 1605 and header growth field 1607.

The Connection Handle field 1603 which is 2 Bytes in length, specifies the handle of the backbone connection to which this buffer has been allocated. The connection handle may be set, for example, to 0xFFFF in buffers that do not contain spoofed TCP segments or PBP segments and in buffers for which the platform environment 210 has not yet determined the proper backbone connection to which to allocate the buffer. The latter applies to TCP <SYN> segments received from the local LAN.

The 24 byte Owner Specific "Header" field 1605 provides for shifting the contents of a buffer to accommodate different header sizes that the CPU requires. If the payload of the buffer is small, the CPU required may not be significant. But, when the payload is large, e.g., when the buffer contains user data, the CPU required can be very significant. And, since carrying user data is the real purpose of a network (and, ideally, represents the vast majority of the traffic,) optimizing for the case of large user data messages is desirable. The size of a received IP header 1501 and a transmitted IP header 1501 will generally be the same, i.e. 20 bytes. Therefore, in general, replacing one IP header 1501 with another requires no special buffer handling. On the other hand, the size of a TCP header 1515 differs from the size of a PBP header 1525 and even from the size of combined PBP and TSK headers. A TCP header 1515 is generally 20 bytes. The use of TCP options can increase the size of the TCP header 1515. As currently defined, a PBP header 1525 is 12 bytes when the PBP segment includes a TSK message. In most cases, a TSK header 1519 (FIG. 15) for a data message is 6 bytes. For the exceptions, the TSK header 1519 is 18 bytes. Therefore, the combined PBP and TSK headers 1525 and 1519 for a data message are 18 bytes most of the time.

On the surface, it might appear that changing either the PBP header 1525 or TSK header 1519 so that the combined headers equal 20 bytes to match the size of the TCP header 1515 may improve buffer handling performance (at the expense of wasting a couple of bytes of overhead when sending PBP segments across the WAN). However, in addition to reducing flexibility regarding handling TCP options, when looked at more closely, it is observed that this is not the case. The reason for this is that TSK and BPK buffer handling occur independently. TSK 280 is not aware of the size of the PBP header 1525 and should not be. And, conversely, BPK 282 is not aware of the size of the TSK header 1519 and should not be. Making the kernels aware of each other's header sizes violates their protocol layering relationship and would introduce an undesirable dependency between the kernels. The method defined to handle this problem is to use extra space at the front of the buffer along with a "pointer" (i.e., an offset count) to the buffer payload (e.g., the current start of the IP packet). This method allows the data to remain in place with only the buffer headers moved around. And, it takes advantage of the fact that the PEP kernels generally only reuse the space for headers. Fields in a header rarely remain unchanged and, therefore, a shift in the location of a header simply requires a change in the location where a kernel needs to fill in fields not an actual shift of header contents. For example, the IP header 1501 required by the TCP Spoofing Kernel 280 to send and receive TCP data to and from the local host contains no field values in common with the IP header 1501 required by the Backbone Protocol Kernel 282 to send and receive the same data across the WAN. And, the TCP header 1515 used to send and receive data to and from the local host is completely replaced by the PBP and TSK headers 1525 and 1519 used to send and receive the same data across the WAN (and vice versa). In an exemplary embodiment, in a buffer that has not had any header adjustments, the payload offset may point 44 bytes into the buffer at the start of an IP packet (because the buffer, in this example, is initialized with 16 bytes of header growth space). If a header needs to be inserted which is smaller than the header it is replacing, then the kernel which is making the adjustment moves the headers to the right, updating the payload field in the buffer. If a header needs to be inserted which is larger than the header it is replacing, then the kernel which is making the adjustment moves the headers to the left, again updating the payload offset field 1601*b* in the buffer. Of course, as indicated above, even when no header adjustments are required, payload offset adjustments may be required because IP packets are not the buffer "unit" passed at all interfaces. In particular, TSK messages are the buffer "unit" passed between the TCP Spoofing Kernel 280 and the Backbone Protocol Kernel 282.

Figure 17:
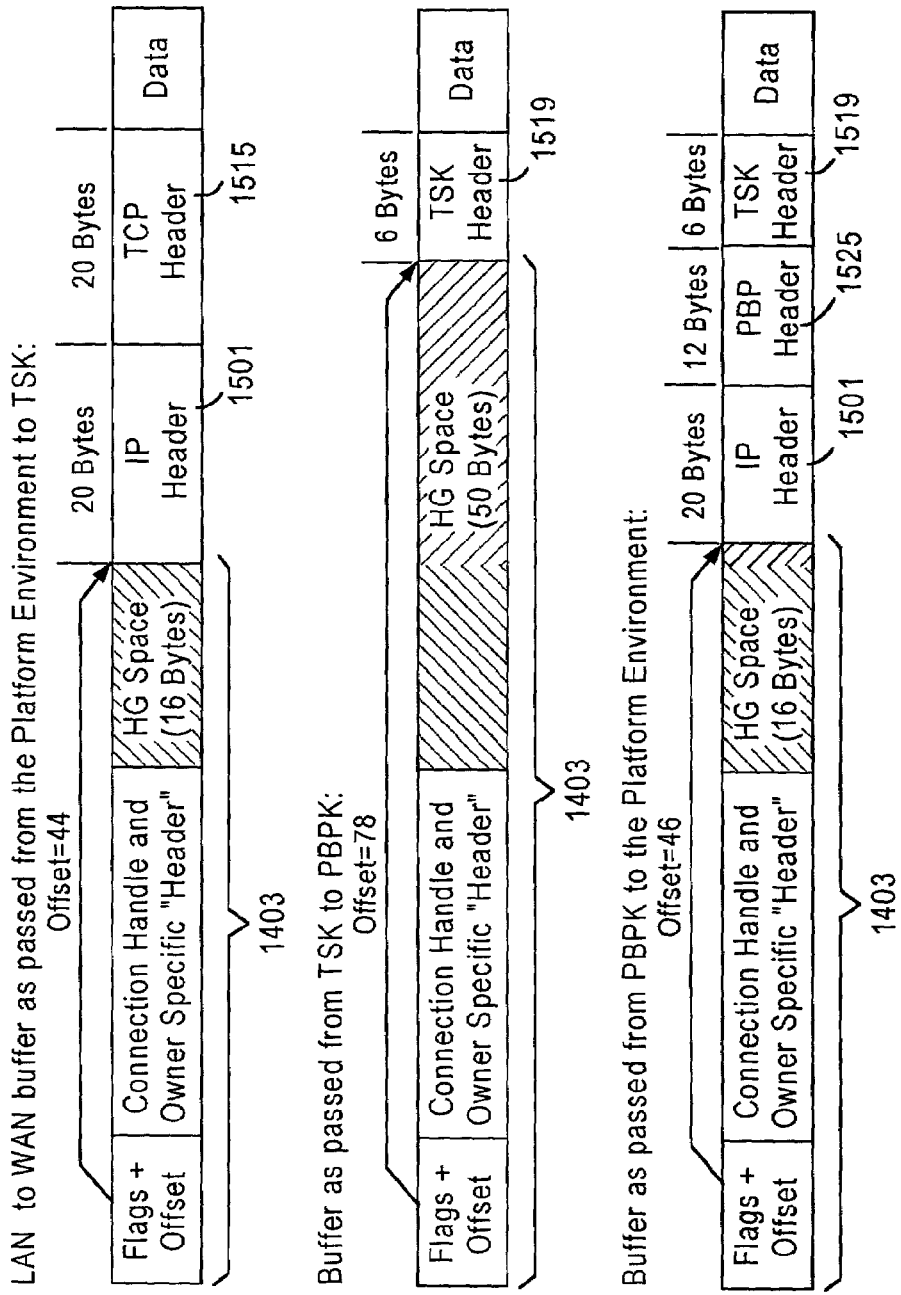
FIG. 17 is a diagram of a received TCP data segment header adjustment, according to an embodiment of the present invention.

FIGS. 17 through 20 show the use of header growth space for TCP data segments, according to an embodiment of the present invention. In FIG. 17, a buffer containing a TCP data segment received from the local LAN is passed by the platform environment 210 to the TCP Spoofing Kernel 280. TSK 280 removes the 20 byte IP header 1501 and 20 byte TCP header 1515 and adds a 6 byte TSK header 1519, updating the payload offset 1601*b* from 44 to 78 (representing the size difference between the original and new headers), and then passes the buffer to the Backbone Protocol Kernel 282 as a TSK message. BPK 282 adds a 20 byte IP header 1501 and a 12 byte PBP header 1525 to the TSK message, updating the payload offset 1601*b* from 78 to 46, and then passes the buffer to the platform environment 210 for forwarding towards the WAN.

Figure 18:
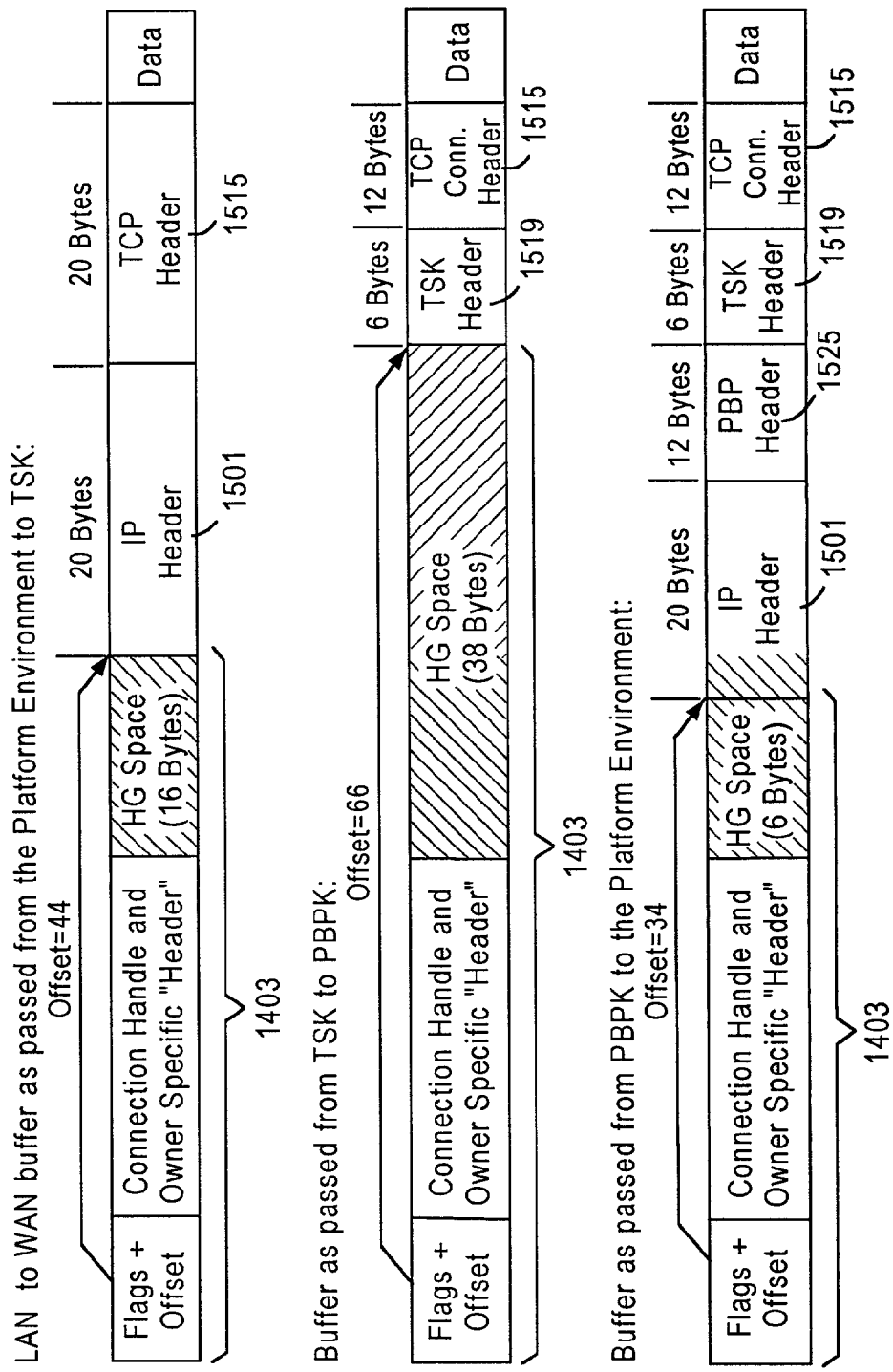
FIG. 18 is a diagram of a received TCP data segment with a TCP connection header, according to an embodiment of the present invention.

FIG. 18 illustrates the same buffer flow for the case where TSK 280 needs to insert a 12 byte TCP connection header 1515 for the TCP data segment in addition to the TSK header 1519.

In FIG. 19, a buffer containing a TSK Data message received from the WAN is passed by the platform environment 210 to BPK 282. BPK 282 removes the 20 byte IP header 1501 and 12 byte PBP header 1525, updating the payload offset 1601*b* from 44 to 76, and then passes the buffer to TSK 280. TSK 280 removes the 6 byte TSK header 1519 and adds a 20 byte IP header 1501 and a 20 byte TCP header 1515 to convert the TSK Data message into a TCP data segment, updating the payload offset 1601*b* from 76 to 42, and then passes the buffer to the platform environment 210 for forwarding towards the WAN.

Figure 20:
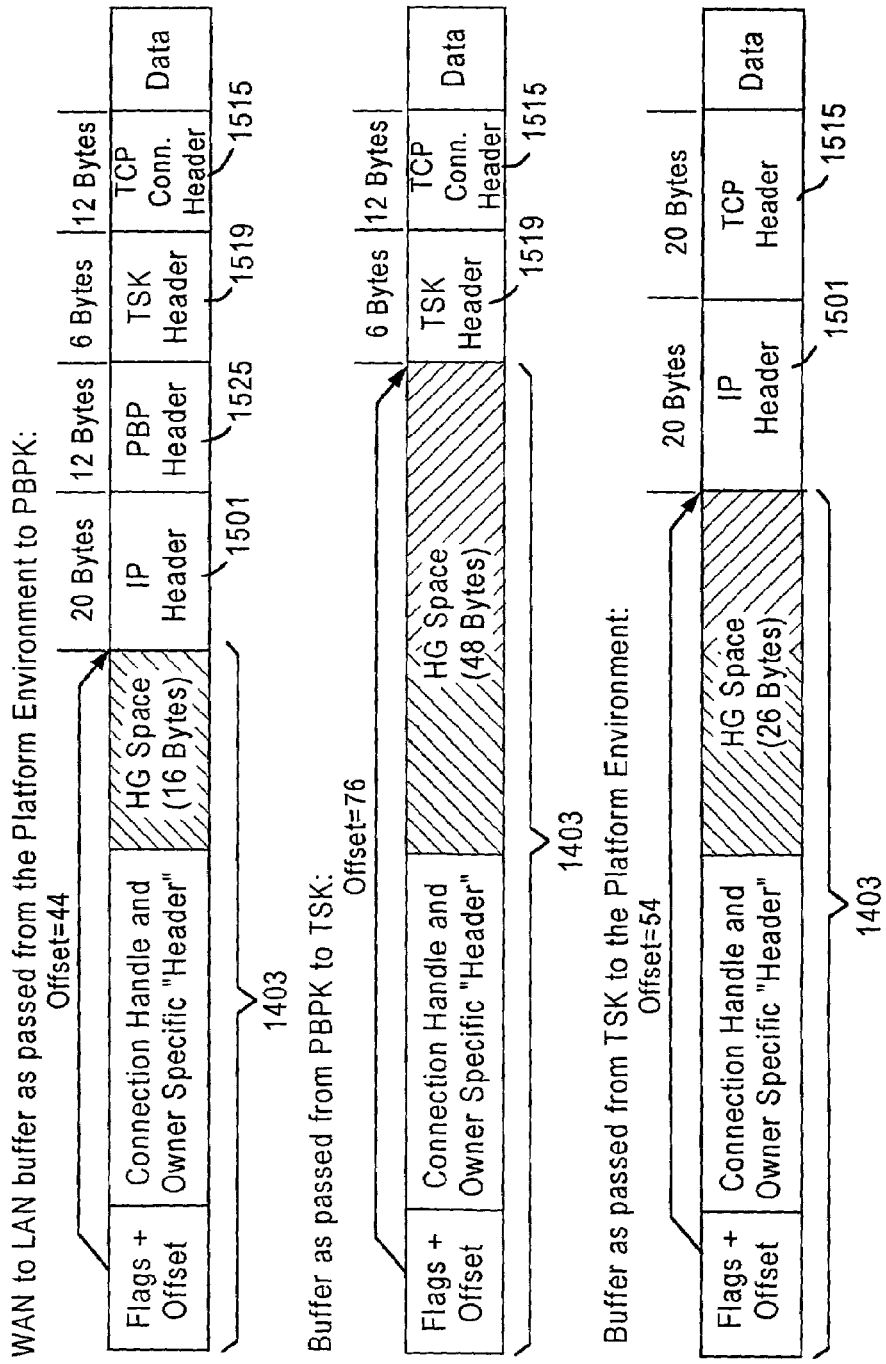
FIG. 20 is a diagram of a received TSK data message header adjustment with a TCP connection header, according to an embodiment of the present invention.

FIG. 20 illustrates the same buffer flow for the case where TSK 280 needs to also remove a 12 byte TCP connection header 1515 from the TSK Data message in addition to the TSK header 1519.

An initial size of 16 bytes may be selected because a 16 byte header growth "header" provides 4 byte alignment and provides margin for unanticipated header growth requirements. However, in a particular platform, the platform environment 210 may choose to use an initial header growth space size of larger than 16 bytes. This might be desirable, for example, to provide room for an Ethernet MAC header, potentially allowing the use of a common physical buffer pool to be shared by all of the logical buffer pools.

Figure 21:
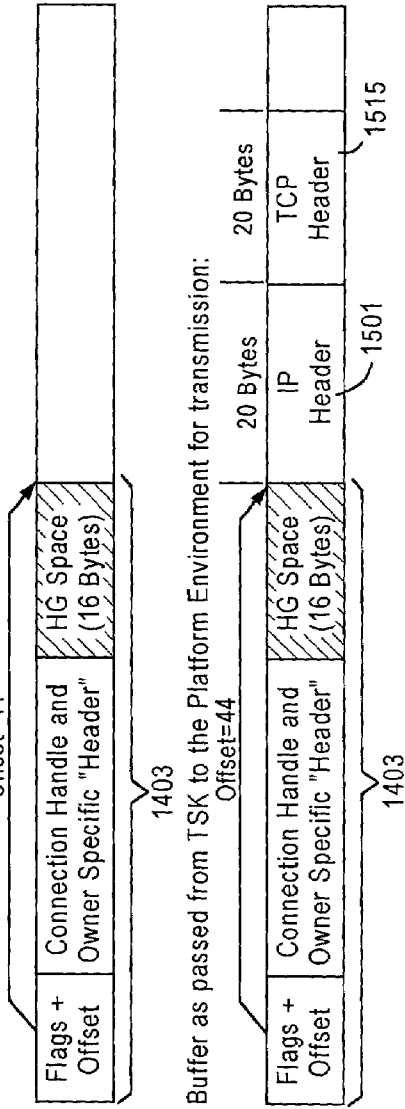
FIG. 21 is a diagram of a generated TCP segment, according to an embodiment of the present invention.

It is noted that not all of the TCP segments that are sent by the TCP Spoofing Kernel 280 originate from TSK messages received from a TSK peer. TSK 280 often needs to generate a TCP segment (e.g., an acknowledgement for a received TCP data segment) to send to a local host "from scratch". As is indicated previously, when TSK 280 needs to generate such a TCP segment, TSK 280 calls the platform environment 210 to allocate a WAN to LAN buffer 1203. The buffer 1203 that is provided by the environment 210 is initialized with its payload offset 1601*b* pointing to the first byte beyond the platform's default header growth "header" (e.g., 44 bytes into the buffer). Because no headers need to be inserted in front of the headers that are inserted by TSK 280 (except for the LAN MAC header inserted for all IP packets), TSK 280 need not be concerned with leaving room for additional headers in the buffer. TSK 280 can insert an IP header 1501 and a TCP header 1515 at the location provided by the platform environment 210. This is illustrated in FIG. 21.

Figure 22:
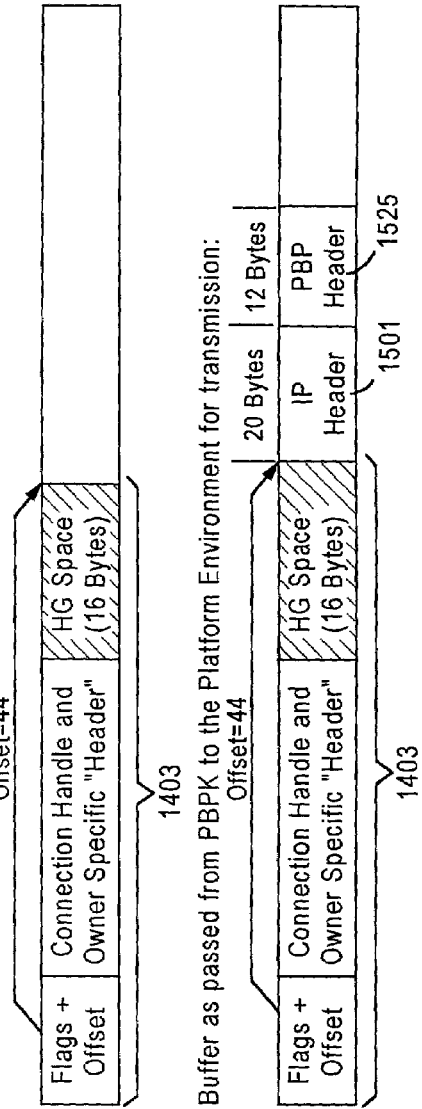
FIG. 22 is a diagram of a generated PBP segment, according to an embodiment of the present invention.

Similarly, not all of the PBP segments that are sent by the Backbone Protocol Kernel 282 originate from TSK messages that are forwarded by TSK 280. BPK 282 often needs to generate a PBP segment (e.g., an acknowledgement for a received PBP data segment) to send to a BPK peer "from scratch". When BPK 282 needs to generate such a PBP segment, BPK 282 calls the platform environment 210 to allocate a LAN to WAN buffer 1201. The buffer provided by the environment is initialized with its payload offset pointing to the first byte beyond the platform's default header growth "header" (e.g., 44 bytes into the buffer). Since no headers will need to be inserted in front of the headers inserted by BPK 282 (except for any WAN MAC header inserted for all IP packets), BPK 282 does not need to worry about leaving room for additional headers in the buffer and can insert an IP header 1501 and a PBP header 1525 at the location provided by the environment 210. This is illustrated in FIG. 22.

BPK 282 never needs to generate messages to a local host (via TSK 280). However, TSK 280 does need to generate TSK messages (e.g., a Connection Terminated TSK message when a connection is terminated due to retransmission failures) to send to TSK peers (via BPK 282). When TSK 280 needs to generate a TSK message, TSK 280 calls the platform environment 210 to allocate a LAN to WAN buffer 1201. As in the other cases described above, the buffer provided by the environment is initialized with its payload offset 1601*b* pointing to the first byte beyond the platform's default header growth "header" (e.g., 44 bytes into the buffer). However, because a TSK message will be forwarded to a TSK peer via BPK 282, TSK 280 must, in this case, leave room for BPK 282 to insert PBP and IP headers; however, this does not require TSK 280 to know anything about the size of the PBP header 1525. TSK 280 can simply add the TSK header 1519 (and TCP connection header 1515, if necessary) in the locations it would have done so if the buffer had been received with an IP header 1501 and a TCP header 1515 in it, as shown in FIG. 23.

Figure 23:
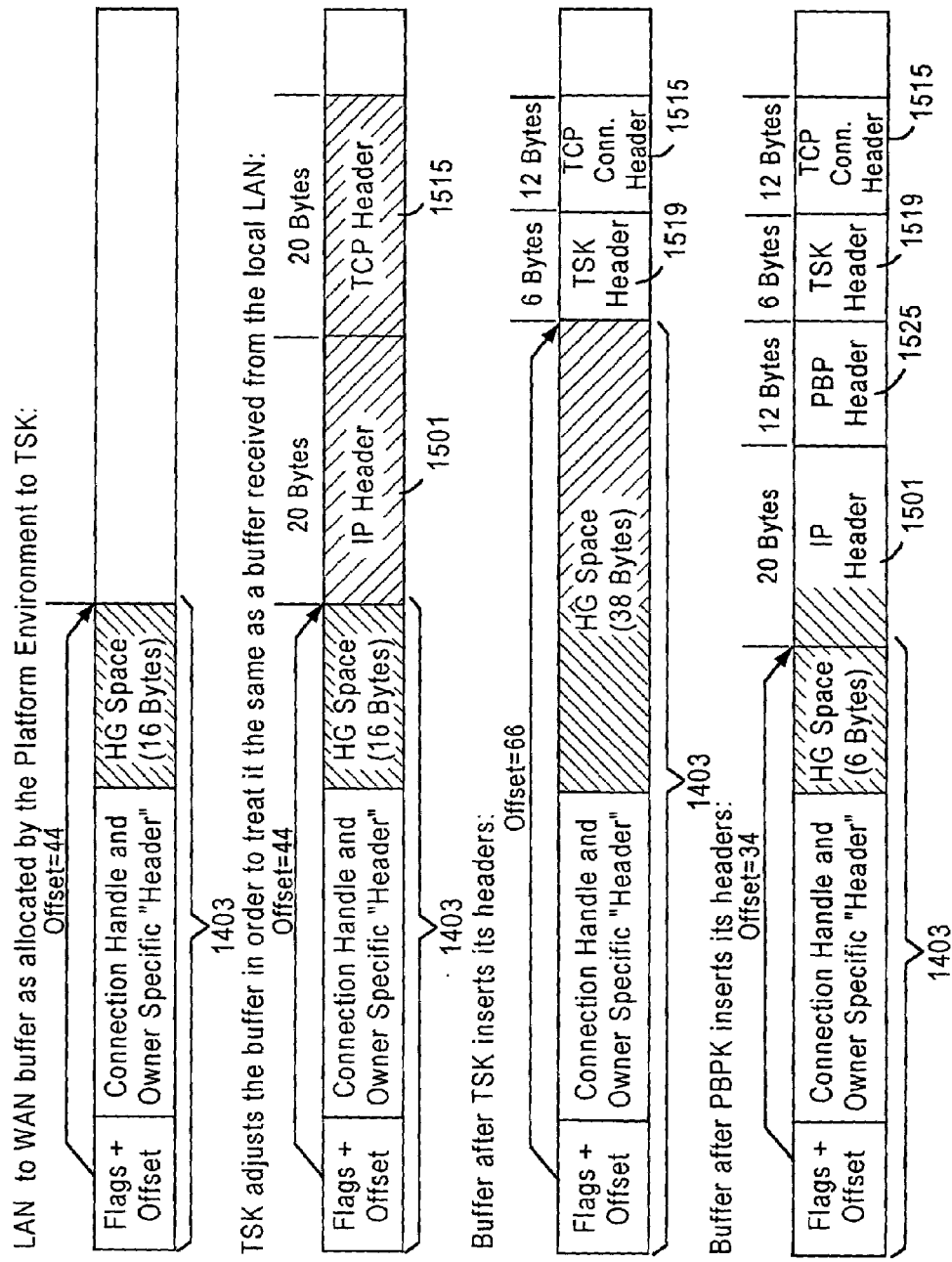
FIG. 23 is a diagram of a generated TSK message, according to an embodiment of the present invention.

It is noted in FIG. 23 that the scenario whereby TSK 280 adjusts the buffer to include an IP header 1501 and a TCP header 1515 so that the buffer looks the same as if the buffer had been received from the local LAN is merely illustrative. The implementation, for example, can immediately place the TSK header 1519 in the right place by adding the right value to the payload offset 1601*b*. When TSK 280 and BPK 282 call the environment to allocate a buffer, they provide the size of the buffer they wish to allocate. However, the size indicated only reflects the size of the segment or message they wish to generate (including the relevant protocol headers). The size does not include the PEP buffer header or any platform specific buffer header required. The environment 210 adjusts the requested size accordingly. This adjustment is left to the environment 210 for two reasons. First, TSK 280 and BPK 282 have no knowledge of platform specific buffer headers. Second, a particular platform environment 210 might want to use a larger header growth space than the required minimum.

Figure 24:
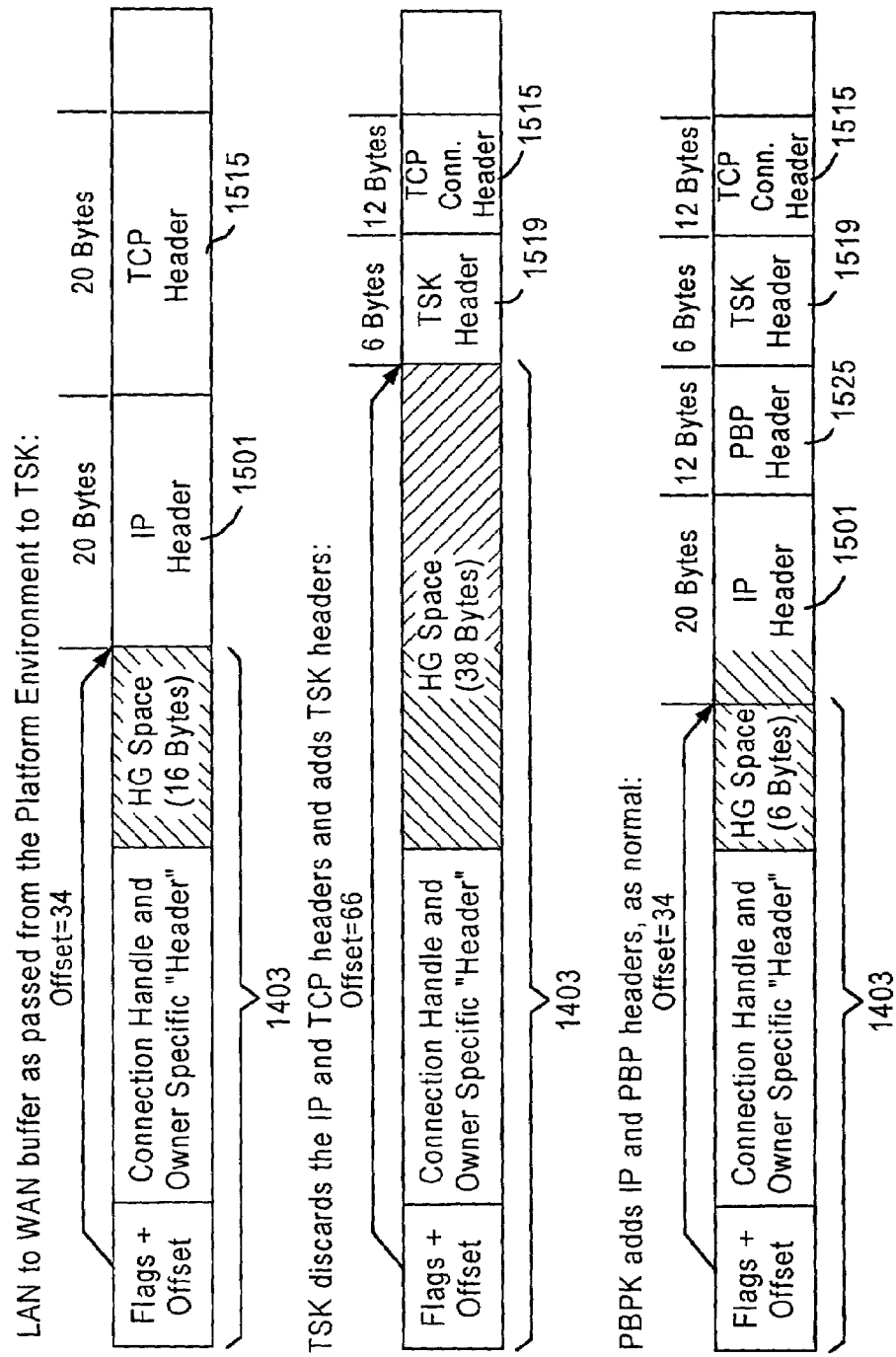
FIG. 24 is a diagram showing reuse of a TCP segment buffer for a TSK message, according to an embodiment of the present invention.
Figure 25:
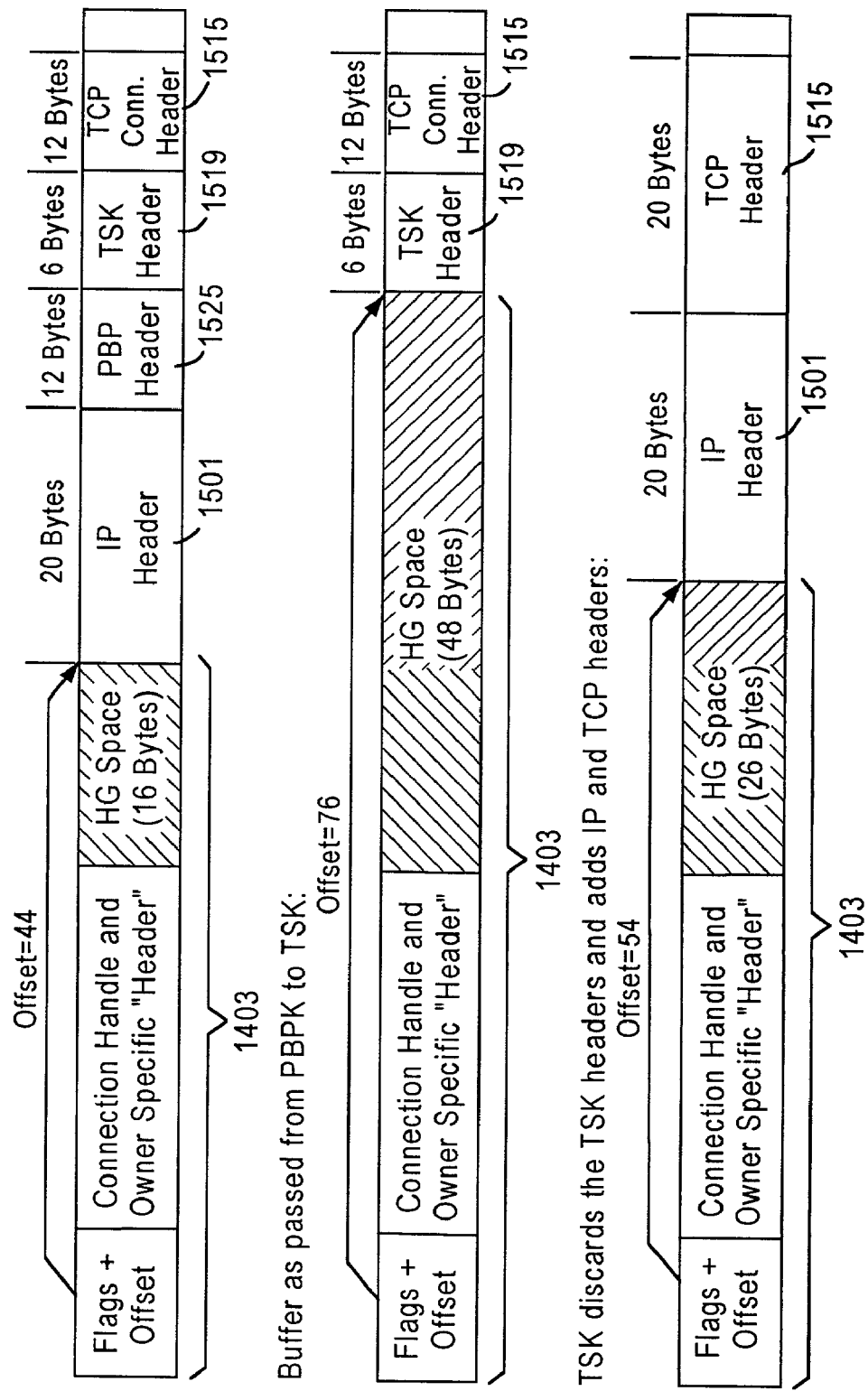
FIG. 25 is a diagram of reuse of a TSK message buffer for a TCP segment, according to an embodiment of the present invention.

Another buffer usage scenario exists that involves the TCP Spoofing Kernel is the case in which a "message" is received and not forwarded, but reception of the "message" requires that a different "message" be generated in the same direction (LAN to WAN or WAN to LAN) as that of the original "message". For example, a received TCP <RST> segment is not forwarded, but it can result in the need to send a Connection Terminated TSK message and vice versa. When this occurs, TSK 280 reuses the buffer of the original "message" to generate the new "message" rather than deallocate the received buffer and allocate a new one. However, this does not require any special handling because of the fact that TSK 280 already completely replaces the headers of TCP segments and TSK messages it receives before forwarding. The same buffer payload offset adjustments made for forwarded data "messages" will work when reusing a buffer. This is illustrated in FIGS. 24 and 25 which show that the same header adjustment made in FIGS. 18 and 20 may be used; the only difference is that there is no data in the buffer which needs to be maintained for the reuse case.

As indicated previously, when TSK 280 or BPK 282 allocate a buffer to construct an IP packet to be sent, they specify the required size of the buffer. BPK 282 does not generate IP packets that are to be forwarded towards the local LAN (by way of TSK 280) and, therefore, is not concerned with leaving room for TSK 280 to insert data into the allocated buffer. However, TSK 280 does generate TSK messages to be forwarded towards the WAN (by way of BPK 282). Therefore, when TSK 280 allocates a buffer for the purpose of sending a TSK message, TSK 280 must leave room for the PBP header 1525. However, BPK 282 inserts the PBP header 1525 in front of the TSK header 1519, treating the TSK message as data.

Therefore, as long as TSK 280 follows the above strategy of "inserting" space for IP header 1501 and TCP header 1515, the size of the allocated buffer remains correct. However, the size of a buffer may not be correct if the buffer is reused. For example, a received TCP <SYN> segment will usually be a 40 byte IP packet. But, the IP packet used for the TSK CR message which needs to be sent as a result of receiving the TCP <SYN> segment will be larger than 40 bytes. If a variable, exact size buffer strategy is in use in the PEP End Point platform 210, there will not be room in the buffer to build the CR message. There are two options to address this problem. The first option is to not allow the reuse of a buffer for this case. TSK 280 could be required to deallocate the original buffer and allocate a new, larger buffer. The second option is to have the platform environment 210 always allocate a buffer of at least some minimum size when a buffer is requested or when the environment 210 copies a received TCP or PBP segment out of a LAN Rx buffer 1205 or WAN Rx buffer 1209 into a LAN to WAN buffer 1201 or WAN to LAN buffer 1203. This is the approach advantageously simplifies the PEP kernel code.

Even when a platform is using a fixed size buffer strategy, there is still a need to enforce a minimum buffer size. In this case, the minimum buffer size is required to ensure that all of the fields which need to be accessed by a PEP kernel are in the first buffer holding an IP packet. This includes all of the protocol headers and the data for TSK control messages. This is true if the buffer strategy is to use single, fixed size buffers since this requires the use of large buffers. However, if buffer chaining is used, then the first buffer in the chain must be large enough to hold all of the information which needs to be accessed by the PEP kernels. For example, the minimum buffer size may be specified as 100 bytes; i.e., a platform environment 210 must not allocate a buffer smaller than 100 bytes. The minimum value is configurable. Also, a platform environment 210 may use a minimum buffer size of greater than 100 bytes if desired; for example, to improve buffer alignment efficiency. Enforcing the minimum buffer size is the responsibility of the platform environment 210.

The fact that the buffer returned by the environment might be bigger than requested is transparent to TSK 280 and BPK 282.

Figure 26:
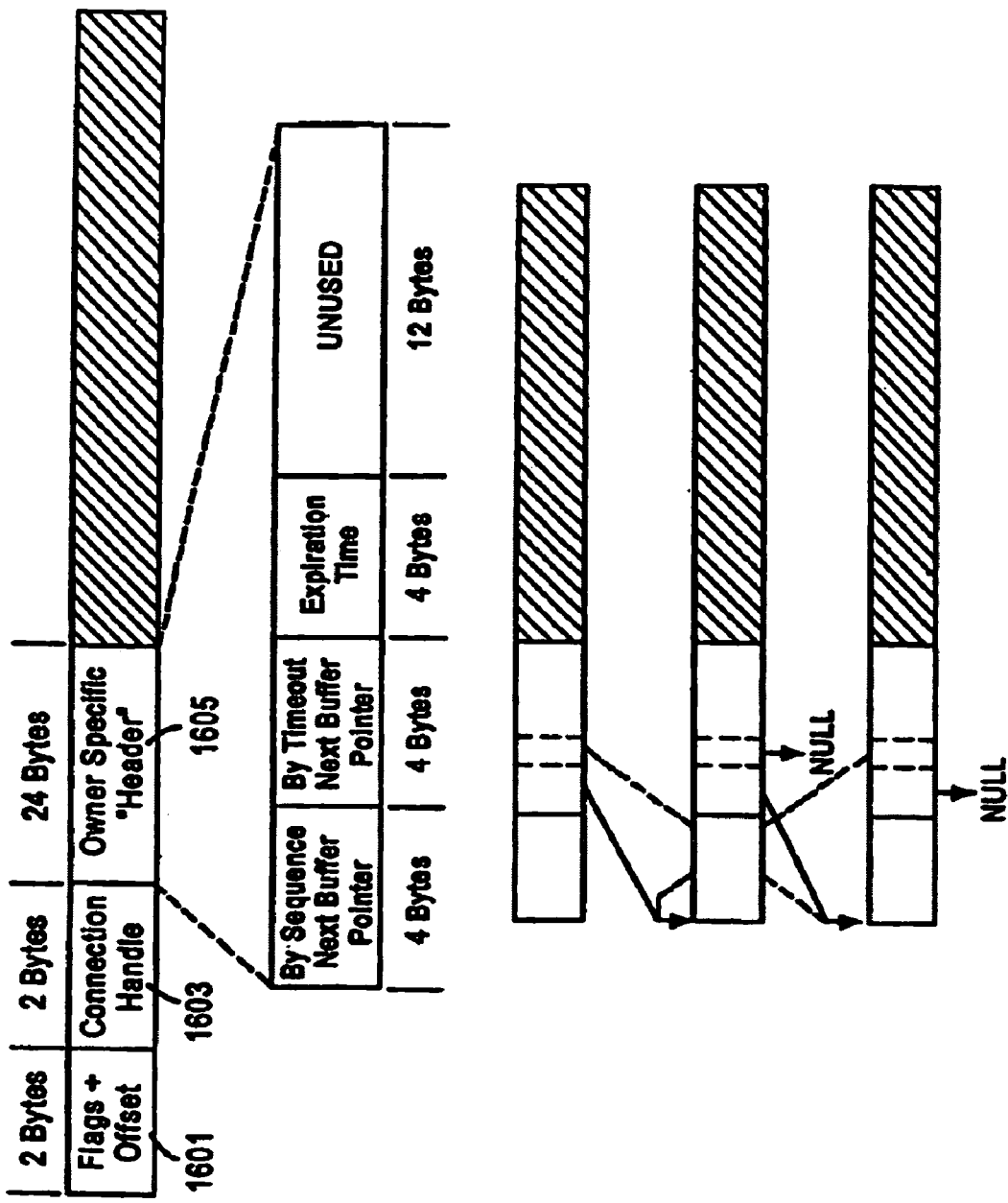
FIG. 26 is a diagram of an exemplary kernel use of the owner specific "header", according to an embodiment of the present invention.

The various PEP kernels often need to chain strings of buffers together to implement queues. This may be implemented by allocating a small, separate buffer descriptor block for each buffer and then using fields in the buffer descriptor to point to a buffer and to link buffer descriptors together. However, since there is basically a one for one relationship between the number of buffer descriptors required and the number of buffers required, an alternative approach is to basically embed the buffer descriptor in the buffer itself. This is the purpose of the owner specific part 1605 of the PEP common buffer header 1403. The owner specific "header" 1605 is available to the current owner of a buffer to be overlaid with a kernel specific buffer descriptor structure. The owning kernel can then use this buffer descriptor to link together buffers. In addition (or even as an alternative) the owning kernel can use the owner specific "header" to store kernel specific information related to the buffer (for example, a timer associated with the buffer). FIG. 26 shows an example of how a kernel might use the owner specific "header" 1403. As discussed earlier, a kernel gives up implicit ownership of a buffer when it passes it to the environment 210 or another kernel. Therefore, a kernel should not assume that any fields it sets in the owner specific part of the PEP common buffer header 1403 will not change in a buffer which it gives away and then gets back unless the semantics of the particular interface are specifically defined to allow such an assumption. For example, when the Backbone Protocol Kernel 282 passes a PBP segment to the platform environment 210 for transmission, the BPK 282 should not assume that any fields it has defined in the owner specific "header" have not changed when it gets the buffer back unless the specific procedural interface definition states that this assumption is valid.

Because a buffer copy is required anyway (because of the way the various LAN and WAN "drivers" work), an IP Gateway (i.e., PEP end point 210) uses the existing implementation for the LAN Rx buffer 1205, the LAN Tx buffer 1207, the WAN Rx buffer 1209, and WAN Tx buffer 1211. A single physical pool of memory is used for both the LAN to WAN and WAN to LAN buffer pools 1201 and 1203. The IP Gateway 210 may use a variable size, single buffer approach for allocating PEP buffers. Single buffer refers to the fact that only one physical buffer will be required to hold an entire IP packet. Variable size refers to the fact that the size of the buffer allocated will exactly match (except for the minimum buffer size constraint as described above) the size of the IP packet (leaving room for the various buffer headers). The malloc( ) and free( ) functions keeps track of the exact size of the buffers. Therefore, the IP Gateway implementation of the PEP end point 210 may not require a platform specific buffer header.

With respect to the other PEP end point implementations, Multimedia VSAT buffer handling and Multimedia Relay buffer handling are similar to IP Gateway buffer handling. Specifically, the VSATs also implement their LAN to WAN buffer pool 1201 and WAN to LAN buffer pool 1203 as pools of memory with buffers allocated using malloc( ) and deallocated using free( ). A single physical pool of memory is used for both the LAN to WAN buffer 1201 and WAN to LAN buffer pool 1203. A variable size, single buffer approach for allocating PEP buffers is employed. However, unlike the IP Gateway approach, the VSATs include a platform specific buffer header in each buffer.

Figure 27:
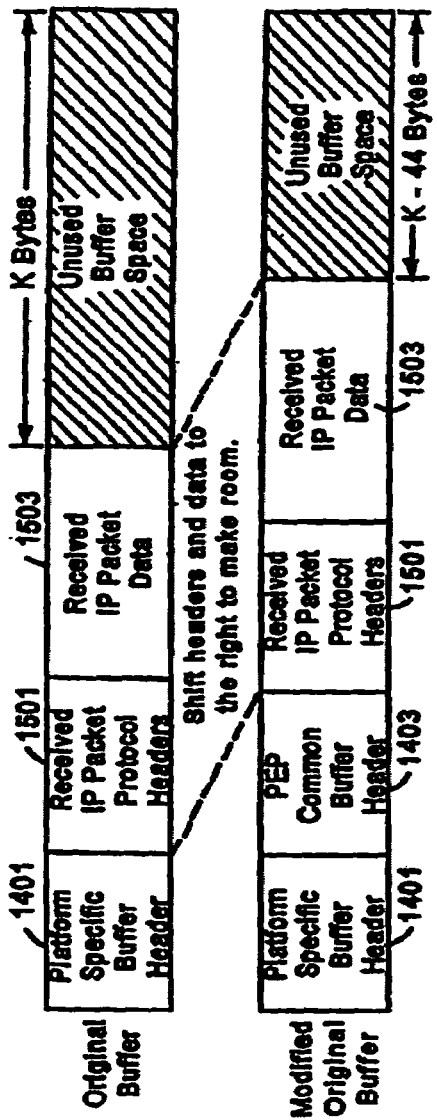
FIG. 27 is a diagram of a process for inserting a PEP common buffer header into a small buffer, according to an embodiment of the present invention.
Figure 28:
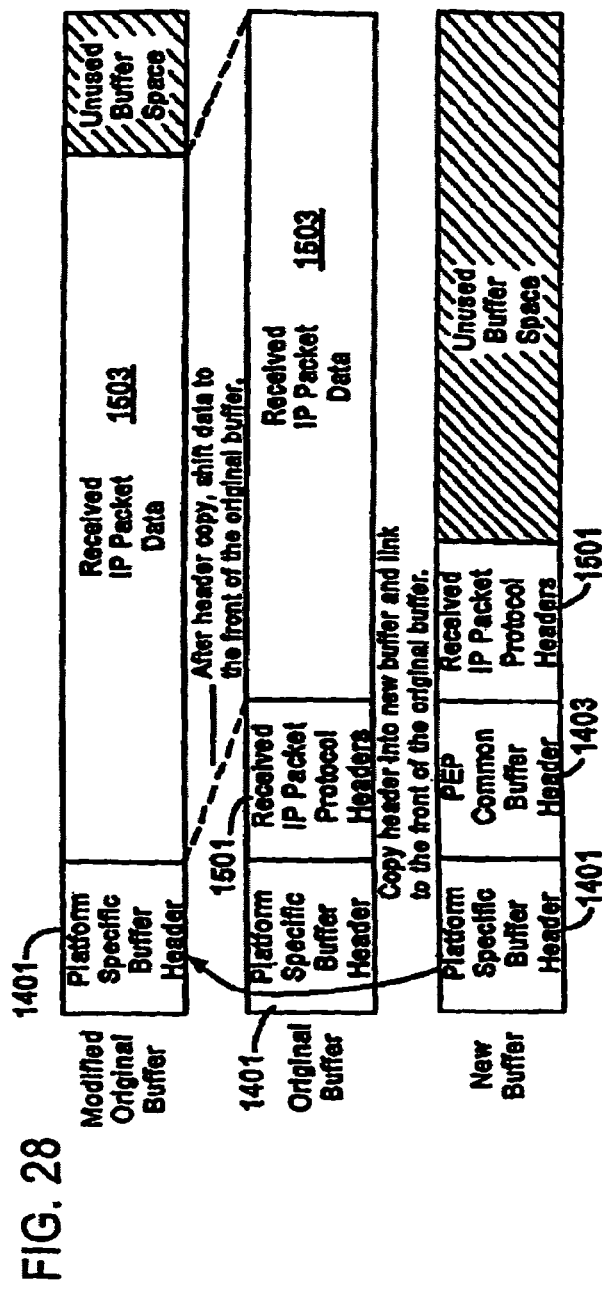
FIG. 28 is a diagram of a process for adding a PEP common buffer header to small buffer, according to an embodiment of the present invention.

As regards the PES Remote PEP platform environment 210, the use of chains of small buffers is needed to hold IP packets. In order to hide the fact that chained, small buffers are used from the PEP kernels, the PES Remote platform environment 210 needs to ensure that all of the headers fit into the first buffer of a buffer chain, including the PEP common buffer header, not just the protocol headers. To meet this requirement, the PES Remote environment does the following for an IP packet that is received from the local LAN or the WAN. If the length (of the content) of the first buffer in the chain is small enough such that the PEP common buffer header 1403 can be inserted into the buffer, the content of the buffer is shifted to the right to make room for it. In general, buffer chains are received with all of the buffers full except for the last buffer. Therefore, this condition will, again in general, only be met if the entire IP packet fits into a single small buffer. This option is illustrated in FIG. 27. If the length of the first buffer is too large to allow the PEP common buffer header to be inserted, the environment 210 allocates an extra buffer and prepends it to the buffer chain. If no buffer is available, the IP packet is dropped and must be recovered as if it had been dropped crossing the LAN or WAN. The PEP common buffer header is placed in the extra buffer and then all of the protocol headers in the original first buffer are copied into the buffer. Finally, any data left in the original first buffer is shifted to the left (to the front of the buffer). This option is illustrated in FIG. 28. While these copies do represent overhead, some sort of copying is inevitable and this approach should keep the amount of copying to a minimum. In addition, in the PES Remote, the same buffers actually can be used for the LAN Rx buffer pool 1205, LAN to WAN buffer pool 1201, and (inroute) WAN Tx buffer pool 1211. And, the same buffers 1201, 1205, and 1211 can be used for the (outroute) WAN Rx buffer pool 1209, WAN to LAN buffer pool 1203, and LAN Tx buffer pool 1207. Thus, the PES Remote platform environment 210, for example, can avoid some of the copies required in other types of PEP End Point platforms 210 to move data from one type of buffer to another, offsetting the CPU penalty imposed by the copies described above. In a PES Remote, the size of a LAN Rx buffer 1205, LAN to WAN buffer 1201 and (inroute) WAN Tx buffer 1211 may be either 146 bytes or 246 bytes (depending upon the particular software build.). The size of other types of buffers is 246 bytes. Even with the PEP common buffer header 1403, 146 bytes provides ample space for most non-data IP packets (e.g., TCP acknowledgements) and for many data IP packets (e.g., HTTP GETs). In particular, 146 bytes provide is sufficient to accommodate any segment or message that needs to be generated (from scratch) by TSK 280 or BPK 282.

The platform environment 210 keeps track of the amount of buffer space being used in each direction for each backbone connection. This tracking is performed for the purposes of dividing up buffer space resources with respect to advertising TCP and PBP windows. At least in the initial release of the PEP feature, the environment 210 does not base decisions regarding whether to allocate a buffer on the amount of buffer space in use. When the need arises to allocate a buffer, the environment 210 allocates the buffer if a buffer is available from the appropriate buffer pool. This policy does not pose any problems in that TCP and PBP senders (i.e., local TCP hosts and PEP End Point peers) are expected to not transmit packets beyond what is allowed by the advertised receive windows they receive from a PEP end point 210. This policy greatly simplifies the error handling associated with the allocation of buffers to send control messages when buffer space is running low. The following sections describe tracking and using buffer space availability to calculate TCP and PBP windows.

Both TCP and PBP use windows that are sent by the data receiver to the data sender to control how much data can be in transmission from the sender to the receiver. In general, a larger window enables higher throughput. However, throughput is bounded by the size of the smallest link of the pipe the data is flowing through so, beyond a certain point, an increase in window size no longer increases throughput. To ensure that the transmitted data is not discarded by the receiver when it arrives, the receiver, in general, bounds the window it advertises based on the amount of buffer space currently available to receive data. However, in order to use the amount of buffer space available as a bound on window size, the receiver needs to know how much space is available. To support window size calculations based on available buffer space, the platform environment 210 keeps track of the amount of LAN to WAN and WAN to LAN buffer space in use for each backbone connection (in the backbone connection's environment control block (ECB)). Whenever the environment 210 copies a received TCP segment from a LAN Rx buffer 1205 into a LAN to WAN buffer 1201, the environment 210 increments the amount of buffer space in use for the backbone connection which is being used to spoof the TCP connection to which the TCP segment belongs. The environment 210 determines which backbone connection is being used by looking in the CCB of the TCP connection. For the case in which a TCP <SYN> segment is received with no CCB allocated for the TCP connection yet, the environment 210 counts the buffer of the TCP <SYN> when the TCP Spoofing Kernel 280 allocates the CCB. The environment 210 also increments the LAN to WAN buffer space count whenever TSK 280 allocates a LAN to WAN buffer 1201 to generate a TSK message from scratch and whenever the Backbone Protocol Kernel 282 allocates a LAN to WAN buffer 1201 to generate a PBP segment from scratch.

WAN to LAN buffer accounting works similar to LAN to WAN buffer accounting. When the environment 210 copies a received PBP segment from a WAN Rx buffer 1209 into a WAN to LAN buffer 1203, the environment 210 increments the amount of buffer space in use for the backbone connection from which the PBP segment was received. In an exemplary embodiment of the invention, the environment 210 determines the handle of the backbone connection by combining the peer index associated with the source IP address in the IP packet with the priority of the connection (indicated by the PBP port number). The environment 210 also increments the WAN to LAN buffer space count when TSK 280 allocates a WAN to LAN buffer 1203 to generate a TCP segment from scratch. The environment decrements the LAN to WAN or WAN to LAN buffer space count, as appropriate, whenever a buffer is deallocated. The backbone connection handle used to find the appropriate ECB and a LAN to WAN versus WAN to LAN flag are stored in the buffer to make deallocation buffer accounting simple. As described below, buffer space is internally tracked in terms of the number of buffers in use, not the bytes of buffer space in use.

In an exemplary embodiment, four types of parameters which are configured for a PEP end point 210, affect the use of buffer space to determine window size advertisement values: (1) per peer buffer space, (2) per peer TCP connection control blocks, (3) per connection resources percentage, and (4) maximum window size limit. Referring to FIG. 5, each PEP end point 501, 503 is configured (via its PEP End Point profile) with the amount of buffer space (specified in units of kilobytes) that it should use for WAN to LAN traffic received from each of its PEP End Point peers. This is the total amount of WAN to LAN buffer space in a remote site PEP End Point 503 (which only has one peer). This is the per peer WAN to LAN buffer space in a hub site PEP End Point 501. For example, if the value configured in the hub site PEP End Point's PEP End Point profile is 500 KB, the WAN to LAN buffer pool 1203 for each of its peers is 500 KB. If there are 100 peers, then total amount of WAN to LAN buffer space is 50 MB. When configuring the WAN to LAN buffer space value, the operator must take into account the total amount of buffer space available, the number of peers which will need to share the total pool and the amount of buffer space required in the LAN to WAN direction. The amount of buffer space required in the LAN to WAN direction is nominally the sum of all of the PEP End Point peers' WAN to LAN buffer space values. However, the operator can actually overbook buffer space; i.e., the operator is not constrained to configure the amount of buffer space to be used such that the total, if all buffers were in use, is less than the actual amount available. The operator might do this to cause larger windows to be advertised to improve throughput (albeit at the risk of dropping packets) or to take advantage of knowledge regarding his applications. For example, the operator may know that his applications use more LAN to WAN buffer space during the day and more WAN to LAN buffer space at night. In particular, the operator will typically overbook the buffer space in the hub site PEP End Point 501 because statistically it is very unlikely that traffic will be being sent to every peer at the same time. Buffer space is specified in terms of bytes by the operator because the amount of memory (in bytes) is what is known to the operator.

Internally, for buffer tracking purposes, a PEP End Point 501, 503 converts the configured per peer WAN to LAN buffer space value from the number of bytes to the number of buffers. This is done by dividing the number of bytes by the size of a buffer capable of holding a maximum size IP packet (i.e., 1500 bytes plus the size of the PEP common buffer header plus the size of any platform specific header). This is performed for two reasons. First, PBP advertises windows in terms of packets, not bytes, and must assume that every packet it will receive will be a maximum size packet. Second, all buffer space calculations are made assuming a maximum size IP packet to eliminate assumptions about the buffer strategy in use in a PEP End Point peer. For example, if a PEP End Point uses a variable, exact size buffer strategy and counts bytes based on actual IP packet sizes but its peer is using a fixed size buffer strategy, the byte count will not accurately reflect the amount of memory being used in the peer unless all of the IP packets are maximum size. Also, the fact that the amount of buffer space can be overbooked provides a great deal of flexibility with respect to tuning performance. And, it provides leeway to compensate for assumptions which might not apply to a particular customer network. For example, if the maximum size IP packet in a particular network is 1000 bytes instead of 1500 bytes and the customer is only using PEP End Point platforms which use a variable, exact size buffer strategy, the operator can increase the WAN to LAN buffer space parameter by 50% to compensate for the use of smaller maximum size IP packets.

The number of TCP connection control blocks which can be used per PEP End Point peer is also configurable. This value primarily is used to determine if there is a CCB available in a TSK 280 peer to spoof a newly detected TCP connection. However, this value also affects buffer space calculations related to window sizes because the buffer space available for a backbone connection must be divided among all of the TCP connections which are using the backbone connection. The buffer pool size calculations are as follows:

$$S = S_O + 1500$$

$$n_b = N_b / S,$$

where $S_O$ is the buffer overhead size in bytes (e.g., PEP Common Buffer Header and any Platform Specific Buffer Header), S is the buffer size in bytes, $N_b$ is the configured buffer space in bytes, and $n_b$ is the buffer space in number of buffers.

With prioritization, there are potentially multiple backbone connections between two PEP End Point peers. Therefore, in addition to specifying the amount of buffer space (and the number of CCBs) for use to a particular PEP End Point peer, the operator needs to specify the allocation of these resources to the various backbone connections. This is accomplished via the configuration of resource percentages assigned to each priority of backbone connection on the connectivity profile used to define the connections. For each priority, the operator assigns a resource percentage ranging from 0% through 100% (with 0% used to indicate that no backbone connection at this priority is required). The operator may overbook resources by assigning percentages which add up to more than 100%. The operator may also underbook resources by assigning percentages which add up to less than 100%; this might be useful for setting aside buffer space for use by unspoofed (e.g., UDP) traffic. The environment 210 uses the percentages configured by the operator when opening backbone connections. The amount of WAN to LAN buffer space assigned to a backbone connection is set equal to the per peer WAN to LAN buffer space value multiplied by the resource percentage assigned to this backbone connection. Similarly, the number of CCBs which can be used with this backbone connection is set equal to the per peer number of CCBs multiplied by the same resource percentage. In an exemplary embodiment, different percentage values may be assigned for buffer space and CCBs; alternatively, a single parameter may be employed for both. The WAN to LAN buffer space and CCB limit calculations are as follows:

$$B_{pi}^{W2L} = n_b * X_{pi}$$

$$CCB_{pi} = CCB_e * X_{pi}$$

where $X_{pi}$ is the resource percentage for the backbone connection to peer "p" at priority "i", $B_{pi}^{W2L}$ is the WAN to LAN buffer space limit for the backbone connection to peer "p" at priority "i", $CCB_{pi}$ represents the CCB limit for the backbone connection to peer "p" at priority "i", and $CCB_e$ is the configured PEP End Point CCB limit. It is noted that the CCB limit is the local limit. The limit that is used is the smaller of the local CCB limit and the CCB limit of the PEP End Point peer.

While, in general, a TCP or PBP sender can actually deal with a TCP or PBP receiver which shrinks its advertised window (i.e., sends a new window which is smaller than the previous window minus any data sent within that window), the protocol operates inefficiently when this occurs. Therefore, TCP and PBP receivers are constrained by their protocol definitions to not shrink a previously advertised window. Given that this is the case, in general, a TCP or PBP receiver should not set its receive window equal to the entire amount of buffer space available because other users of this buffer space may cause the amount of buffer space to shrink outside of the control of the particular TCP or PBP connection. In other words, sending a large window reduces flexibility with respect to being able to react to reduced buffer availability by slowing down the TCP or PBP sender. Therefore, it is desirable for maximum advertised TCP and PBP window size limits to be enforced. These limits represent the largest window a TCP or PBP receiver advertises to the sender in any segment sent to the sender. It is noted, however, that if buffer space availability is low, smaller windows (including 0) may be sent. On the other hand, it is important that, when there is plenty of buffer space, the window that is advertised by a TCP or PBP receiver is large enough to cover the bandwidth * delay product (i.e., the size of the pipe divided by the round trip time of the pipe) which applies to the connection (in order to let the TCP or PBP sender keep the connection pipe full). Since the round trip time from network to network could be different, using hard coded values for the maximum window size limits is undesirable. Therefore, these limits may be configured as part of a PEP End Point's PEP End Point profile.

The PEP End Point profile may include a maximum TCP window size limit and a maximum PBP window size limit. Because most TCP connections are local to the PEP End Point 210 (connected via Ethernet), a small maximum TCP window size may cover the round trip time for most cases. Therefore, in this instance, the maximum TCP window size default may be set to 8 KB. Because of the variety of link speeds that are possible for PBP connections, a default value that works for most situations is not possible.

The following discussion describes the calculations that are performed by the platform environment 210, the TCP Spoofing Kernel 280. and the Backbone Protocol Kernel 282 to convert buffer space availability into advertised receive window sizes. For each backbone connection, as shown above, the platform environment 210 derives the amount of buffer space that can be used in the WAN to LAN direction for the connection by multiplying the per peer WAN to LAN buffer space value by the percentage of the per peer resources which have been allocated to this backbone connection. The resulting value is then used as the upper bound for WAN to LAN buffer space for this backbone connection. Because the per peer WAN to LAN buffer space values may be different in each peer, the platform environment 210 cannot directly calculate the corresponding limit for the amount of LAN to WAN buffer space even though the PEP End Point peers may share the same percentage of resources parameters; instead, this value is provided by the TCP Spoofing Kernel 280. The environment 210 provides the WAN to LAN buffer limit (and the local number of CCBs limit) to TSK 280 when it opens the backbone connection. TSK 280 then sends the limit to its TSK peer in a TSK Peer Parameters (TPP) message. When TSK 280 receives a TPP message, it extracts the peer's WAN to LAN buffer space limit from the message and passes it to the environment. The environment uses the peer's WAN to LAN buffer space limit as its local LAN to WAN buffer space limit. When a backbone connection is first opened, while waiting for the reception of a TPP message from the peer, the LAN to WAN buffer space limit and the peer number of CCBs limit are initialized to 0. This prevents TCP connections from being spoofed until valid peer parameter information is received. As described previously, the platform environment 210 counts the number of LAN to WAN buffers 1201 and WAN to LAN buffers 1203 it has allocated to each backbone connection in the backbone connection's ECB. When a buffer is allocated, the appropriate in use count is incremented. When a buffer is deallocated, the backbone connection handle stored by the environment in the buffer is used to find the proper in use count to decrement. When requested by TSK 280 or BPK 282, the platform environment 210 returns the currently available LAN to WAN or WAN to LAN buffer space for a backbone connection. In a platform (e.g. the PES Remote) where small, chained buffers are used, the platform environment 210 must normalize its buffer count based on the number of buffers required to hold a maximum size IP packet. TSK 280 and BPK 282 use these values to calculate window sizes, as follows:

$$A_{pi}^{W2L} = B_{pi}^{W2L} - U_{pi}^{W2L}$$

$$A_{pi}^{L2W} = B_{pi}^{L2W} - U_{pi}^{L2W},$$

where $B_{pi}^{W2L}$ is the calculated WAN to LAN buffer space limit for the backbone connection to peer "p" at priority "i", $B_{pi}^{L2W}$ is the learned LAN to WAN buffer space limit for the backbone connection to peer "p" at priority "i", $U_{pi}^{W2L}$ is the WAN to LAN buffer space in use for the backbone connection to peer "p" at priority "i", $U_{pi}^{L2W}$ is the LAN to WAN buffer space in use for the backbone connection to peer "p" at priority "i", $A_{pi}^{W2L}$ is the WAN to LAN buffer space available for the backbone connection to peer "p" at priority "i", and $A_{pi}^{W2L}$ is the LAN to WAN buffer space available for the backbone connection to peer "p" at priority "I".

In addition to the amount of buffer space available, it maybe desirable for a PEP End Point 210 to take into consideration other factors when determining window sizes to advertise. In particular, the current latency (generally measured by means of output queue depth) for the WAN interface 1215 can be an important factor since this interface 1215 represents a multiplexing point for the traffic of many competing flows, especially in the hub. In fact, the PEP TCP spoofing implementation includes the ability to monitor the queue latency and adjust TCP window size advertisements as the queue latency increases and decreases. When enabled by the operator, the environment 210 may track queue latency and use this value to determine a current flow control factor. In an exemplary embodiment, the flow control factor may be tracked as a percentage from 0% to 100%. When the latency increases by some operator defined value, the environment 210 may decrease the flow control factor. When the latency decreases by some operator defined value, the environment 210 may increase the flow control factor. Nominally, increments of 5% may be used to adjust the flow control factor up and down. However, the exact units of increment are not especially important. Whenever the platform environment 210 receives a request for the amount of buffer space available in the LAN to WAN direction, it will multiply the result (as determined above) by the flow control factor, as shown below.

$$A_{pi}^{L2W} = F * A_{pi}^{L2W},$$

where F is the current flow control factor expressed as a percentage. This results in reduced input from the TCP hosts local to the PEP end point, when latency increases.

Utilizing latency to adjust window sizes has applicability to PBP windows. Notably, queue latency related to sending traffic in the WAN to LAN direction may be employed to adjust the windows that are advertised by PBP.

Figure 29:
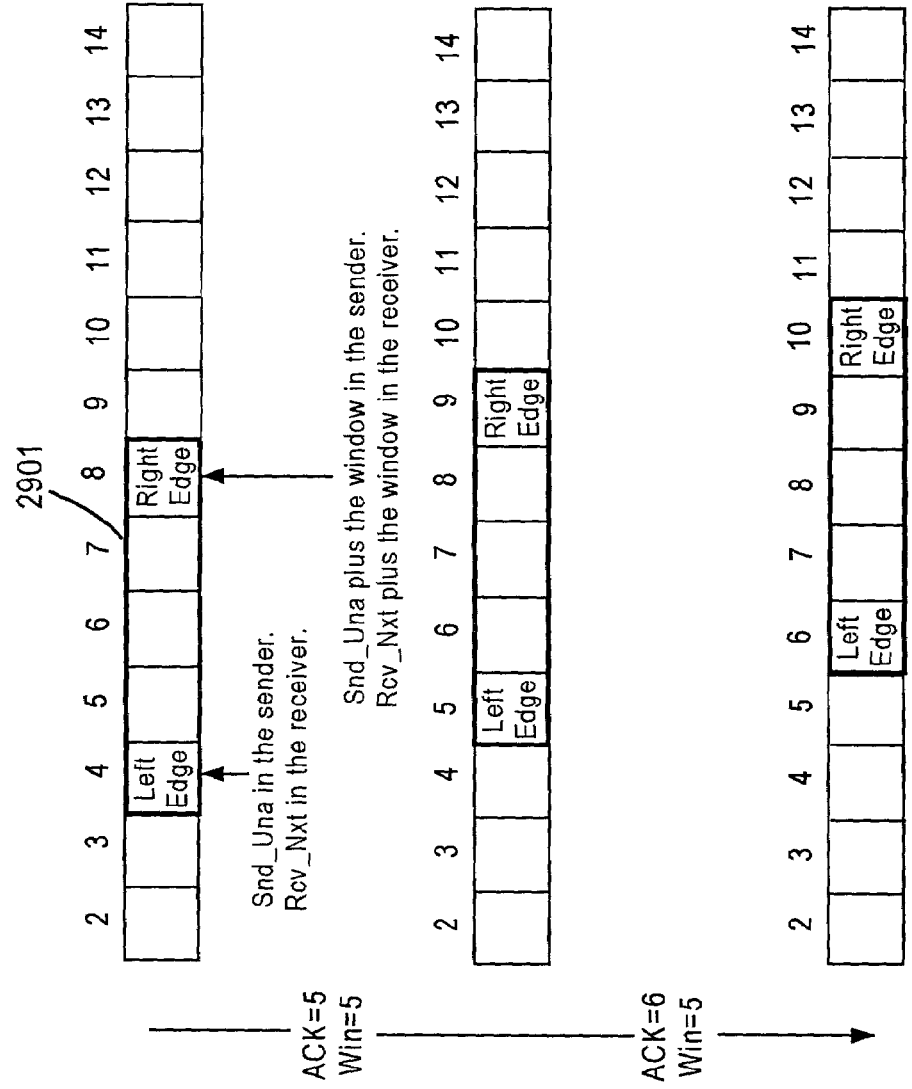
FIG. 29 is a diagram of a sliding window mechanism used in the system of FIG. 1, according to an embodiment of the present invention.

FIG. 29 shows a sliding window used by the PBP, according to one embodiment of the present invention. Like TCP, PBP uses a sliding window 2901 to determine the current acceptable range of sequence numbers. As shown, the left edge in the sender is the last in-sequence number acknowledged plus one (Snd_Una). The right edge is equal to the left edge plus the window size advertised by the receiver. The sender may fill the window 2901 and upon filling the window 2901 must wait for an acknowledgement in order to transmit new packets. If the window is full and the sender is given new data to send, it must queue the data for later transmission after the window 2901 slides. The receiver views the window using Rcv_Nxt for the left edge instead of Snd_Una. If a received packet has a sequence number within the window, it is acknowledged. If it equals the left edge of the window 2901, a cumulative ACK is used which slides the window 2901 down by one.

When the TCP Spoofing Kernel (TSK) 280 needs to determine a window size to advertise in a TCP segment, the TSK 280 starts by calling the platform environment 210 to get the current LAN to WAN buffer space availability for the backbone connection associated with the spoofed TCP connection. TSK 280 then divides this number by the number of TCP connections that are currently using the backbone connection. TSK 280 keeps track of the number of TCP connections using a backbone connection in the backbone connection's TCB, incrementing the count whenever a CCB is allocated and decrementing the count whenever a CCB is deallocated. TSK 280 then converts this value from buffers into bytes by multiplying the number of buffers by the MSS being used by the local host to send TCP segments to TSK 280. This value represents the potential window size that can be advertised. However, TSK 280 must make two additional checks before using this value. First, the potential value is compared to the window size limit. If the potential value is larger than the window size limit, the window size limit is advertised instead. If the potential value is smaller than the window size limit, TSK 280 then checks to determine whether advertising the potential value would shrink the window to a value smaller than previously advertised (i.e., would move the right edge of the rotating window to the left). As indicated previously, a TCP receiver should not shrink its window 2901; therefore, if the potential window value would shrink the window 2901, TSK 280 instead advertises the smallest possible window 2901 which does not shrink the previously advertised window (i.e., the value which represents keeping the right edge of the window 2901 in the same place). The calculation of the advertised TCP window 2901 is as follows:

$$W_{TC} = A_{pi}^{L2W} / K_{pi} * MSS$$

$$W_{TA} = MAX(MIN(W_{TC}, W_{TL}), W_{TR}),$$

where $K_{pi}$ is the current number of TCP connections using the backbone connection to peer "p" at priority "i", $W_{TC}$ is the calculated TCP window 2901, $W_{TR}$ is the TCP window represented by the space remaining from the previously advertised window (i.e., based on the last "right edge" advertised), $W_{TL}$ is the configured maximum advertised TCP window limit, $W_{TA}$ is the TCP window that is actually advertised, and MSS is the TCP connection MSS.

PBP window calculations are similar to TCP window calculations, except that there may be no need to convert the window to bytes. When the Backbone Protocol Kernel 282 needs to determine a window size to advertise in a PBP segment, the BPK 282 starts by calling the platform environment 210 to get the current WAN to LAN buffer space availability for the backbone connection. This value represents the potential window size that can be advertised. However, BPK 282 must make two additional checks before using this value. First, the potential value is compared to the window size limit. If the potential value is larger than the window size limit, the window size limit is advertised instead. If the potential value is smaller than the window size limit, BPK 282 then checks to determine whether advertising the potential value would shrink the window to a value smaller than previously advertised (i.e., would move the right edge of the rotating window to the left). As stated above, a PBP receiver should not shrink its window 2901. Therefore, if the potential window value would shrink the window 2901, BPK 282 instead advertises the smallest possible window 2901 which does not shrink the previously advertised window 2901 (i.e., the value which represents keeping the right edge of the window in the same place). The calculation of the advertised PBP window 2901 is as follows.

$$W_{PC} = A_{pi}{}^{W2L}$$

$$W_{PA} = MAX(MIN(W_{PC}, W_{PL}), W_{PR})$$

where $W_{PC}$ is the calculated PBP window 2901, $W_{PR}$ is the PBP window that is represented by the space remaining from the previously advertised window (i.e., based on the last "right edge" advertised), $W_{PL}$ is the configured maximum advertised PBP window limit, and $W_{PA}$ is PBP window that is actually advertised.

Figure 30:
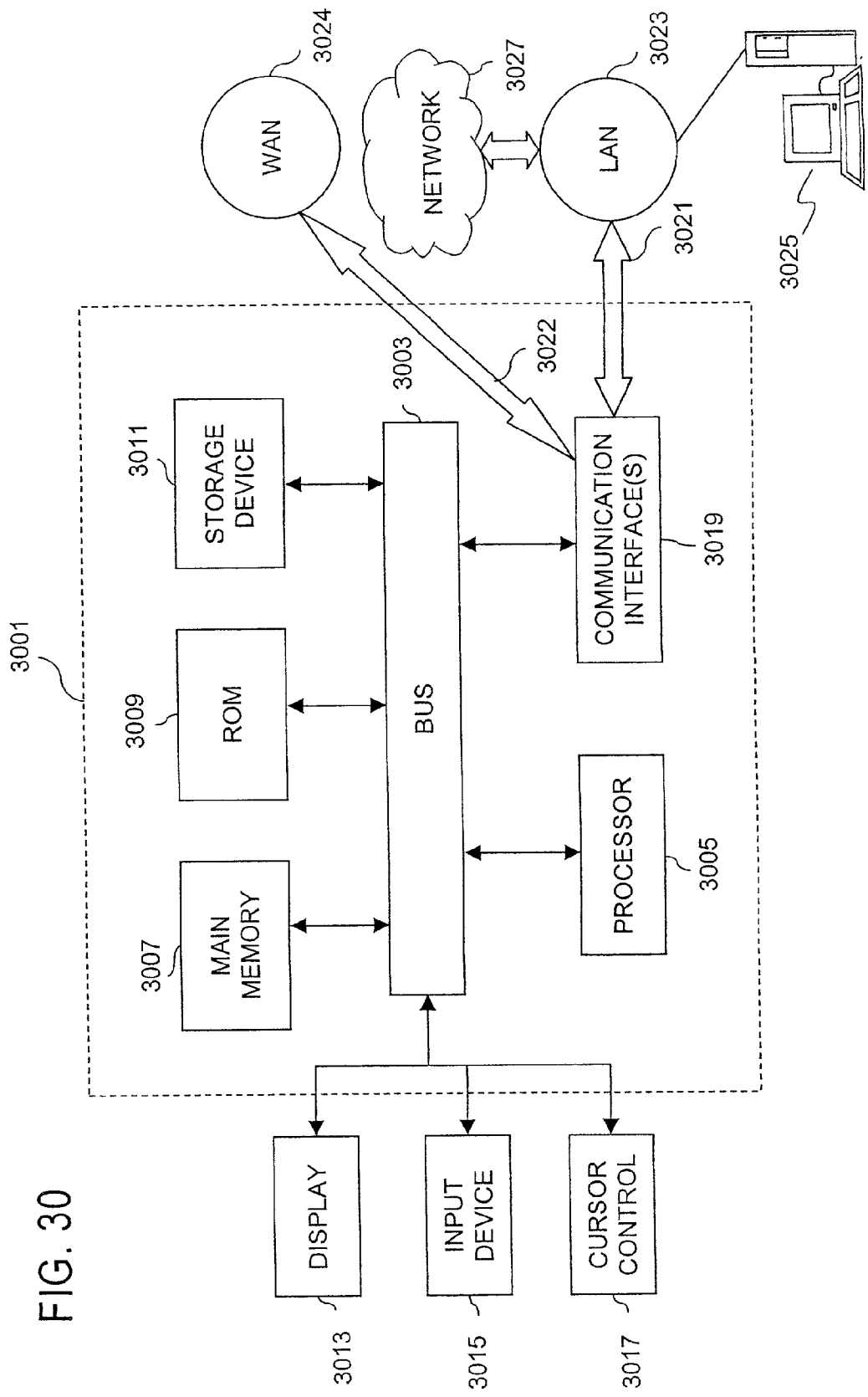
FIG. 30 is a diagram of a computer system that can perform PEP functions, in accordance with an embodiment of the present invention.
Figure 31:
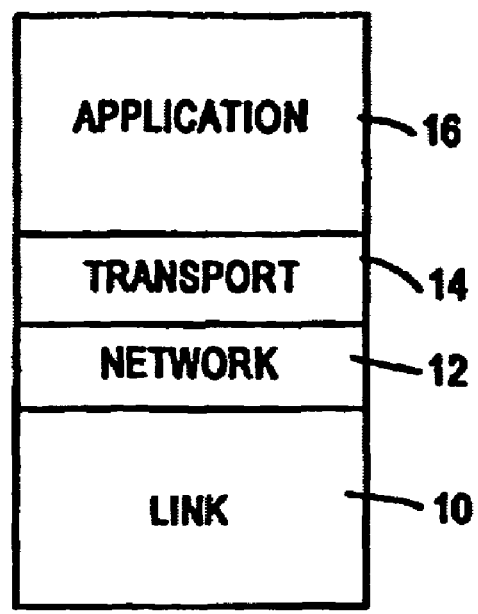
FIG. 31 is diagram of the protocol layers of the TCP/IP protocol suite.
Figure 32:
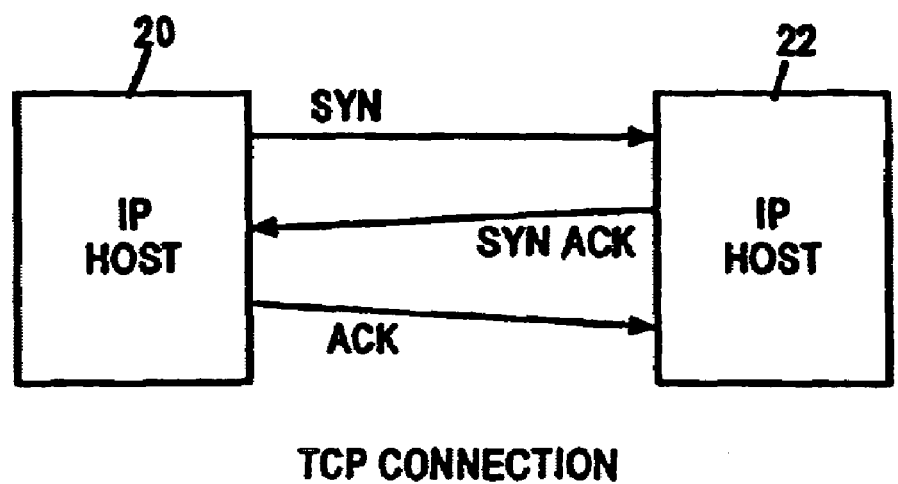
FIG. 32 is diagram of a conventional TCP three-way handshake between IP hosts.

FIG. 30 illustrates a computer system 3001 upon which an embodiment according to the present invention may be implemented. Such a computer system 3001 may be configured as a server to execute code that performs the PEP functions of the PEP end point 210 as earlier discussed. Computer system 3001 includes a bus 3003 or other communication mechanism for communicating information, and a processor 3005 coupled with bus 3003 for processing the information. Computer system 3001 also includes a main memory 3007, such as a random access memory (RAM) or other dynamic storage device, coupled to bus 3003 for storing information and instructions to be executed by processor 3005. In addition, main memory 3007 may be used for storing temporary variables or other intermediate information during execution of instructions to be executed by processor 3005. Notably, PEP control blocks may be stored in main memory 3007. Computer system 3001 further includes a read only memory (ROM) 3009 or other static storage device coupled to bus 3003 for storing static information and instructions for processor 3005. A storage device 3011, such as a magnetic disk or optical disk, is provided and coupled to bus 3003 for storing information and instructions.

Computer system 3001 maybe coupled via bus 3003 to a display 3013, such as a cathode ray tube (CRT), for displaying information to a computer user. An input device 3015, including alphanumeric and other keys, is coupled to bus 3003 for communicating information and command selections to processor 3005. Another type of user input device is cursor control 3017, such as a mouse, a trackball, or cursor direction keys for communicating direction information and command selections to processor 3005 and for controlling cursor movement on display 3013.

Embodiments are related to the use of computer system 3001 to perform the PEP functions of the PEP end point 210. According to one embodiment, this automatic update approach is provided by computer system 3001 in response to processor 3005 executing one or more sequences of one or more instructions contained in main memory 3007. Such instructions may be read into main memory 3007 from another computer-readable medium, such as storage device 3011. Execution of the sequences of instructions contained in main memory 3007 causes processor 3005 to perform the process steps described herein. One or more processors in a multi-processing arrangement may also be employed to execute the sequences of instructions contained in main memory 3007. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 3005 for execution the PEP functions of the PEP end point 210. Such a medium may take many forms, including but not limited to, non-volatile media, volatile media, and transmission media. Non-volatile media includes, for example, optical or magnetic disks, such as storage device 3011. Volatile media includes dynamic memory, such as main memory 3007. Transmission media includes coaxial cables, copper wire and fiber optics, including the wires that comprise bus 3003. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 3005 for execution. For example, the instructions may initially be carried on a magnetic disk of a remote computer. The remote computer can load the instructions relating to execution of the PEP functions of the PEP end point 210 into its dynamic memory and send the instructions over a telephone line using a modem. A modem local to computer system 3001 can receive the data on the telephone line and use an infrared transmitter to convert the data to an infrared signal. An infrared detector coupled to bus 3003 can receive the data carried in the infrared signal and place the data on bus 3003. Bus 3003 carries the data to main memory 3007, from which processor 3005 retrieves and executes the instructions. The instructions received by main memory 3007 may optionally be stored on storage device 3011 either before or after execution by processor 3005.

Computer system 3001 also includes one or more communication interfaces 3019 coupled to bus 3003. Communication interfaces 3019 provide a two-way data communication coupling to network links 3021 and 3022 which are connected to a local area network (LAN) 3023 and a wide area network (WAN) 3024, respectively. The WAN 3024, according to one embodiment of the present invention, may be a satellite network. Communication interface 3019 may be a network interface card to attach to any packet switched LAN. As another example, communication interface 3019 may be an asymmetrical digital subscriber line (ADSL) card, an integrated services digital network (ISDN) card, a cable modem, or a modem to provide a data communication connection to a corresponding type of telephone line. Wireless links may also be implemented. In any such implementation, communication interface 3019 sends and receives electrical, electromagnetic or optical signals that carry digital data streams representing various types of information.

Network link 3021 typically provides data communication through one or more networks to other data devices. For example, network link 3021 may provide a connection through local area network 3023 to a host computer 3025 or to data equipment operated by an Internet Service Provider (ISP) 3027. ISP 3027 in turn provides data communication services through the Internet. In addition, LAN 3023 is linked to an intranet. The intranet, LAN 3023 and Internet all use electrical, electromagnetic or optical signals that carry digital data streams. The signals through the various networks and the signals on network link 3021 and through communication interface 3019 which carry the digital data to and from computer system 3001, are exemplary forms of carrier waves transporting the information.

Computer system 3001 can send messages and receive data, including program code, through the network(s), network link 3021 and communication interface 3019. In the Internet example, a server might transmit a requested code for an application program through Internet, ISP 3027, LAN 3023 and communication interface 3019. The received code may be executed by processor 3005 as it is received, and/or stored in storage device 3011, or other non-volatile storage for later execution. In this manner, computer system 3001 may obtain application code in the form of a carrier wave. Computer system 3001 can transmit notifications and receive data, including program code, through the network(s), network link 3021 and communication interface 3019.

The techniques described herein provide several advantages over prior approaches to improving network performance, particularly in a packet switched network such as the Internet. A local PEP end point and a remote PEP end point communicate to optimize the exchange of data through a backbone connection through the use of performance enhancing functions. This approach advantageously minimizes network latency.

Obviously, numerous modifications and variations of the present invention are possible in light of the above teachings. It is therefore to be understood that within the scope of the appended claims, the invention may be practiced otherwise than as specifically described herein.

What is claimed is:

1. A network apparatus for providing performance enhancements of a communication network, comprising:
    a plurality of communication interfaces configured to receive and to forward messages according to a prescribed protocol;
    a plurality of modules configured to process the messages to effect performance enhancing functions, wherein the plurality of modules comprises a spoofing module configured to perform selective spoofing of one or more connections within the communication network by adding information to or deleting information from the messages to enhance performance of the communication network, a connection module configured to multiplex the connections over a common backbone connection established over the communication network, a prioritization module configured to prioritize the connections for access to the backbone connection, and a path selection module configured to determine a path among a plurality of paths supporting the connections over the communication network; and
    a plurality of buffers configured to store the received messages and messages that are generated by one of the plurality of modules,
    wherein a portion of the plurality of buffers is shared by the plurality of modules based upon execution of a particular one of the performance enhancing functions, each of the plurality of buffers has a data structure that includes an expandable header to accommodate different message types.

2. The network apparatus according to claim 1, wherein the communication interface includes a local area network (LAN) interface, and a wide area network (WAN) interface, one of the plurality of buffers being designated as a LAN-to-WAN buffer that stores the receive messages in a LAN-to-WAN direction, another one of the plurality of buffers being designated as a WAN-to-LAN buffer that stores the receive messages in a WAN-to-LAN direction.

3. The network apparatus according to claim 2, wherein the WAN is satellite network.

4. The network apparatus according to claim 1, wherein the data structure of the plurality of buffers comprises:
    a specific header field that stores platform specific information;
    a common header field the stores information known to the plurality of modules;
    a payload field;
    an offset field that indicates start of the payload field; and
    a header growth field that provides a variable header length.

5. The network apparatus according to claim 4, wherein the common header field comprises:
    a flag field that specifies direction of message flow;
    a connection handle field that specifies handle of a backbone connection; and
    an owner specific field that stores an owner specific header.

6. The network apparatus according to claim 1, wherein the prescribed protocol is the Transmission Control Protocol (TCP).

7. A method for providing performance enhancements by an endpoint within a communication network, the method comprising:
    receiving messages according to a prescribed protocol;
    processing the messages to effect performance enhancing functions via a plurality of modules of the endpoint, wherein the plurality of modules comprises a spoofing module configured to perform selective spoofing of one or more connections within the communication network by adding information to or deleting information from the messages to enhance performance of the communication network, a connection module configured to multiplex the connections over a common backbone connection established over the communication network, a prioritization module configured to prioritize the connections for access to the backbone connection, and a path selection module configured to determine a path among a plurality of paths supporting the connections over the communication network; and
    storing the received messages and messages that are generated by one of the plurality of modules in a plurality of buffers of the endpoint,
    wherein a portion of the plurality of buffers is shared by the plurality of modules based upon execution of a particular one of the performance enhancing functions, each of the plurality of buffers has a data structure that includes an expandable header to accommodate different message types.

8. The method according to claim 7, wherein the receiving step is performed by a communication interface that includes at least one of a local area network (LAN) interface and a wide area network (WAN) interface, one of the plurality of buffers being designated as a LAN-to-WAN buffer that stores the receive messages in a LAN-to-WAN direction, another one of the plurality of buffers being designated as a WAN-to-LAN buffer that stores the receive messages in a WAN-to-LAN direction.

9. The method according to claim 8, wherein the WAN is satellite network.

10. The method according to claim 7, wherein the data structure of the plurality of buffers comprises:
a specific header field that stores platform specific information;
a common header field the stores information known to the plurality of modules;
a payload field;
an offset field that indicates start of the payload field; and
a header growth field that provides a variable header length.

11. The method according to claim 10, wherein the common header field comprises:
a flag field that specifies direction of message flow;
a connection handle field that specifies handle of a backbone connection; and
an owner specific field that stores an owner specific header.

12. The method according to claim 7, wherein the prescribed protocol in the receiving step is the Transmission Control Protocol (TCP).

13. A network apparatus for providing performance enhancements of a communication network, comprising:
means for receiving messages according to a prescribed protocol; and
means for processing the messages to effect performance enhancing functions, wherein the received messages and messages that are generated by processing means are stored in a plurality of buffers, a portion of the plurality of buffers being shared by the processing means based upon execution of a particular one of the performance enhancing functions, each of the plurality of buffers having a data structure that includes an expandable header to accommodate different message types,
wherein the processing means comprises a spoofing module configured to perform selective spoofing of one or more connections within the communication network by adding information to or deleting information from the messages to enhance performance of the communication network, a connection module configured to multiplex the connections over a common backbone connection established over the communication network, a prioritization module configured to prioritize the connections for access to the backbone connection, and a path selection module configured to determine a path among a plurality of paths supporting the connections over the communication network.

14. The network apparatus according to claim 13, wherein the receiving means includes at least one of a local area network (LAN) interface and a wide area network (WAN) interface, one of the plurality of buffers being designated as a LAN-to-WAN buffer that stores the receive messages in a LAN-to-WAN direction, another one of the plurality of buffers being designated as a WAN-to-LAN buffer that stores the receive messages in a WAN-to-LAN direction.

15. The network apparatus according to claim 14, wherein the WAN is satellite network.

16. The network apparatus according to claim 13, wherein the data structure of the plurality of buffers comprises:
a specific header field that stores platform specific information;
a common header field the stores information known to the plurality of modules;
a payload field;
an offset field that indicates start of the payload field; and
a header growth field that provides a variable header length.

17. The network apparatus according to claim 16, wherein the common header field comprises:
a flag field that specifies direction of message flow;
a connection handle field that specifies handle of a backbone connection; and
an owner specific field that stores an owner specific header.

18. The network apparatus according to claim 13, wherein the prescribed protocol is the Transmission Control Protocol (TCP).

19. A volatile and non-volatile computer-readable medium carrying one or more sequences of one or more instructions for providing performance enhancements by an endpoint within a communication network, the one or more sequences of one or more instructions including instructions which, when executed by one or more processors, cause the one or more processors to perform the steps of:
receiving messages according to a prescribed protocol;
processing the messages to effect performance enhancing functions via a plurality of modules of the endpoint, wherein the plurality of modules comprises a spoofing module configured to perform selective spoofing of one or more connections within the communication network by adding information to or deleting information from the messages to enhance performance of the communication network, a connection module configured to multiplex the connections over a common backbone connection established over the communication network, a prioritization module configured to prioritize the connections for access to the backbone connection, and a path selection module configured to determine a path among a plurality of paths supporting the connections over the communication network; and
storing the received messages and messages that are generated by one of the plurality of modules in a plurality of buffers of the endpoint,
wherein a portion of the plurality of buffers is shared by the plurality of modules based upon execution of a particular one of the performance enhancing functions, each of the plurality of buffers has a data structure that includes an expandable header to accommodate different message types.

20. The volatile and non-volatile computer-readable medium according to claim 19, wherein the receiving step is performed by a communication interface that includes at least one of a local area network (LAN) interface and a wide area network (WAN) interface, one of the plurality of buffers being designated as a LAN-to-WAN buffer that stores the receive messages in a LAN-to-WAN direction, another one of the plurality of buffers being designated as a WAN-to-LAN buffer that stores the receive messages in a WAN-to-LAN direction.

21. The volatile and non-volatile computer-readable medium according to claim 20, wherein the WAN is satellite network.

22. The volatile and non-volatile computer-readable medium according to claim 19, wherein the data structure of the plurality of buffers comprises:
a specific header field that stores platform specific information;

a common header field the stores information known to the plurality of modules;
a payload field;
an offset field that indicates start of the payload field; and
a header growth field that provides a variable header length.

23. The volatile and non-volatile computer-readable medium according to claim 22, wherein the common header field comprises:
a flag field that specifies direction of message flow;
a connection handle field that specifies handle of a backbone connection; and
an owner specific field that stores an owner specific header.

24. The volatile and non-volatile computer-readable medium according to claim 19, wherein the prescribed protocol in the receiving step is the Transmission Control Protocol (TCP).

25. A memory resident within an endpoint for storing information for providing performance enhancements of a communication network, the memory comprising a data structure including:
a specific header field that stores platform specific information;
a common header field the stores information known to a plurality of modules of the endpoint, wherein the plurality of modules comprises a spoofing module configured to perform selective spoofing of one or more connections within the communication network by adding information to or deleting information from the messages to enhance performance of the communication network, a connection module configured to multiplex the connections over a common backbone connection established over the communication network, a prioritization module configured to prioritize the connections for access to the backbone connection, and a path selection module configured to determine a path among a plurality of paths supporting the connections over the communication network;
a payload field;
an offset field that indicates start of the payload field; and
a header growth field that provides a variable header length.

26. The memory according to claim 25, wherein the common header field comprises:
a flag field that specifies direction of message flow;
a connection handle field that specifies handle of a backbone connection; and
an owner specific field that stores an owner specific header.

* * * * *